US006757130B2

(12) United States Patent
Yoshida et al.

(10) Patent No.: US 6,757,130 B2
(45) Date of Patent: Jun. 29, 2004

(54) RECORDING MEDIUM EXCHANGING-TYPE RECORDING AND REPRODUCING APPARATUS

(75) Inventors: Tadao Yoshida, Kanagawa (JP); Hajime Yano, Kanagawa (JP); Hiroaki Oishi, Tokyo (JP); Toyomi Fujino, Kanagawa (JP); Keiji Kanota, Kanagawa (JP)

(73) Assignee: Sony Corporation (JP)

( * ) Notice: Subject to any disclaimer, the term of this patent is extended or adjusted under 35 U.S.C. 154(b) by 336 days.

(21) Appl. No.: 09/976,032

(22) Filed: Oct. 15, 2001

(65) Prior Publication Data

US 2002/0131197 A1 Sep. 19, 2002

(30) Foreign Application Priority Data

Oct. 16, 2000 (JP) ..................................... P2000-314658
Jul. 4, 2001 (JP) ..................................... P2001-203345

(51) Int. Cl.[7] ............................................. G11B 15/68
(52) U.S. Cl. ....................................................... 360/92
(58) Field of Search .............................. 360/92, 91, 90, 360/88, 98.04, 98.05, 98.06; 369/30.43, 30.45, 30.55, 30.57, 30.7, 30.72, 30.77, 30.85, 30.87, 30.31, 30.82, 34.01

(56) References Cited

U.S. PATENT DOCUMENTS 4,910,619 A * 3/1990 Suzuki et al. ................. 360/92
6,064,544 A * 5/2000 Wada ........................... 360/92

* cited by examiner

*Primary Examiner*—Julie Anne Watko
(74) *Attorney, Agent, or Firm*—Rader, Fishman & Grauer PLLC; Ronald P. Kananen

(57) ABSTRACT

There is provided a recording medium exchanging-type recording and reproducing apparatus in which its small-sized forming can be realized, either reproducing or recording operation can be carried out within a short period of time, and it is advantageous in view of light weight forming or cost. The first and second magazines for storing the tape cartridge in such a way that the tape cartridge can be inserted into or taken out are spaced apart in a lateral direction in the casing so as to cause their longitudinal directions to become in parallel to each other, and there is provided a transferring space extending along a longitudinal direction of these first and second magazines. The moving mechanism holds the tape cartridge and moves up and down in the transferring space. The delivering mechanism delivers the tape cartridge between the first and second magazines and the moving mechanism. The moving mechanism performs installing of the tape cartridge against the recording and reproducing mechanism arranged at a location near the lower part of the transferring space.

27 Claims, 47 Drawing Sheets

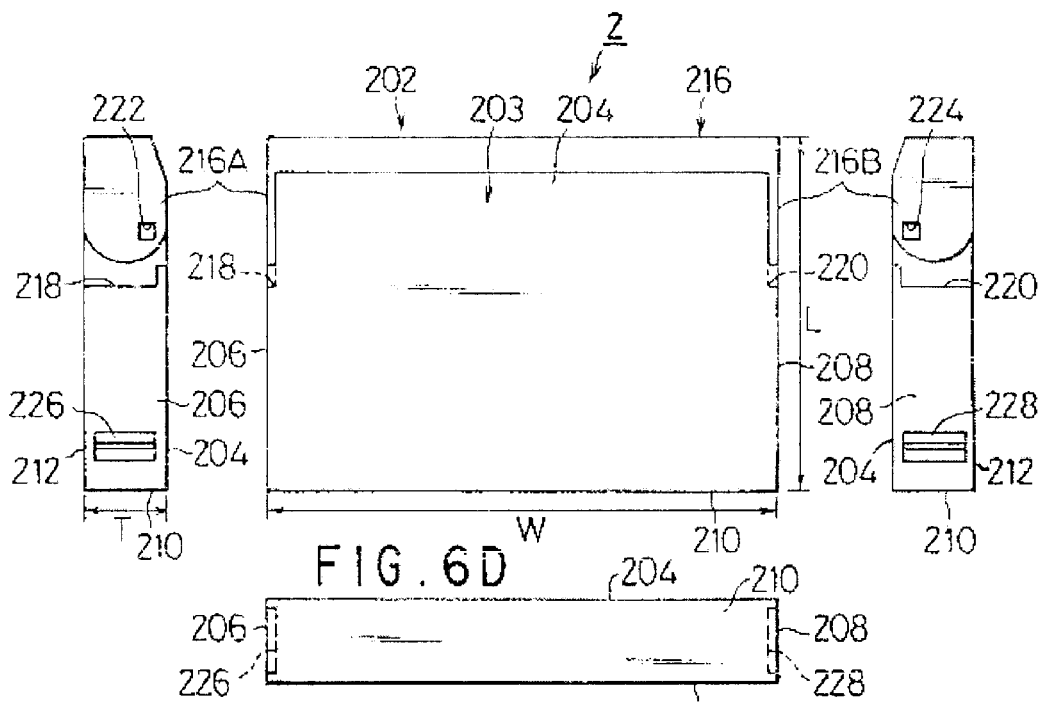
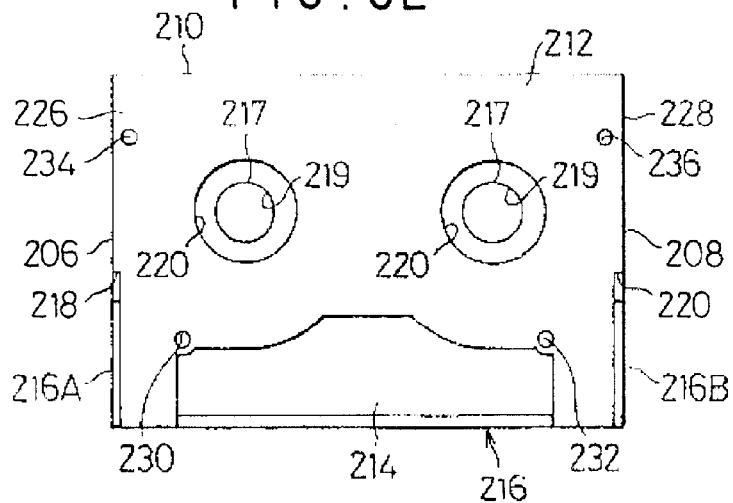

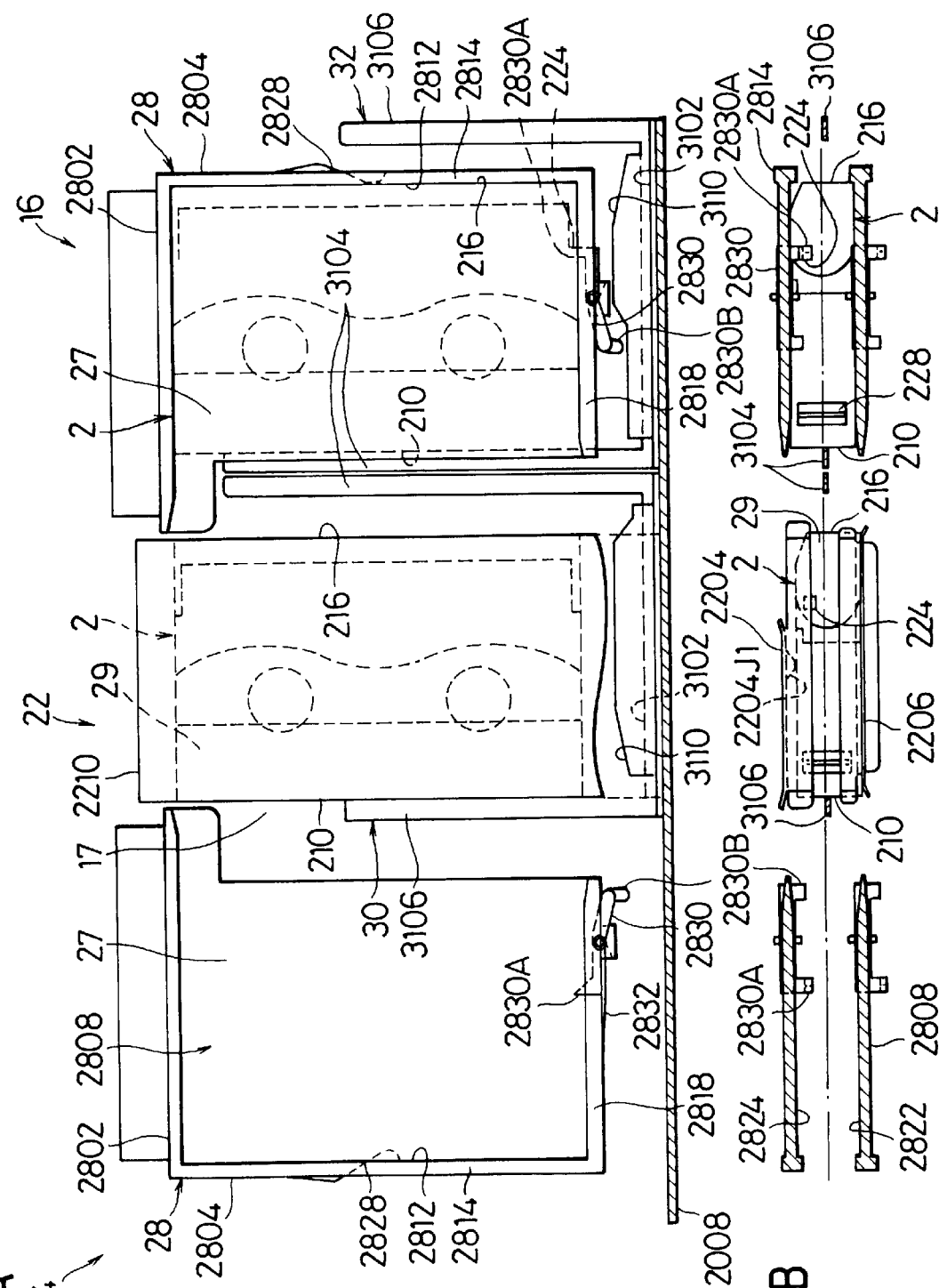

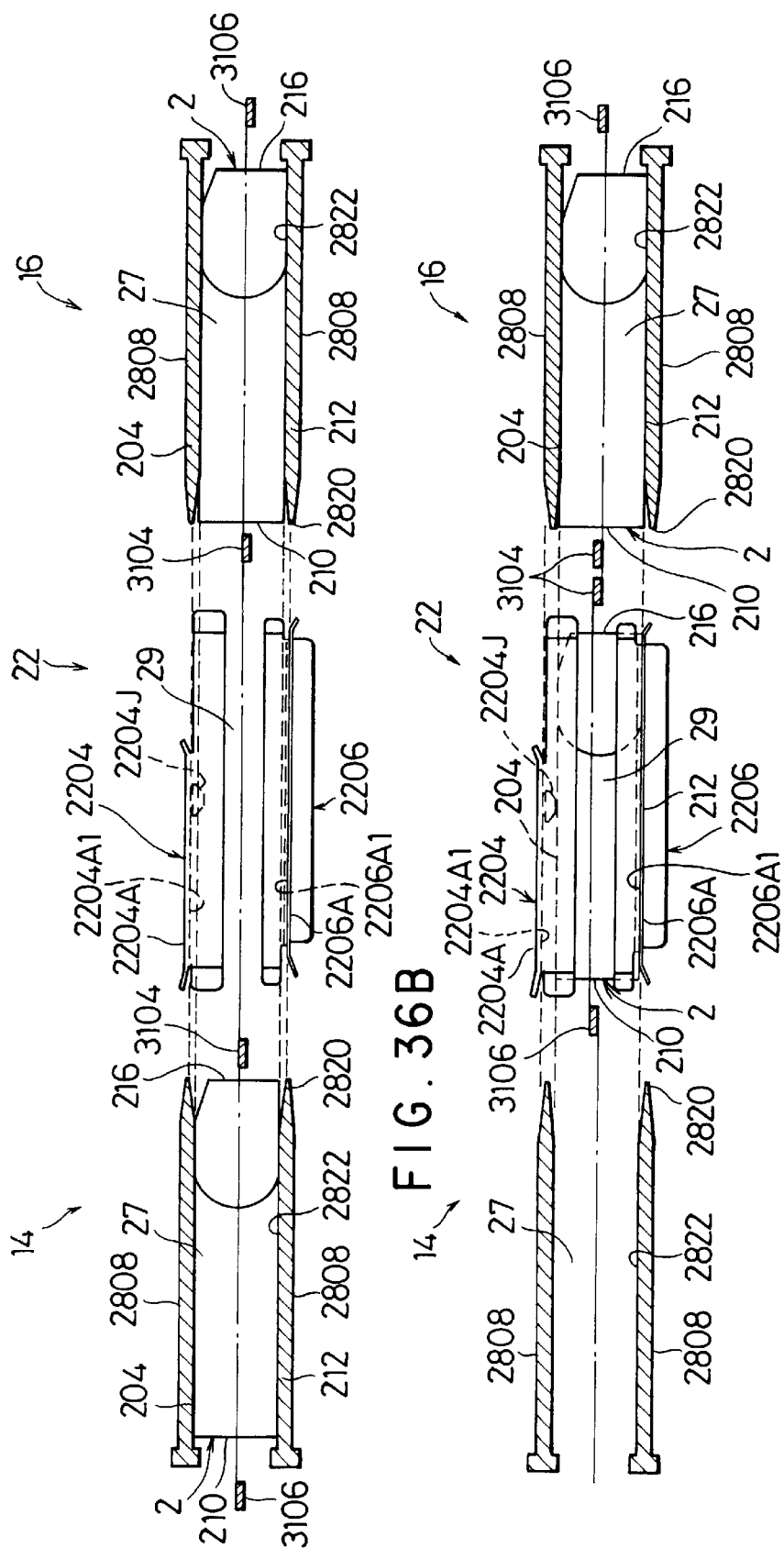

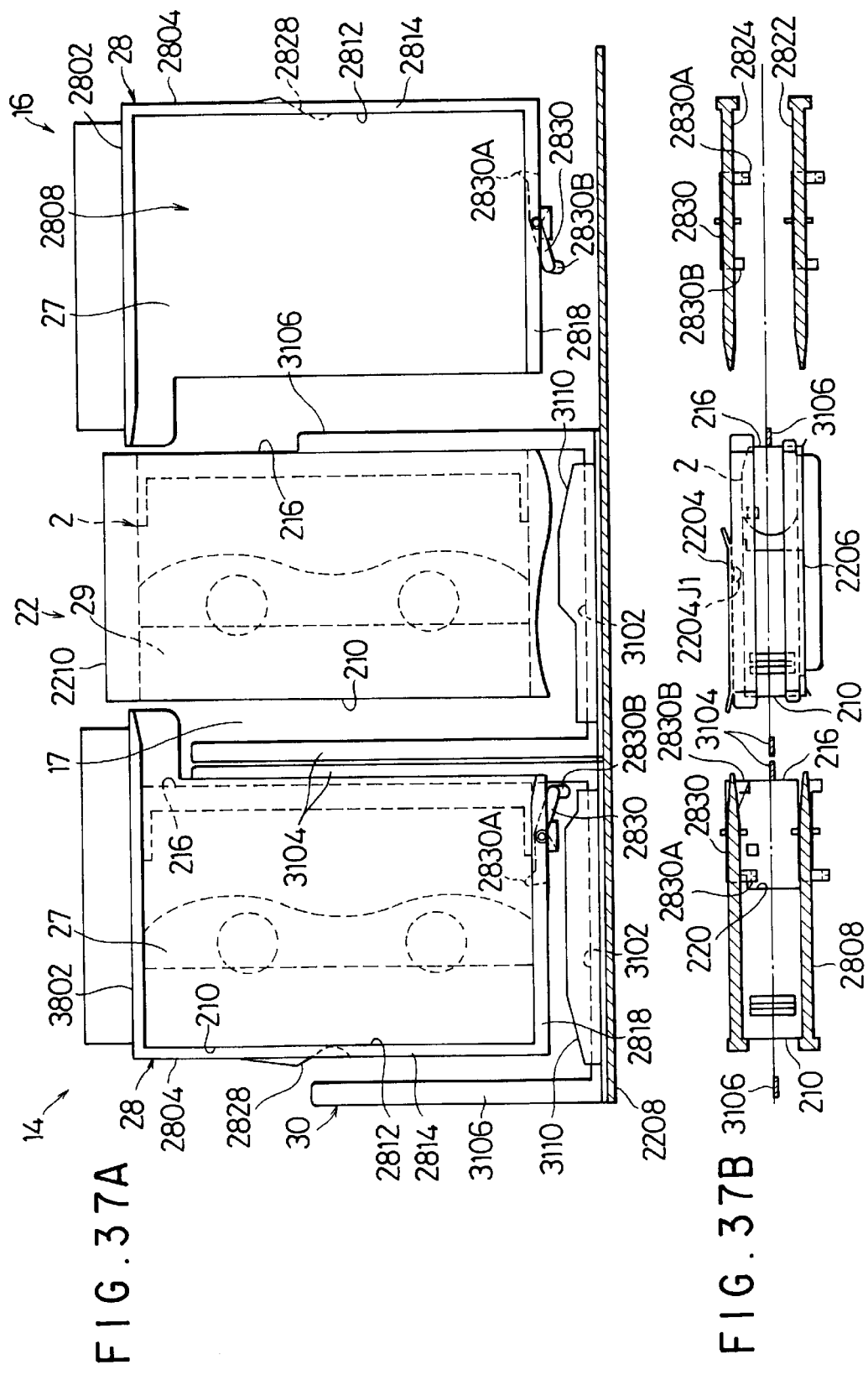

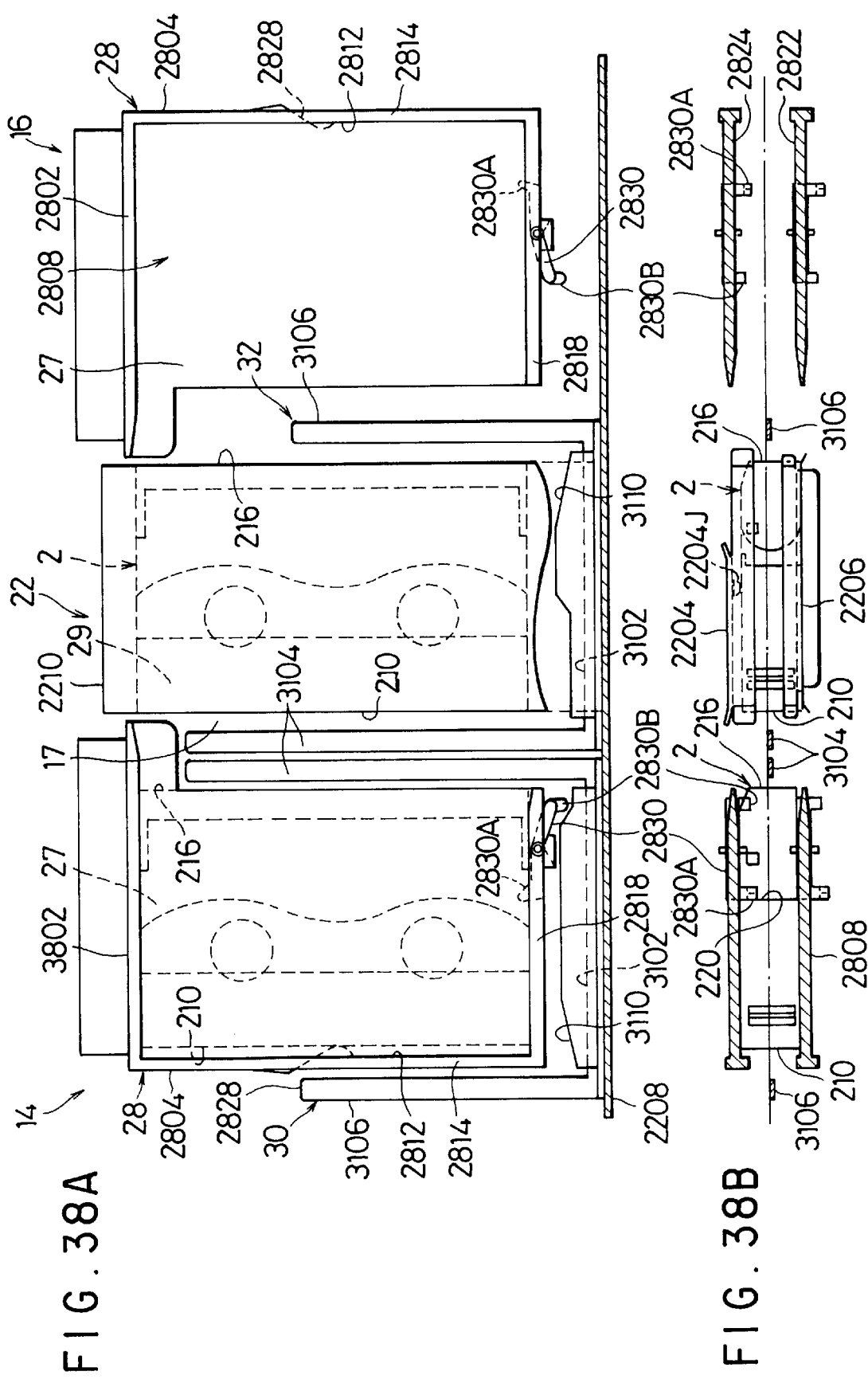

F I G . 48
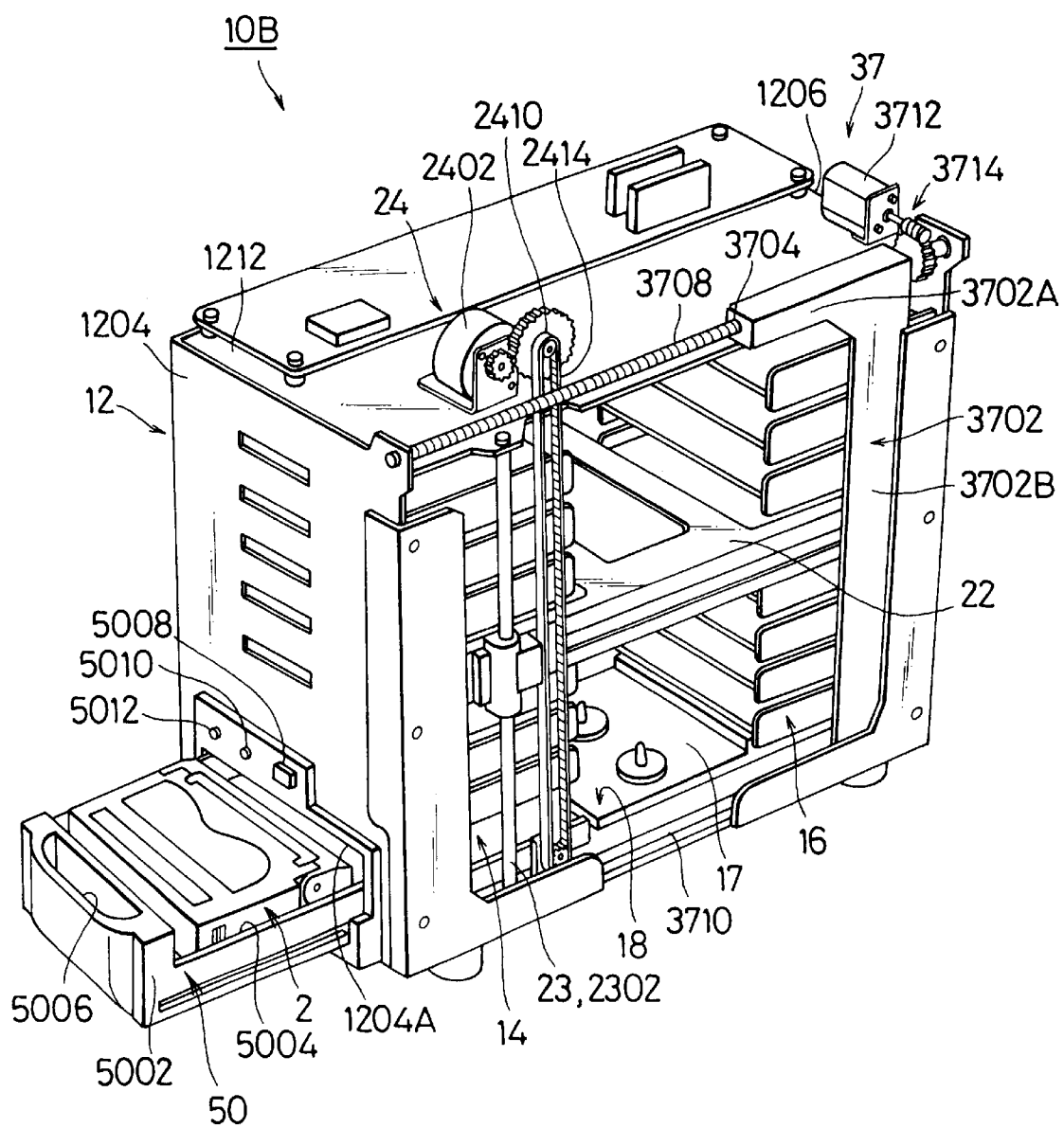

RECORDING MEDIUM EXCHANGING-TYPE RECORDING AND REPRODUCING APPARATUS

BACKGROUND OF THE INVENTION

1. Field the Invention

This invention relates to a recording medium exchanging-type recording and reproducing apparatus in which many recording media such as tape cartridges are stored, these recording media are exchanged to each other to perform recording and reproducing operations.

2. Description of the Related Art

This type of recording medium exchanging-type recording and reproducing apparatus is composed of a cassette magazine for storing a plurality of tape cartridges, for example; a recording and reproducing mechanism for performing both recording and reproducing operations against the tape cartridges; and a transfer mechanism for taking out each of the tape cartridges stored in the cassette magazine, installing it in the recording and reproducing mechanism, taking out the tape cartridge installed in the recording and reproducing mechanism and storing it in the cassette magazine.

Then, the cassette magazine is constructed in a longitudinal direction such that the tape cartridges are arranged in one row in their thickness direction and stored therein, and a transfer space where the tape cartridges are transferred by the transfer mechanism is arranged in a longitudinal direction along the cassette magazine at an adjoining location of the cassette magazine.

However, in the case of the prior art recording medium exchanging-type recording and reproducing apparatus where the longitudinal cassette magazine and the longitudinal transferring space are merely arranged side by side, the transferring space requires approximately the same length as that of the cassette magazine, so that when the number of tape cartridges to be stored is tried to be increased, for example, this shows some disadvantages that the length of the cassette magazine is increased, correspondingly the length of the transferring space is also increased and the size of the apparatus is made large.

In addition, when the transferring space is elongated, the guide rods constituting the transferring mechanism, for example, are extended and in turn when the number of tape cartridges to be stored is tried to be increased, a transferring time of the tape cartridge is extended, either reproducing or recording cannot be carried out within a short period of time, and as its counter-measure, a capacity of a motor constituting the transferring mechanism is required to be increased, resulting in that this is disadvantageous in view of its light weight forming or its cost.

SUMMARY OF THE INVENTION

The present invention has been invented to solve the problems of the prior art described above and it is an object of the present invention to provide a recording medium exchanging-type recording and reproducing apparatus in which a small-sized forming of the apparatus can be realized even if the number of recording media to be stored in the magazine is increased, and in addition, either the reproducing or recording can be performed and it is advantageous in view of its light weight forming or cost.

In order to accomplish the object, the recording medium exchanging-type recording and reproducing apparatus of the present invention is composed of two longitudinal first and second magazines constituted while a plurality of storing members for storing a recording medium capable of recording and reproducing information and of being recognized in its attitude specified by orientations in two directions crossing at a right angle to each other in such a way that the recording medium can be inserted or taken out are arranged in a linear form; a recording and reproducing mechanism having an installing part where the recording medium is installed and for performing a recording and/or reproducing against the recording medium under a state in which the recording medium is being installed at the installing part; a moving mechanism having a holding part for holding the recording medium, and to move the recording medium between each of the storing members and the recording and reproducing mechanism by the holding part; and a delivering mechanism for delivering the recording medium between each of the storing members and the holding part. The first and second magazines are oppositely arranged in such a way that their longitudinal directions are in parallel to each other and a transferring space extending along the longitudinal directions of these first and second magazines is arranged between the first and second magazines. Then, the moving action of the recording medium with the holding part is carried out in the transferring space, an attitude of the recording media stored in the first and second magazines and an attitude of the recording medium held at the holding part are the same to each other, the recording medium is characterized in that the recording medium is installed at the installing part while an attitude where it is moved in the transferring space while being held at the holding part.

In accordance with the present invention, the transferring space is extended between the first and second magazines along these longitudinal directions, the recording medium is delivered by the delivering mechanism among the first and second magazines and the moving mechanism. The recording medium stored in the moving mechanism is moved in the transferring space by the moving mechanism and installed at the installing part of the recording and reproducing mechanism.

Accordingly, there is provided a magazine storing the recording media arranged in one row and then the transferring space can be set approximately to ½ as compared with the case in which the transferring space for the recording media is arranged along a longitudinal direction of the magazine.

In addition, since an attitude of the recording media stored in the first and second magazines, an attitude of the recording medium stored in the moving mechanism and an attitude of the recording medium installed at the installing part become all the same to each other, so that it does not become necessary to arrange a mechanism for reversing the attitude of the recording medium, its configuration can be simplified and an operating time required when the recording medium is attached to or removed from the installing part can be shortened.

BRIEF DESCRIPTION OF THE DRAWINGS

FIGS. 6A to 6E are outer appearance views of a tape cartridge, wherein FIG. 6A is a top plan view, FIG. 6B is a left side elevational view, FIG. 6C is a right side elevational view, FIG. 6D is a rear view and FIG. 6E is a bottom view.

FIGS. 7A and 7B are perspective views for showing a tape cartridge, wherein FIG. 7A is a perspective view for showing a state shown from a slant upper part and FIG. 7B is a perspective view for showing a state shown from a slant lower part.

FIG. 14 is a plan view for illustrating configurations of the first and second magazines, moving mechanism, delivering mechanism and the like.

FIG. 15 is a left side elevational view for illustrating configurations of the first magazine, moving mechanism, delivering mechanism and a recording and reproducing mechanism and the like.

FIGS. 34A and 34B are illustrative views for illustrating a state in which a transferring of the tape cartridge from the first magazine to the holding part is completed, wherein FIG. 34A is a top plan view and FIG. 34B is a front elevational view.

FIGS. 36A and 36B are views for showing positional relationships of the first magazine and the holding part in their height direction, wherein FIG. 36A is an illustrative view for showing a state before the tape cartridge is transferred from the first magazine to the holding part, and FIG. 36B is an illustrative view for showing a state before the tape cartridge is transferred from the holding part to the first magazine.

FIGS. 37A and 37B are illustrative views for illustrating a state in which a transferring of the tape cartridge from the second magazine to the holding part is completed, wherein FIG. 37A is a top plan view and FIG. 37B is a front elevational view.

FIGS. 38A and 38B are illustrative views for indicating a state in which the first and second delivering members are moved to a position where they can be moved in an upward or downward direction of the holding part.

FIGS. 40A and 40B are illustrative views for indicating a positional relationship between the holding part and each of supporting pieces for the magazine block, wherein FIG. 40A is an illustrative view for indicating a state before the tape cartridge is transferred, and FIG. 40B is an illustrative view for indicating a state in which the tape cartridge 2 is being transferred.

FIG. 43 is a top plan view in which FIG. 42 is seen from above.

FIG. 45 is a top plan view in which FIG. 44 is seen from above.

FIG. 48 is a perspective view for showing from a slant forward direction a recording medium exchanging-type recording and reproducing apparatus in accordance with a third preferred embodiment.

DESCRIPTION OF THE PREFERRED EMBODIMENTS

Figure 1:
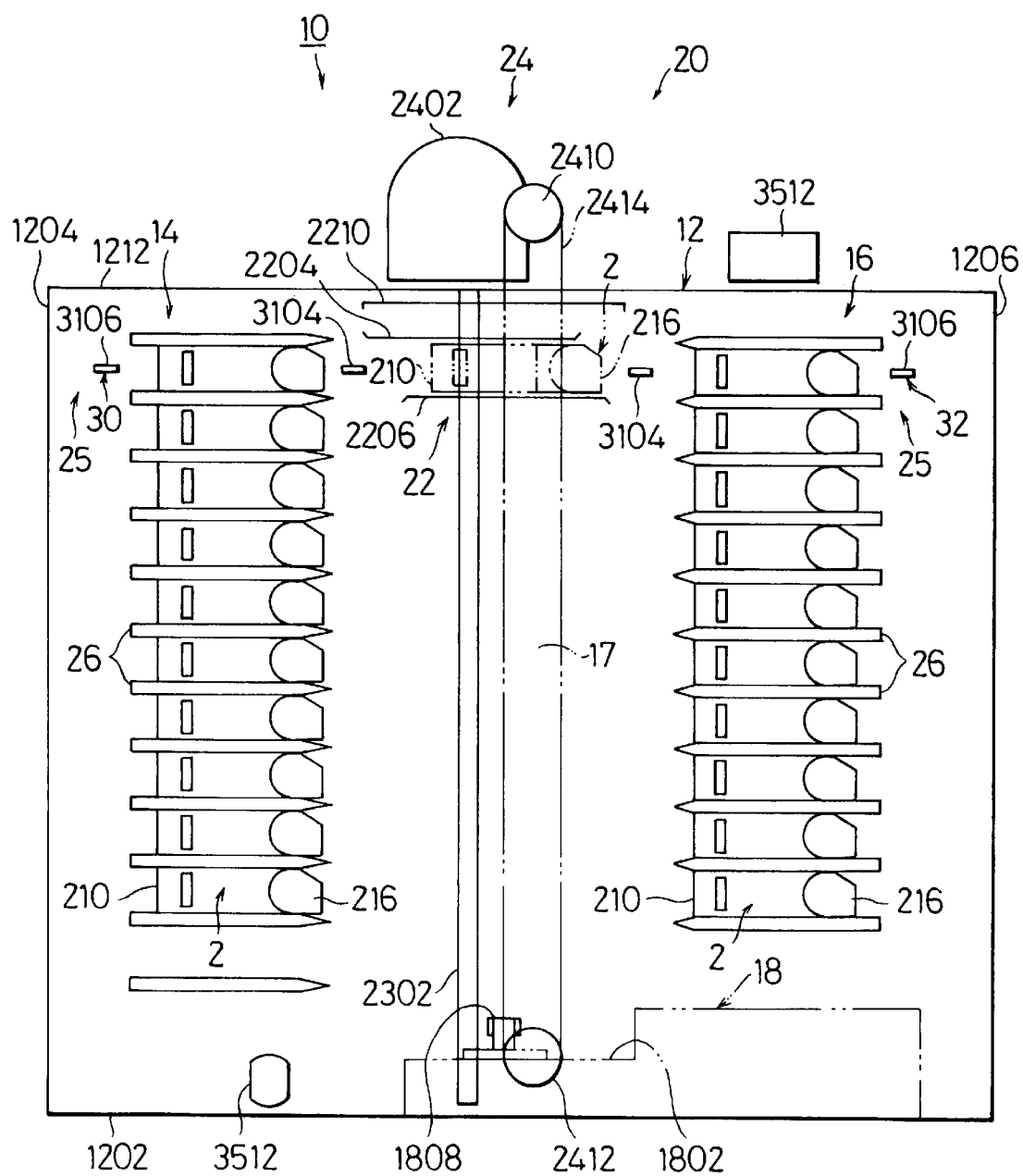
FIG. 1 is a front elevational view for showing a recording medium exchanging-type recording and reproducing apparatus of a first preferred embodiment.

Referring now to the drawings, some preferred embodiments of the present invention will be described as follows.

Figure 2:
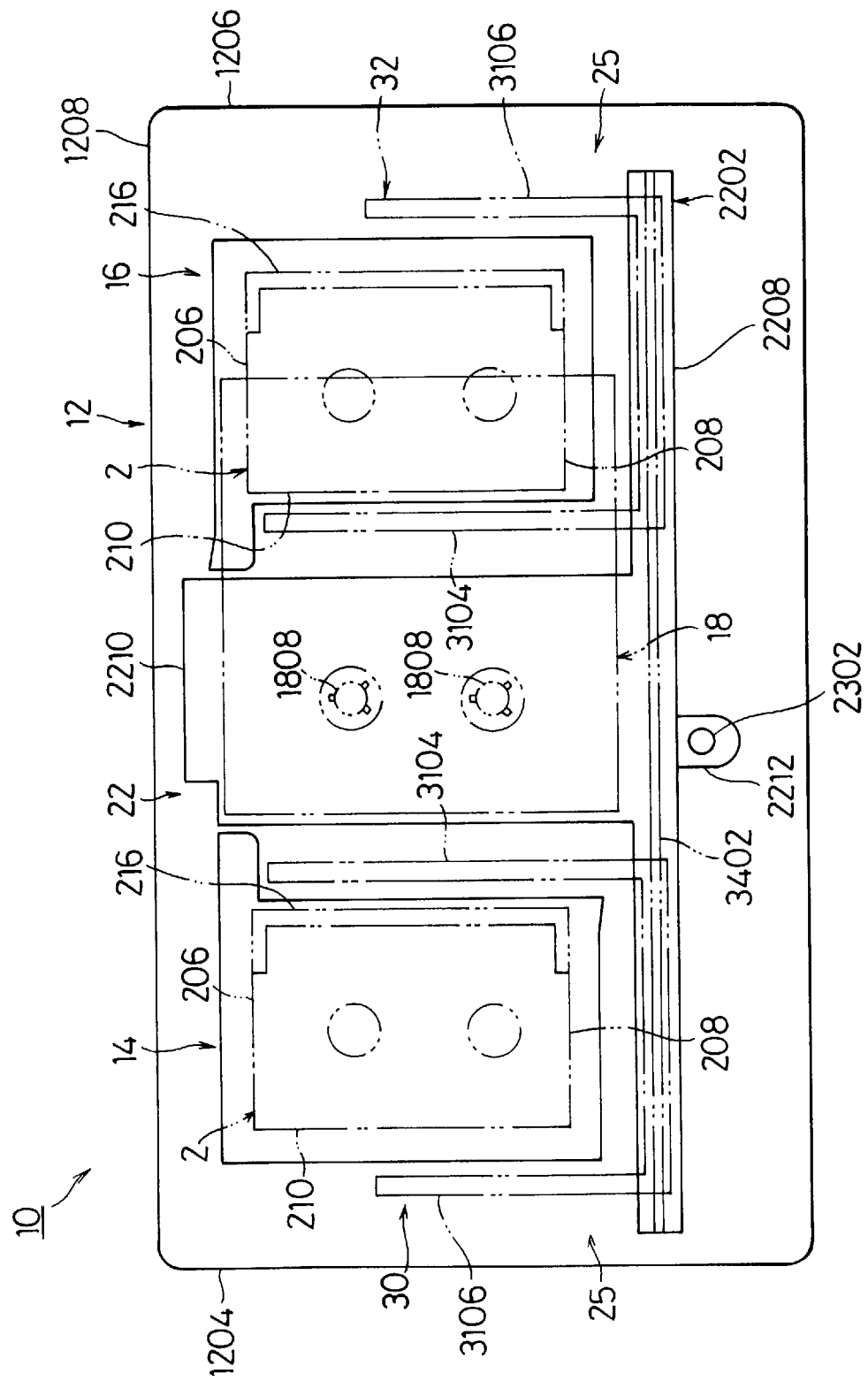
FIG. 2 is a top plan view for showing a recording medium exchanging-type recording and reproducing apparatus of a first preferred embodiment.
Figure 3:
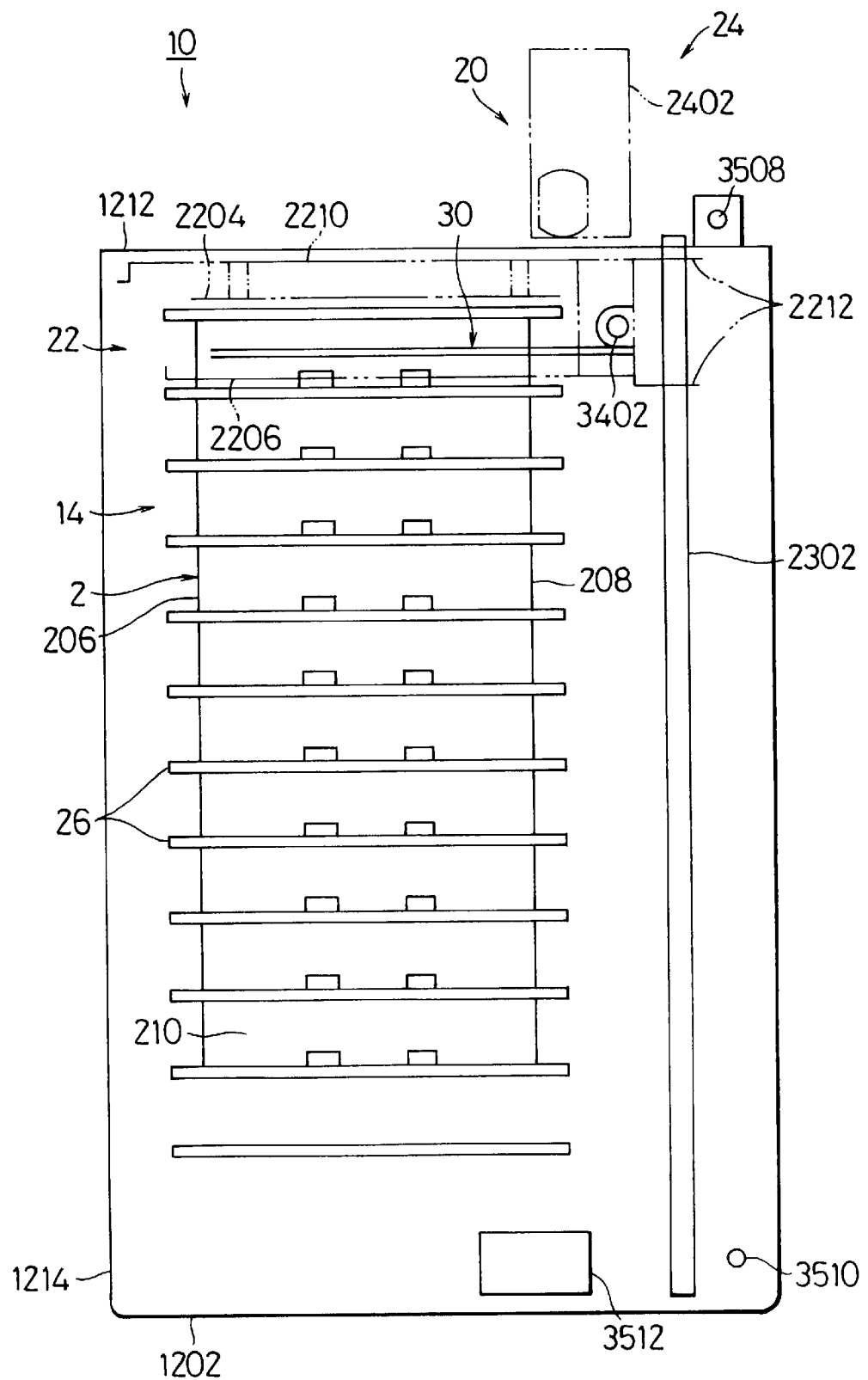
FIG. 3 is a left side elevational view for showing a recording medium exchanging-type recording and reproducing apparatus of a first preferred embodiment.
Figure 4:
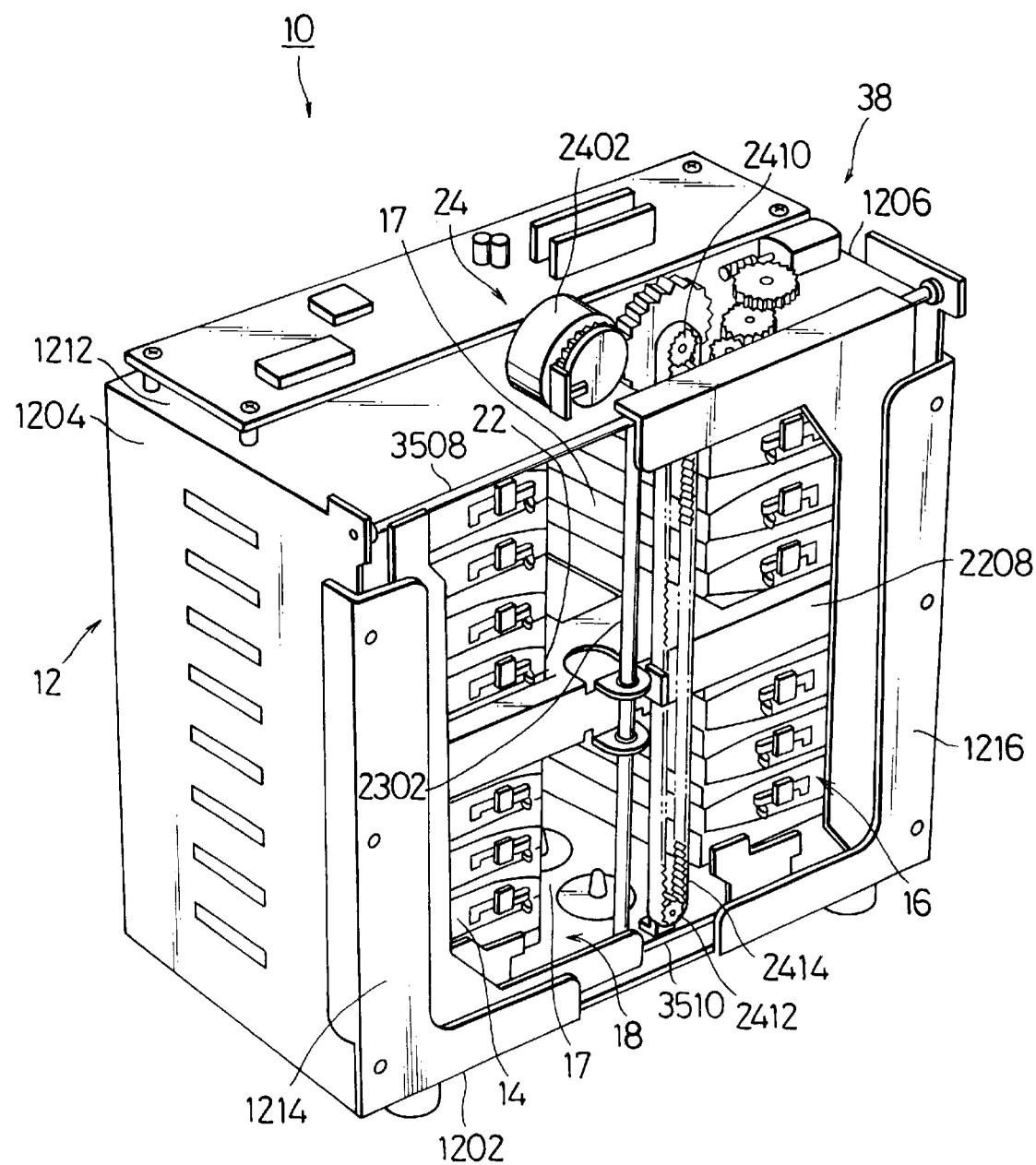
FIG. 4 is a perspective view for showing from a slant forward direction a recording medium exchanging-type recording and reproducing apparatus of a first preferred embodiment.
Figure 5:
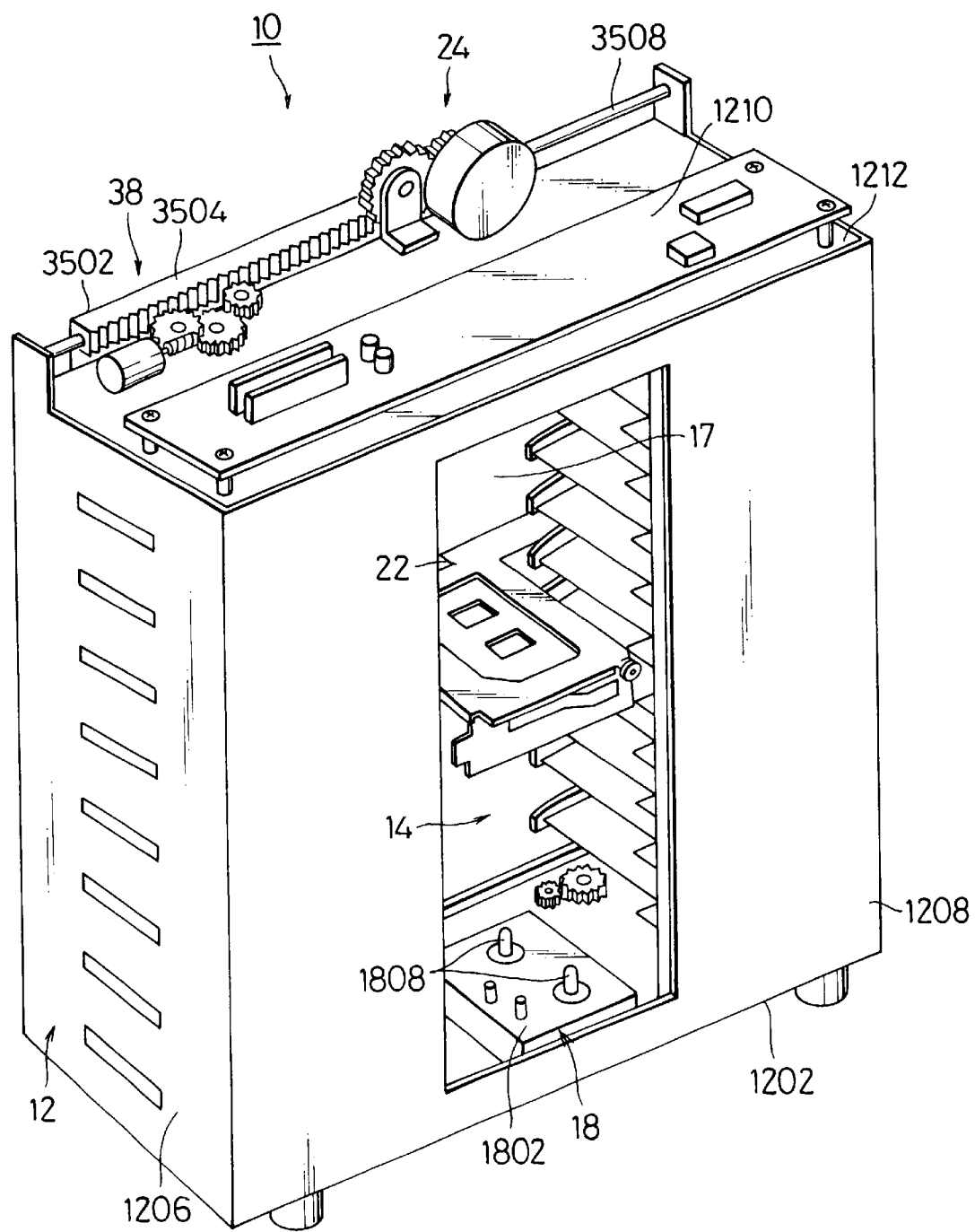
FIG. 5 is a perspective view for showing from a slant rearward direction a recording medium exchanging-type recording and reproducing apparatus of a first preferred embodiment.

FIG. 1 is a front elevational view for showing a recording medium exchanging-type recording and reproducing apparatus of a first preferred embodiment. FIG. 2 is a top plan view for showing a recording medium exchanging-type recording and reproducing apparatus of a first preferred embodiment. FIG. 3 is a left side elevational view for showing a recording medium exchanging-type recording and reproducing apparatus of a first preferred embodiment. FIG. 4 is a perspective view for showing from a slant forward direction a recording medium exchanging-type recording and reproducing apparatus of a first preferred embodiment. FIG. 5 is a perspective view for showing from a slant rearward direction a recording medium exchanging-type recording and reproducing apparatus of a first preferred embodiment.

As shown in FIGS. 1 to 5, a recording medium exchanging-type recording and reproducing apparatus 10 stores a plurality of recording media (tape cartridges 2 to be described later) and takes out these stored recording media to perform a recording and reproducing operation. The apparatus 10 is constructed to have a casing 12; a first magazine 14 and a second magazine 16 for arranging a plurality of tape cartridges 2 in an upward or downward direction and storing them; a transferring space 17 arranged between the first magazine 14 and the second magazine 16; a recording and reproducing mechanism 18 arranged below the transferring space 17; a moving mechanism 20 moved up and down in the transferring space 17; a delivering mechanism 25 for delivering the tape cartridges 2 among the moving mechanism 20, the first magazine 14 and the second magazine 16; a lock mechanism 40 (FIG. 33); a control part (not shown); and an operating part.

In the first preferred embodiment, as a recording medium capable of recording and reproducing information, a tape cartridge 2 is applied and at first this tape cartridge 2 will be described as follows.

Figure 7A:
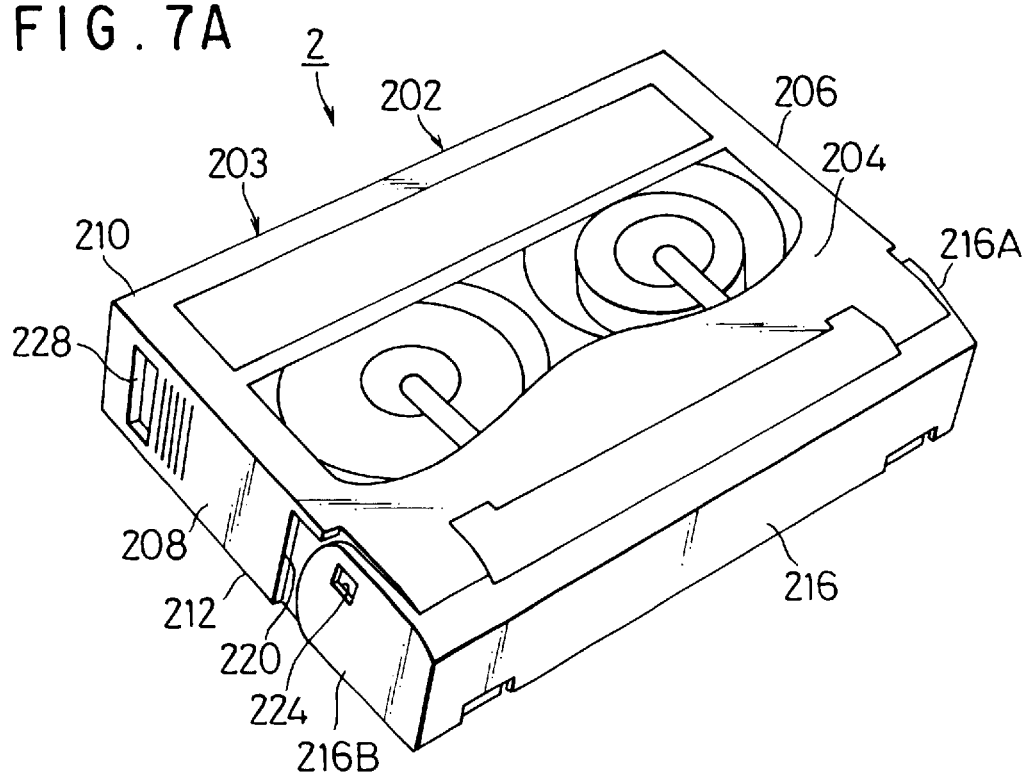
Figure 7B:
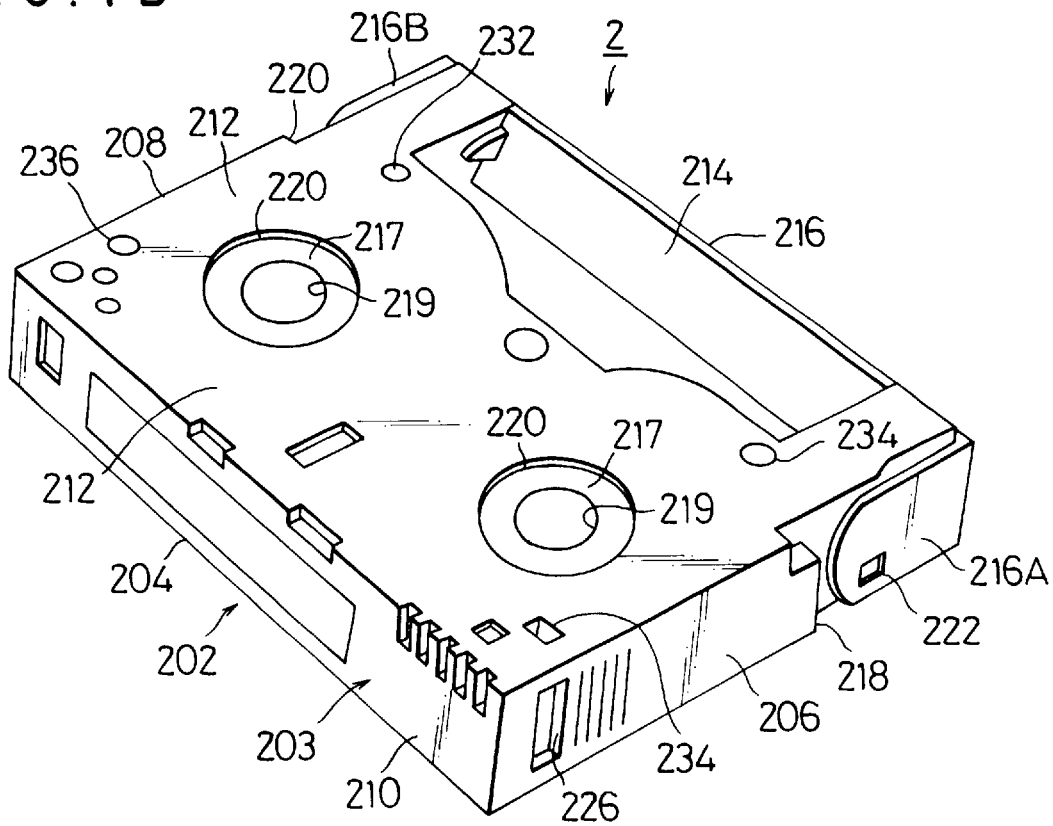

FIGS. 6A to 6E are outer appearance views of a tape cartridge, wherein FIG. 6A is a top plan view, FIG. 6B is a left side elevational view, FIG. 6C is a right side elevational view, FIG. 6D is a rear view and FIG. 6E is a bottom view. FIGS. 7A and 7B are perspective views for showing a tape cartridge, wherein FIG. 7A is a perspective view for showing a state shown from a slant upper part and FIG. 7B is a perspective view for showing a state shown from a slant lower part.

As shown in FIGS. 6A to 6E and FIGS. 7A and 7B, the tape cartridge 2 is composed of a case 202 and a magnetic recording tape (not shown) to be stored in the case. The case 202 has a width W in a lateral direction, a length L in a forward or rearward direction crossing at a right angle with the lateral direction and a thickness T in an upward or downward direction crossing at a right angle with the lateral direction and the forward or rearward direction, shows a substantial rectangular plate shape, wherein the width W in the lateral direction is formed to be larger than the length L in the forward or rearward direction.

The case 202 is composed of a case main body 203, a rear lid 214 and an opening or closing lid 216; the case main body 203 is composed of an upper surface 204, right and left side surfaces 206, 208 connected to both sides of the upper surface 204 in a width direction, a rear surface 210 connected to a rear side of the upper surface 204, and a lower surface 212 connecting the lower ends of the side surfaces 206, 208 and the rear surface 210; and the opening or closing lid 216 is constructed to open or close a segment enclosed by the upper surface 204 of the lid, the side surfaces 206, 208 and the front part of the lower surface 212.

Two reels 217 are spaced apart within the case main body 203 in the direction of the width W, wherein the magnetic recording tape passes through a space between the opening or closing lid 216 and the rear lid 214 and the magnetic tape is wound around the reels 217. Each of the bearings 219 for the two reels 217 is rotatably supported through holes 220 at the lower surface of the case 202, and the bearings 219 are exposed below the lower surface 212 of the case main body 203. The bearings 219 are provided with engagement segments integrally engaged with the reel shafts 1808 of the recording and reproducing mechanism 18 to be described later.

Figure 8:
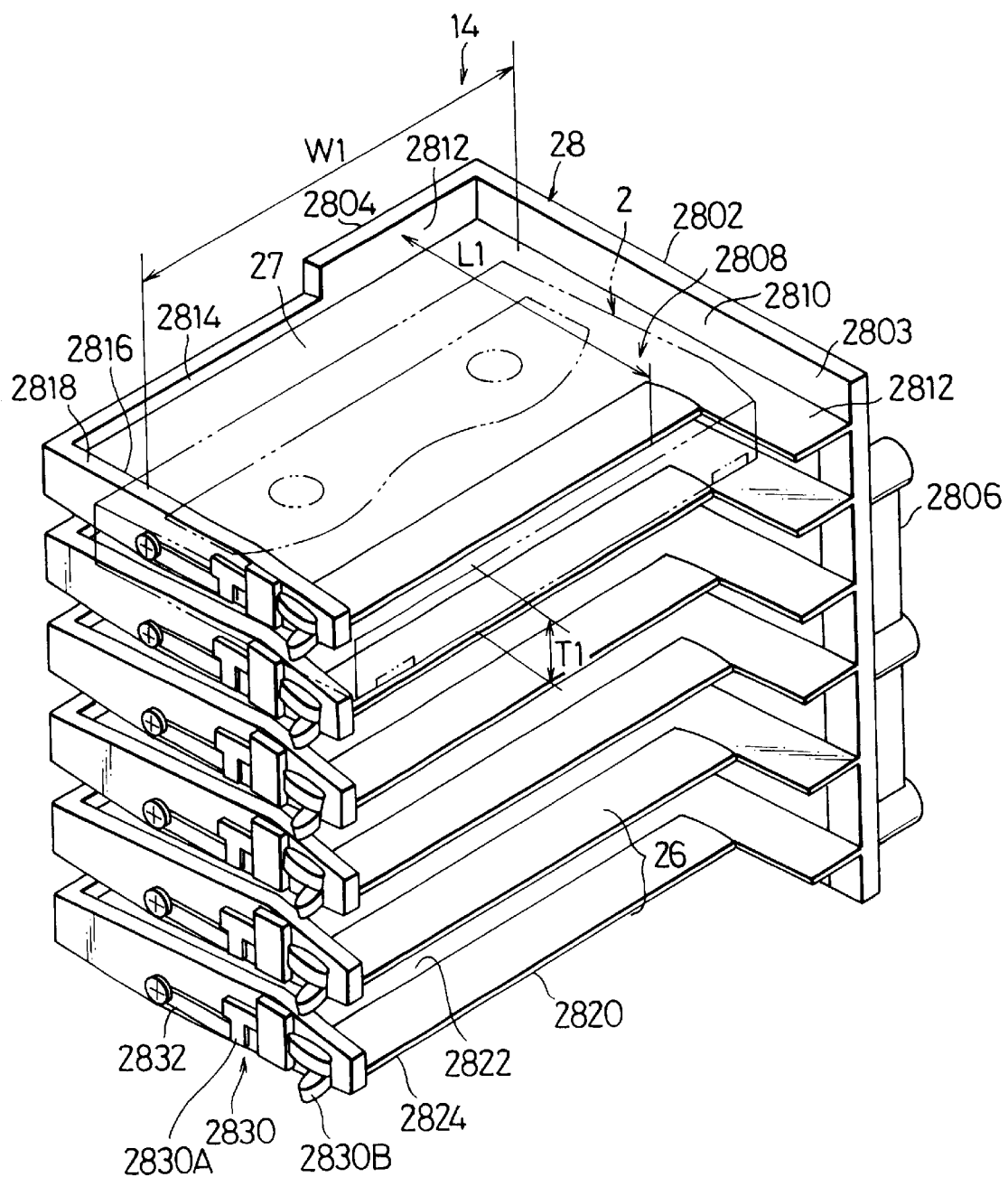
FIG. 8 is a perspective view for showing a magazine block constituting a first magazine from a slant upper part in regard to such a direction as one in which a tape cartridge can be inserted or taken out.

The opening or closing lid 216 is connected to side surfaces 206, 208 of the case main body 203 through two arms 216A, 216B in such a way that the lid can be turned. The opening or closing lid 216 covers the tape portion positioned at a tape running portion 214 under a closed state where it is positioned in front of the case main body 203 as shown in FIGS. 7A and 7B and FIG. 8. The opening or closing lid 216 causes the tape portion positioned at the tape running portion 214 to be exposed under an opened state in which it is oscillated upwardly of the case main body 208, and the opening or closing lid 216 is always biased to its closed state.

The tape cartridge 2 constructed as described above is similar to a data cartridge (an 8 mm data-cassette) commercially available in the prior art for use in recording data or a digital video tape cartridge for use in recording animations or sound, and these commercially available cartridges can be used. In the first preferred embodiment, a case in which the cartridge similar to the data cartridge 2 is used will be described.

The side surfaces 206, 208 having the arms 216A, 216B arranged there at are formed to be thin in such a way that the surfaces of the arms 216A, 216B and the surfaces of the side surfaces 206, 208 may be positioned on the same plane, and notches 218, 220 are formed between the base end surfaces of the arms 216A, 216B and the rear ends of the side surfaces 206, 208 formed to be thin in wall thickness.

In addition, the arms 216A, 216B of the lid member 216 are formed with holes 222, 224 passing through its thickness direction.

In addition, the locations at the side walls 206, 208 near their rear portions are formed with notch grooves 226, 228 having a V-shaped section extending in an upward or downward direction.

In addition, two locations near the rear surface 210 of the four corner locations at the lower surface are provided with position setting holes 234, 236 for setting position when this tape cartridge 2 is loaded in the recording and reproducing mechanism 18.

In addition, the attitude of the tape cartridge 2 is set in such a way that it can be discriminated under an orientation of two directions to be crossed to each other at a right angle (for example, a forward or rearward direction and a lateral direction, or an upward or downward direction and a lateral direction), and an attitude when the tape cartridge 2 is loaded in the recording and reproducing mechanism is specified under the orientation of the two directions.

Then, the casing 12 will be described as follows.

As shown in FIGS. 1 to 5, the casing 12 is constructed to have a rectangular plate-like bottom wall 1202 having a width in a lateral direction and having a length in a forward or rearward direction; right and left side walls 1204, 1206 raised from both ends of the bottom wall 1202 in a width direction; right and left rear walls 1208 raised from the right and left rear edges of the bottom wall 1202; an upper wall 1212 connecting upper ends of these side walls 1204, 1206 and rear wall 1208; a left side reinforcing plate 1214 for connecting the left side of the front edge of the bottom wall 1202 with the front edge of the left side wall 1204; and a right side reinforcing plate 1216 for use in connecting the right side part of the front edge of the bottom wall 1202 with the front edge of the right side wall 1206.

Then, the first magazine 14 and the second magazine 16 will be described as follows.

As shown in FIG. 1, the first magazine 14 and second magazine 16 are constructed such that a plurality of storing members 26 for storing the tape cartridges 2 in such a way that they can be inserted into or taken out are arranged in a linear manner and they are formed in a longitudinal upward or downward direction.

The first magazine 14 and second magazine 16 are spaced apart in a lateral direction within the casing 12 in such a way that their longitudinal directions may become in parallel to each other, and a transferring space 17 extending along the longitudinal direction, i.e. the upward or downward direction of these first magazine 14 and second magazine 16 is provided between these first magazine 14 and second magazine 16.

In the following description, a magazine block 28 constituting the first magazine 14 will be described.

Figure 9:
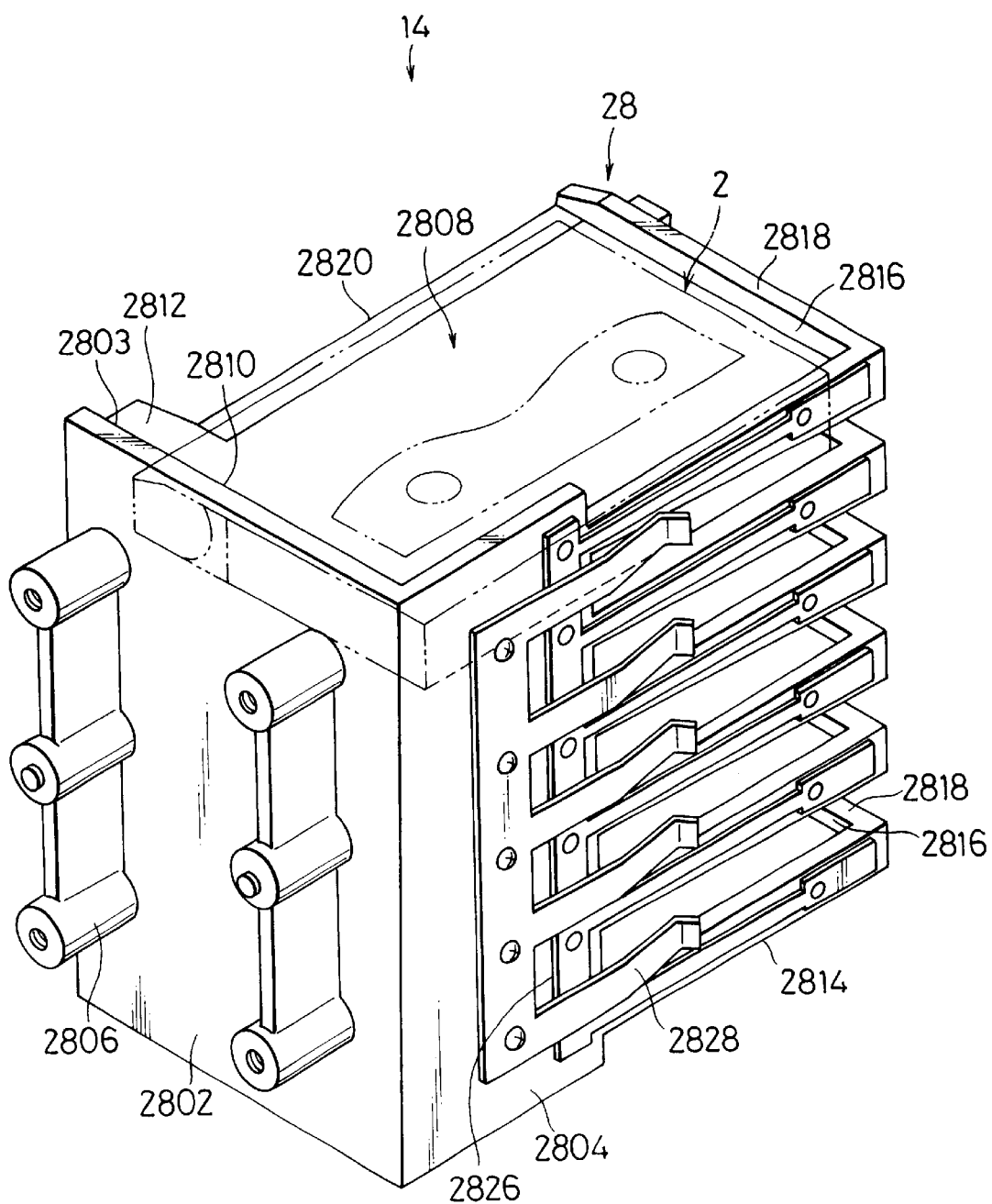
FIG. 9 is a perspective view for showing a magazine block shown in FIG. 8 under a state in which the magazine block is rotated by 180° around a vertical axis.
Figure 10:
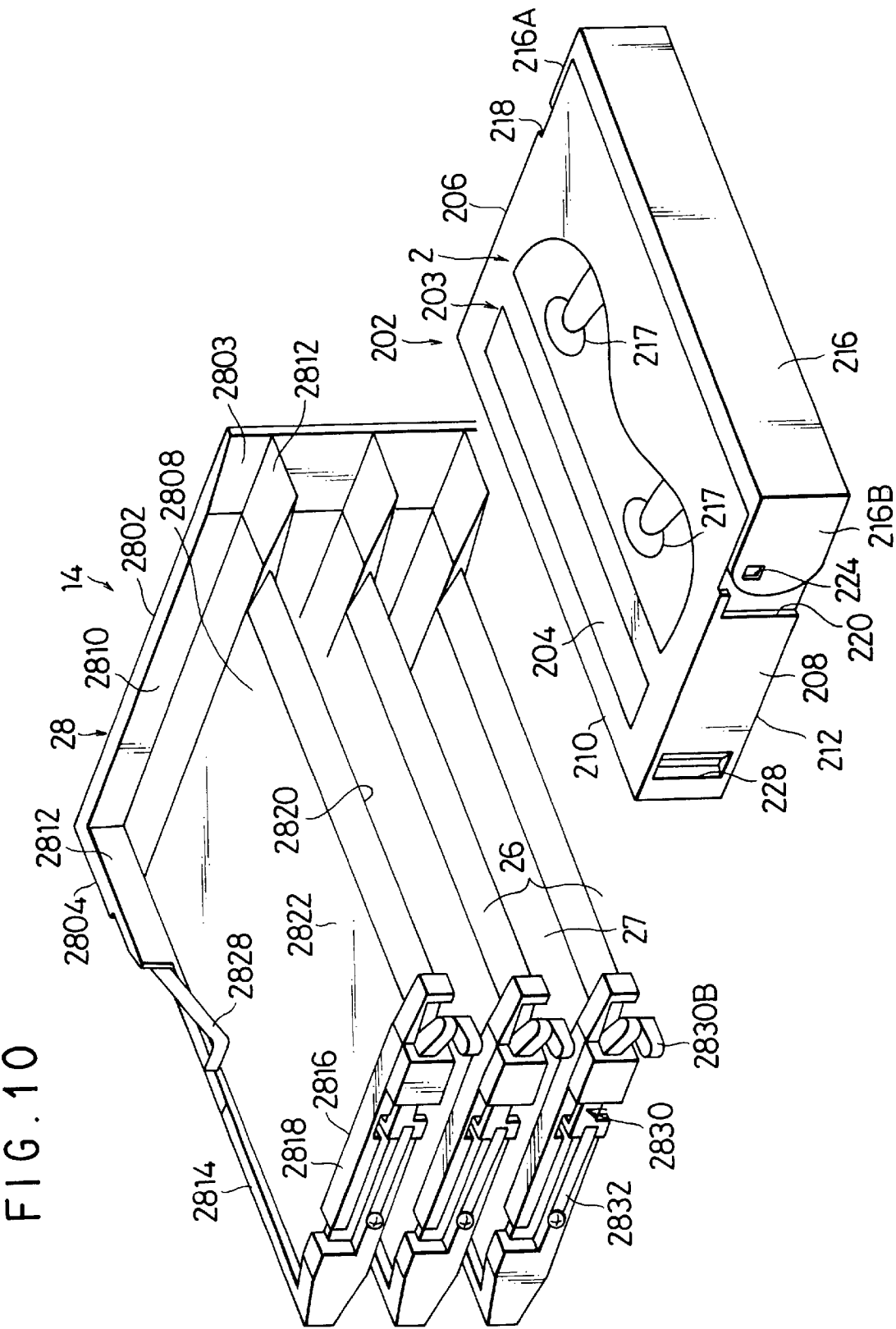
FIG. 10 is a perspective view for showing a positional relation between the magazine block and the tape cartridge.
Figure 11:
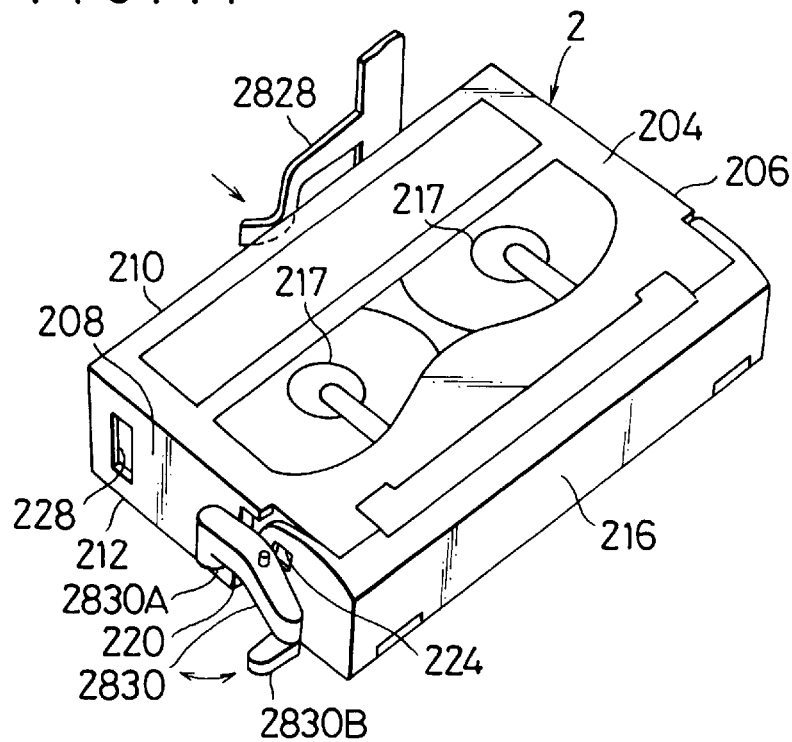
FIG. 11 is a perspective view for showing a state in which a tape cartridge is stored in a magazine block constituting a first magazine.

As shown in FIGS. 8 to 10, each of the storing members 26 is integrally arranged with the magazine block 28.

The magazine block 28 is composed of a rectangular plate-like fixing plate 2802; a plurality of supporting pieces 2808 spaced apart in an upward or downward direction and protruded at one surface of the fixing plate 2802 and protruded; and a fixing leg 2806 arranged at the other surface of the fixing plate 2802, wherein the base ends of the plurality of supporting pieces 2808 are raised from the edge part at one surface of the fixing plate 2802, integrally formed with a reinforcing plate 2804 extending in an upward or downward direction and reinforced by it.

The magazine block 28 is made such that the fixing leg 2806 is fixed to the front surface of the rear wall 1208 of the casing 12 by screws and arranged at the casing 12, thereby a plurality of supporting pieces 2808 are protruded in a horizontal state at the inner right and left sides of the casing 12 from the rear part toward the forward part.

The storing member 26 is constituted by the two adjoining upper and lower supporting pieces 2808, wherein there is provided a storing space 27 for storing the tape cartridge 2 in such a way that the tape cartridge can be inserted into or taken out of between the upper and lower two supporting pieces 2808, and the storing space 27 is formed such that the front side, right and left side portions are released to open.

Then, as shown in FIGS. 1 and 2, at the first magazine 14, the tape cartridge 2 is stored in each of the storing spaces 27 with the opening or closing lid 216 being adjacent to the transferring space 17, and at the second magazine 16, the tape cartridge 2 is stored in each of the storing spaces 27 under a state in which the rear surface 210 is adjacent to the transferring space 17.

As shown in FIGS. 8 to 10, each of the supporting pieces 2808 forms a substantial rectangular plate shape as viewed in its top plan view, wherein each of the supporting pieces 2808 has an upper surface 2822 and a lower surface 2824, and a clearance T1 slightly larger than a thickness T of the tape cartridge 2 is formed between the upper surface 2822 and the lower surface 2824 of the adjoining supporting pieces 2808 adjacent to each other in an upward or downward direction. Then, when the tape cartridge 2 is transferred between the transferring space 17 and the storing space 27, they may act as guide surfaces.

In the four sides of each of the supporting pieces 2808, a side adjacent to the rear wall 1208 of the casing 12 is provided with a side edge 2810; a side adjacent to the left side wall 1204 (or the right side wall 1206) of the casing 12 is provided with a side edge 2812; a side adjacent to the front part of the casing 12 is provided with a side edge 2816 opposing against the side edge 2810; and a side adjacent to the transferring space 17 is provided with a side edge 2820, respectively.

Then, each of the side edges 2810 of all the supporting pieces 2808 is composed of a fixing plate 2802 and each of the supporting pieces 2808 is integrally connected by the fixing plate 2802. In addition, about ⅓ of each of the side edges 2812 is constituted by a holding plate 2804 connected to the fixing plate 2802, and each of the supporting pieces 2808 is also integrally connected by the reinforcing plate 2804.

In the first preferred embodiment, due to the fact that about ⅓ of the side edge 281 is constituted by the reinforcing plate 2804, each of the supporting pieces 2808 is supported in a cantilever manner by the fixing plate 2802 and the reinforcing plate 2804.

At the part of the side edge 2812 not constituted by the reinforcing plate 2804, a wall part 2814 protruded in an upward or downward direction in a thickness direction of the supporting piece 2808 is provided to extend along the side edge 2812. The side edge 2812 including this wall 2814 abuts against the rear surface 210 of the tape cartridge 2 to prevent it from being dropped out of the storing space 27 when the tape cartridge 2 is transferred from the transferring space 17 to the storing space 27.

The side edge 2816 is composed of a wall part 2818 protruded in an upward or downward direction of thickness of the supporting piece 2808 and extended to be formed. This wall part 2818 may act as a guide wall for guiding a side surface 208 of the tape cartridge 2 when the tape cartridge 2 is transferred between the transferring space 17 and the storing space 27, and concurrently it may abut against the side surface 208 of the tape cartridge 2 to prevent it from being dropped out of the storing space 27.

The surface in the wall part 2818 facing against the storing space 27 and further facing against the transferring space 17 is formed with a taper gradually spaced apart from the side edge 2810 as it directs toward the transferring space 17 so as to perform a smooth guiding of the side surface 208 of the tape cartridge 2 when the tape cartridge 2 is inserted from the transferring space 17 to the storing space 27.

The side edge 2820 is set such that each of its upper and lower surfaces is formed with a taper surface in such a way that its wall thickness is made thin as it faces toward the transferring space 17 so as to perform a smooth guiding of either the upper surface 204 or the lower surface 212 of the tape cartridge 2 inserted from the transferring space 17 to the storing space 27.

In addition, a part in the side edge 2820 near the fixing plate 2802 is formed as a protrusion 2812 protruded toward the transferring space 17, and this protrusion 2812 is set such that each of its upper and lower surfaces is formed with a taper surface in such a way that its wall thickness is made thin as it faces toward the transferring space 17 so as to perform a smooth guiding of either the upper surface 204 or the lower surface 212 of the tape cartridge 2 transferred between the transferring space 17 to the storing space 27.

The side edge 2810, i.e. the fixing plate 2802 may act as a guide wall for guiding the side surface 206 of the tape cartridge 2 transferred between the transferring space 17 and the storing space 27 and concurrently abut against the side surface 206 of the tape cartridge 2 to prevent it from being dropped out of the storing space 27.

In addition, the side edge 2803 in the fixing plate 2802 adjacent to the transferring space 17 extends up to the same position as that of the protrusion 2812, and the side edge 2803 is formed with a taper surface gradually spaced apart from the side edge 2816 as it faces toward the transferring space 17 so as to perform a smooth guiding of the side surface 206 of the tape cartridge 2 inserted from the transferring space 17 into the storing space 27.

Then, as shown in FIG. 8, a width W1 ranging from the fixing plate 2802 to the wall part 2818 becomes approximately equal to the width W of the case 202 of the tape cartridge 2 and a length L1 ranging from the wall part 2814 to the side edge 2820 becomes approximately equal to the length L of the case 202 of the tape cartridge 2, thereby the tape cartridge 2 can be smoothly loaded into or unloaded out of the storing space 27, resulting in that the tape cartridge can be stored without any looseness. Further, a clearance is formed between the walls 2814 of adjoining upper and lower supporting pieces 2808, between the walls 2818 and between the side edges 2820.

In addition, as shown in FIG. 9, a comb-like reinforcing member 2826 composed of a metallic plate, for example, is arranged over an outer surface of the reinforcing plate 2804 and an outer surface of the wall part 2814 of the supporting pieces 2808. This reinforcing member 2826 is fixed to the reinforcing plate 2804 and the wall part 2814 of each of the supporting pieces 2808 by a fixing means such as a screw and the like. This reinforcing member 2826 may act to prevent the supporting pieces 2808 from being flexed.

In addition, the outer surface of the reinforcing plate 2804 is provided with a biasing member 2828 abutted against the rear surface 210 of the case 202 of the tape cartridge 2 stored in the storing space 27 and biasing the tape cartridge 2 from the storing member 26 toward the transferring space 17.

As shown in FIGS. 8 to 11, the wall part 2818 is provided with an engagement member 2830 and a biasing member 2832. The engagement member 2830 is provided with an engagement claw 2830A which can be engaged with or disengaged from the notch 220 of the tape cartridge 2 at its one end, and with a pressing protrusion 2830B to be depressed to release the engaged state of the engagement claw 2830A at the other end of it, it is arranged to the wall part 2818 in such a way that it can be oscillated with these central portions being applied as fulcrum point. The biasing member 2832 is constructed to cause the engagement claw 2830A to be biased in an engaging direction.

The tape cartridge 2 is stored and held at the storing member 26 while the notch 220 of the tape cartridge 2 is engaged with the engagement member 2830 under a state in which the rear surface 210 is being abutted against the biasing member 2828 when the tape cartridge 2 is inserted from the transferring space 17 into the storing space 27. As the depressing protrusion 2830B is pushed from this state, the engagement between the engagement part 2830 and the notch 220 is released and the tape cartridge 2 slightly slides toward the transferring space 17 by the biasing member 2828.

Then, the tape cartridge 2 stored in the storing space 27 is set such that each of the upper surface 204 and the lower surface 212 is abutted against each of the lower surface 2824 and the upper surface 2822 of adjoining supporting pieces 2808 to cause its position in an upward or downward direction to be set under a state in which the upper surface 204 and the lower surface 212 are extended along a horizontal direction in the storing space 27, wherein each of the side surfaces 206, 208 is abutted against each of the fixing plate 2802 and the wall part 2818 to cause its position in a width direction to be set, the notch part 220 of the tape cartridge 2 biased by the biasing member 2828 is engaged with the engagement member 2830 to cause its position in forward or rearward direction to be set. In addition, a slight clearance is formed between the rear surface 210 of the tape cartridge 2 and the wall part 2814 of the magazine block 28 under a state in which its position in its forward or rearward direction is set.

Figure 12:
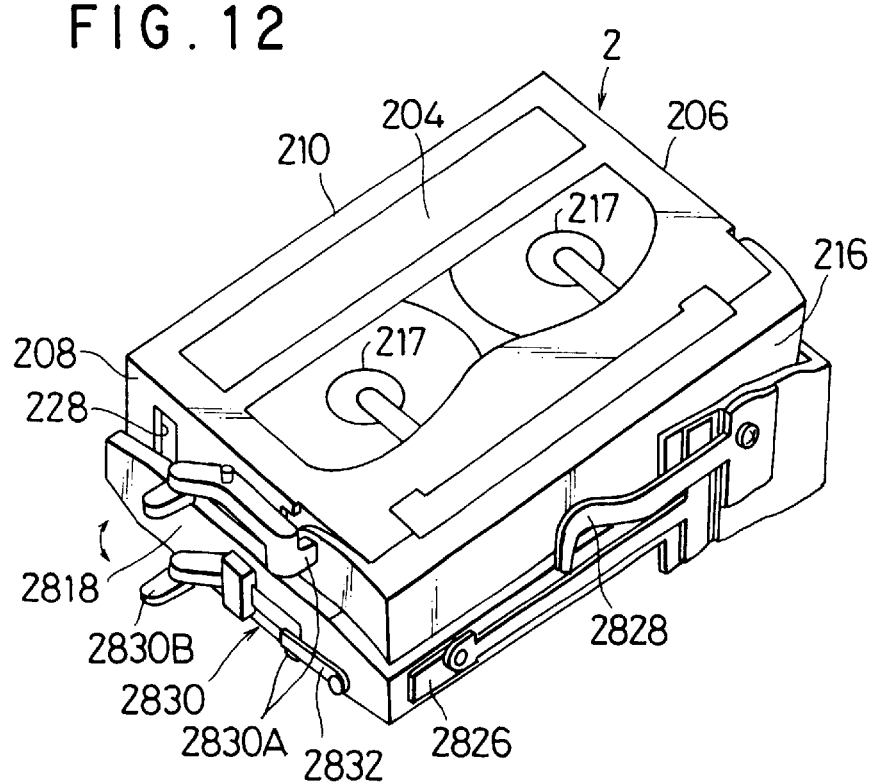
FIG. 12 is a perspective view for showing a state in which a tape cartridge is stored in a magazine block constituting a second magazine.
Figure 13:
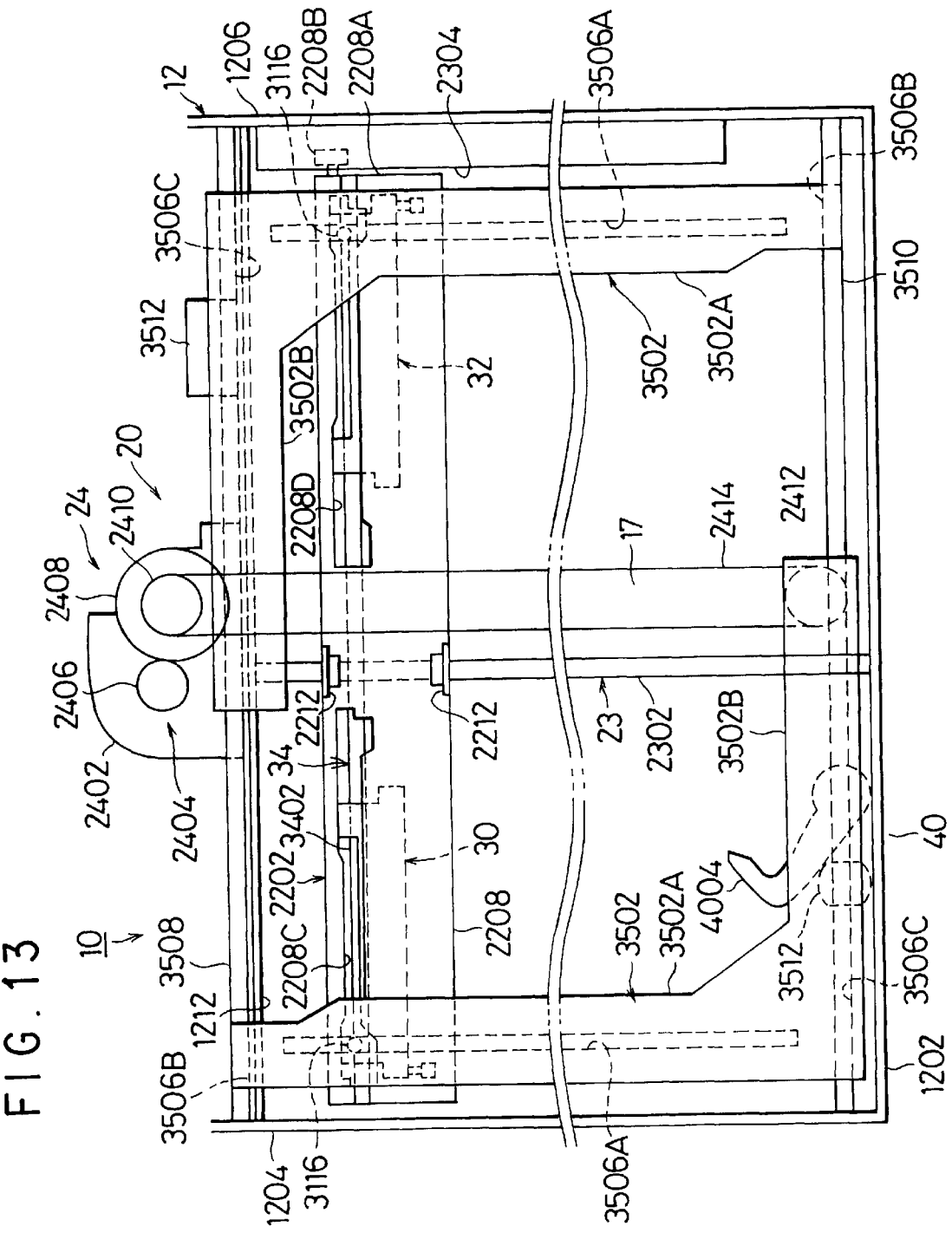
FIG. 13 is a front elevational view for illustrating configurations of the first and second magazines, moving mechanism, delivering mechanism and lock mechanism.
Figure 14:
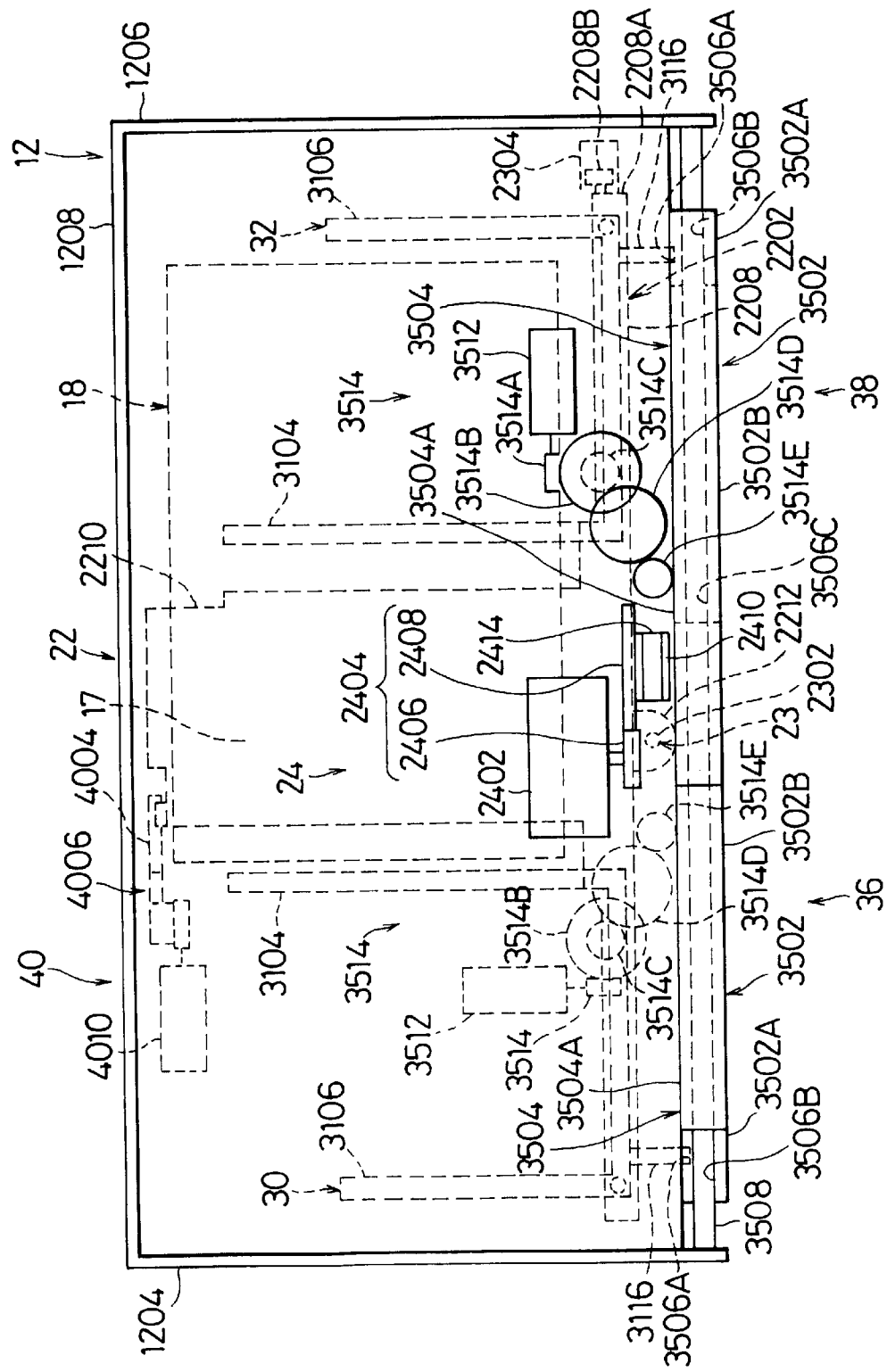
Figure 15:
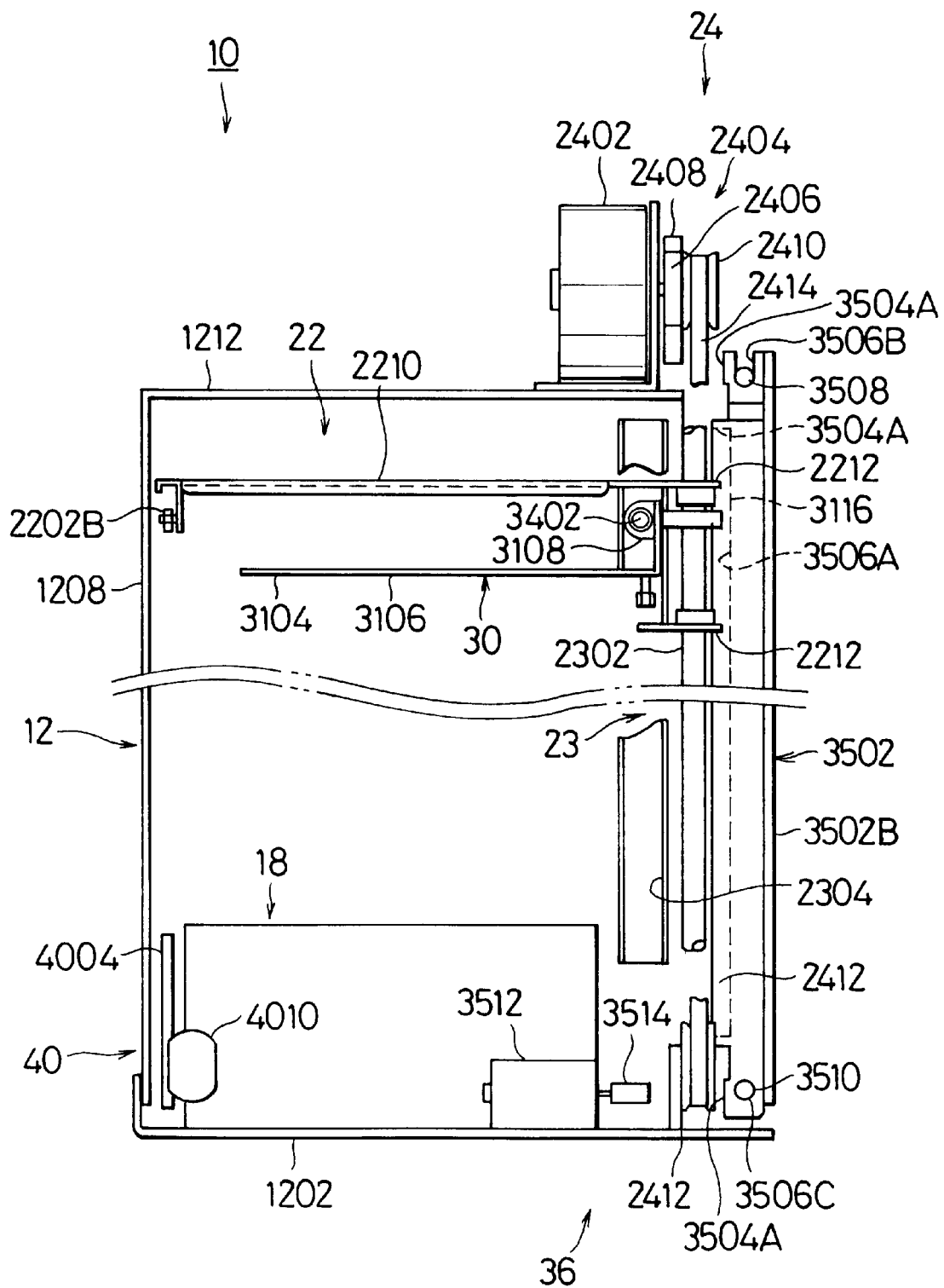
Figure 16:
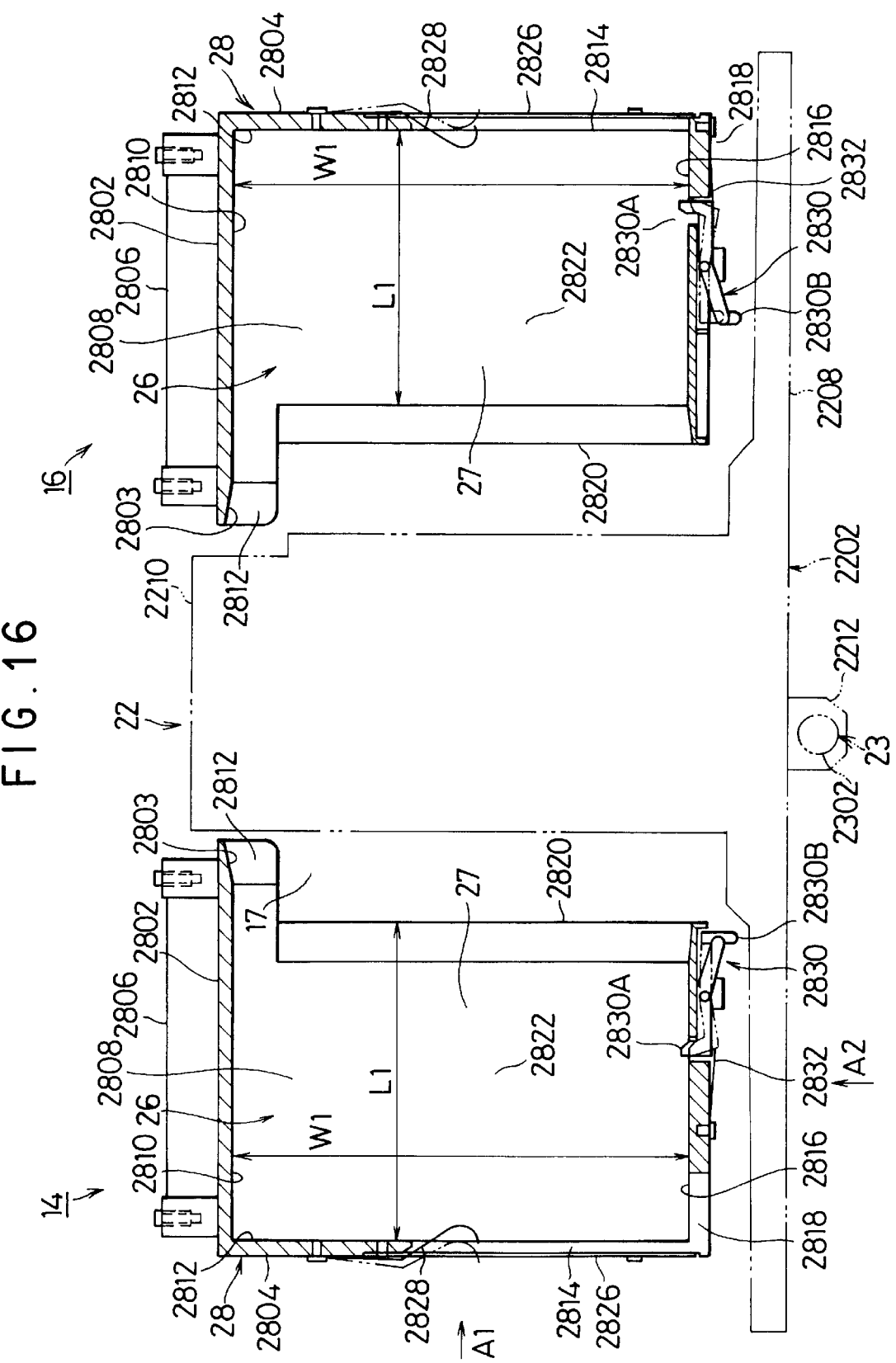
FIG. 16 is a top plan view for illustrating a positional relation among the first and second magazines and the holding part.
Figure 17:
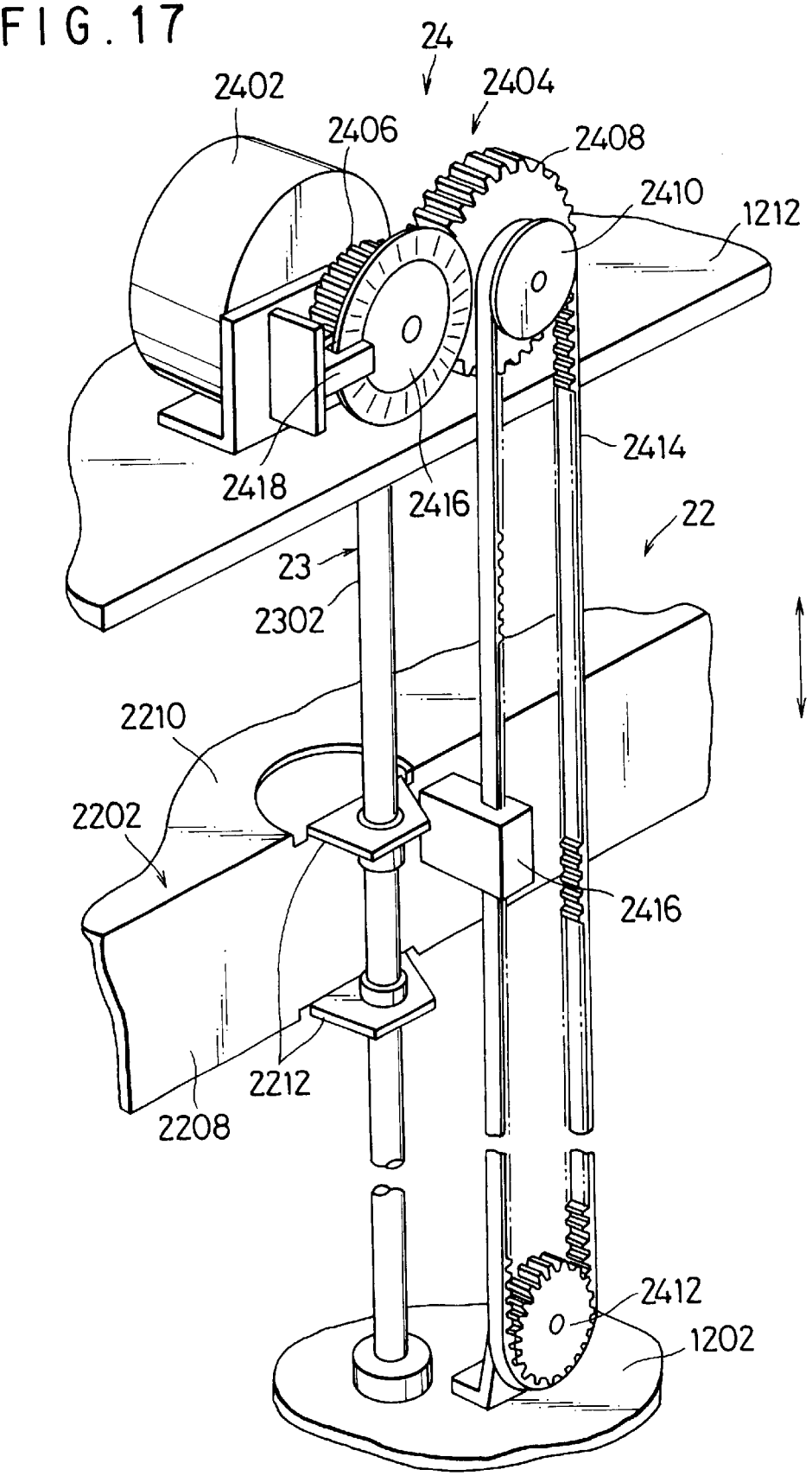
FIG. 17 is a perspective view for showing a configuration of a driving part of the moving mechanism.

Since the second magazine 16 has a substantial same configuration as that of the first magazine 14, description concerning the common components will be eliminated. As shown in FIG. 12, the part where the second magazine 16 is different from the first magazine 14 consists in the arrangement in which the tape cartridge 2 stored in the storing member 26 of the second magazine 16 has its rear surface 210 arranged adjacent to the transferring space 17, so that the engagement member 2830 is engaged with the hole 224 of the opening or closing lid 216 of the tape cartridge 2 and the biasing member 2828 abuts against the opening or closing lid 216 of the tape cartridge 2 to cause the tape cartridge 2 to be biased from the storing space 27 toward the transferring space 17.

In addition, as apparent from the fact that the tape cartridge 2 stored in the first magazine 14 has the opening or closing lid 216 placed adjacent to the transferring space 17 and the tape cartridge 2 stored in the second magazine 16 has the rear surface 210 placed adjacent to the transferring space 17, the positional relations of the opening or closing lid 216 and the rear surface 210 of the tape cartridge 2 stored in the first magazine 14 and the second magazine 16 are kept same and in other words, when it is seen from the front side of the casing 12, both the tape cartridge 2 stored in the first magazine 14 and the tape cartridge 2 stored in the second magazine 16 are set such that their opening or closing lids 216 are positioned at the right side.

As shown in FIG. 1, in the case of the first preferred embodiment, there are provided storing members 26 in such a way that eleven tape cartridges 2 can be stored in the first magazine 14, and ten tape cartridges 2 can be stored in the second magazine 16.

The first magazine 14 and the second magazine 16 are constructed such that the center position in a thickness direction and the center position in a width direction of the tape cartridge 2 stored in each of the storing members 26 are coincided to each other.

Next, the moving mechanism 20 will be described as follows.

As shown in FIGS. 13 to 17, the moving mechanism 20 is composed of a holding part 22 for holding the tape cartridge 2 and moving it up and down at the transferring space 17, a guide part 23 for guiding the holding part 22 and a driving part 24 for moving the holding part 22.

The guiding part 23 is constructed to include a first rod 2302 and a guide rail 2304 and the like.

The first rod 2302 has both ends fixed at the lateral central part in front of the upper wall 1212 and the bottom wall 1202 of the casing 12 and is extended in an upward or downward direction.

The guide rail 2304 is arranged to be extended in an upward or downward direction inside the front part of the side wall 1206.

Figure 23:
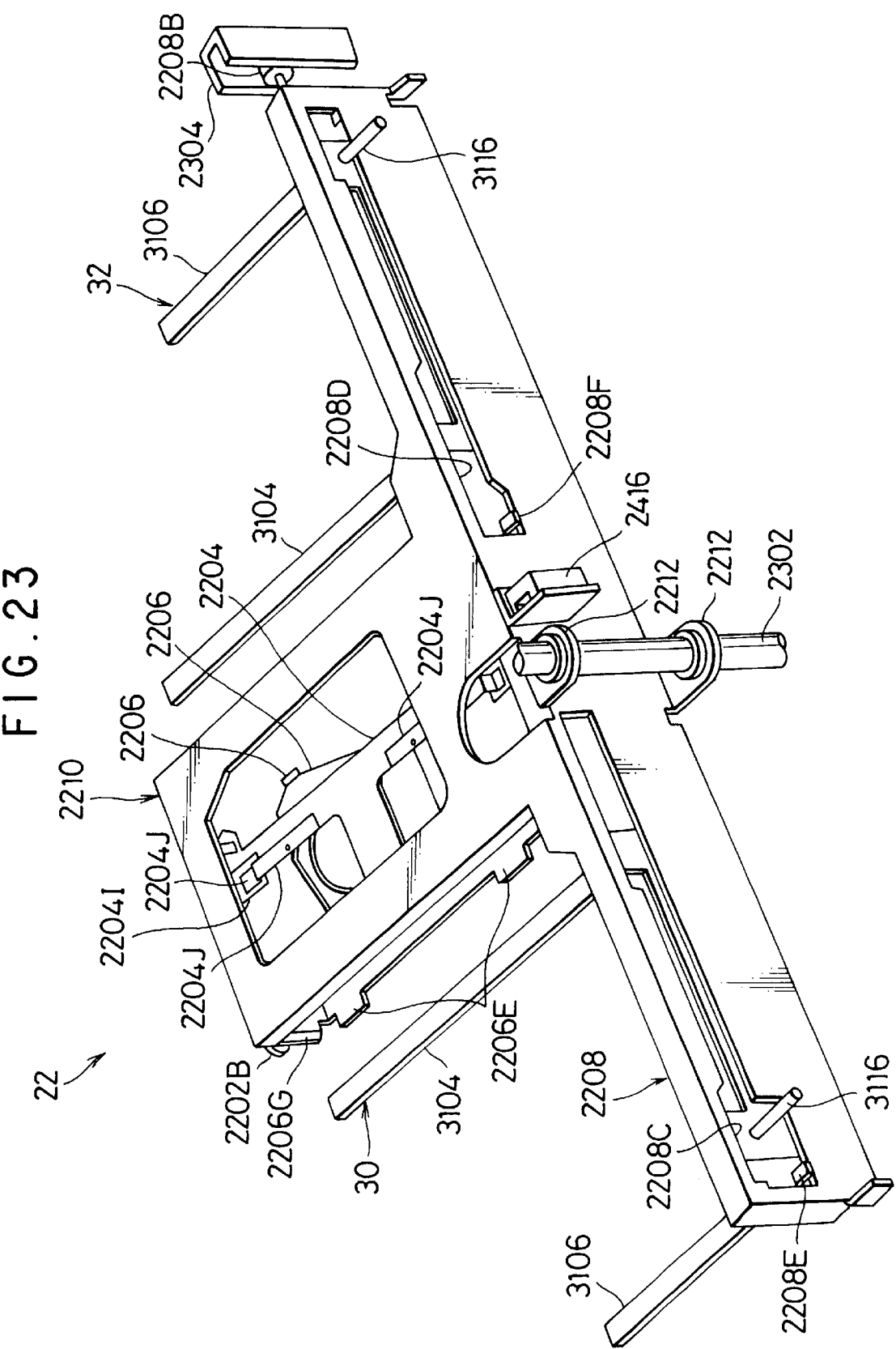
FIG. 23 is a perspective view for showing a state in which a biasing means in FIG. 22 is removed.
Figure 24:
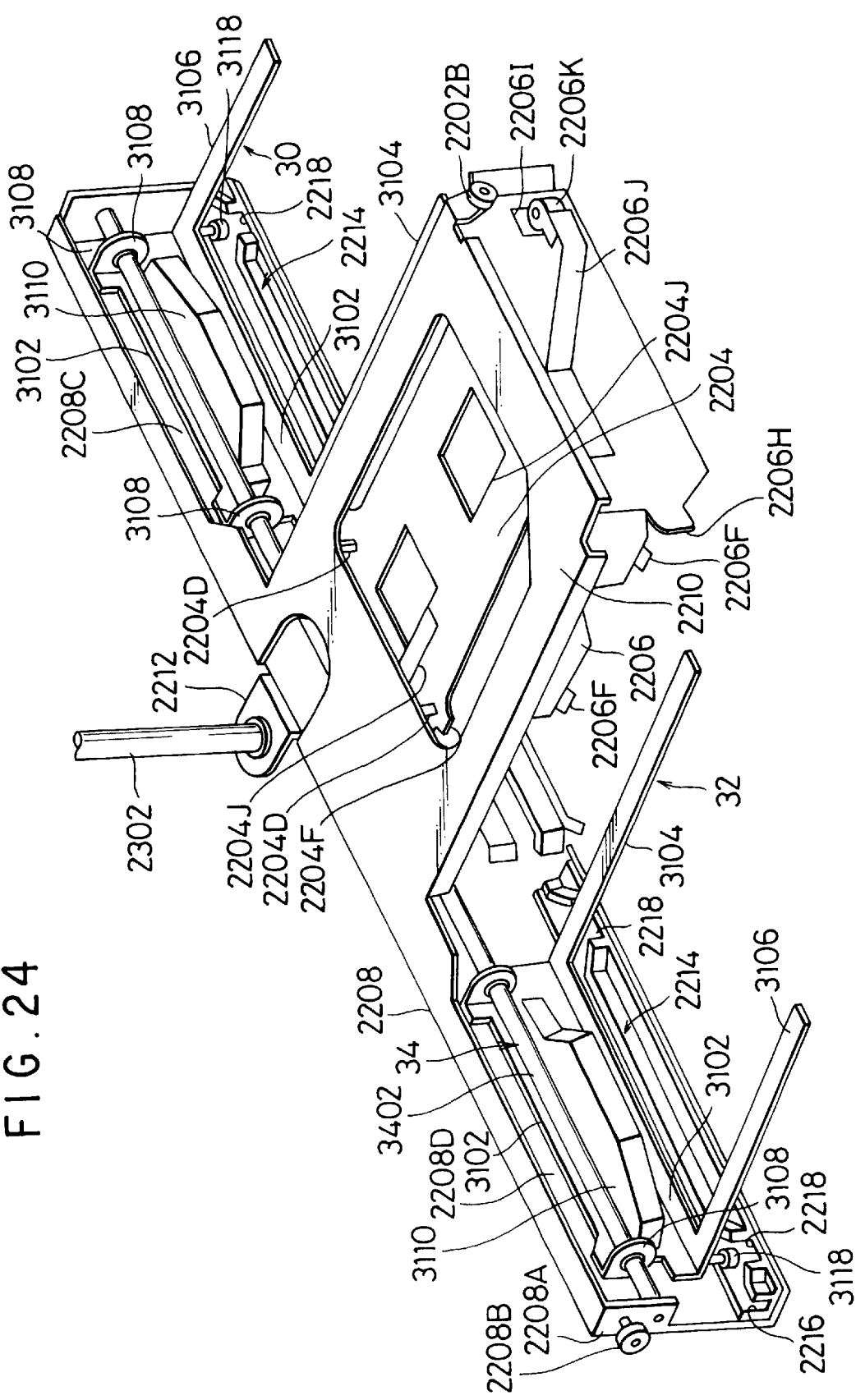
FIG. 24 is a perspective view for showing a state in which the moving mechanism and a part of the delivering mechanism are seen from a slant rearward direction.
Figure 25:
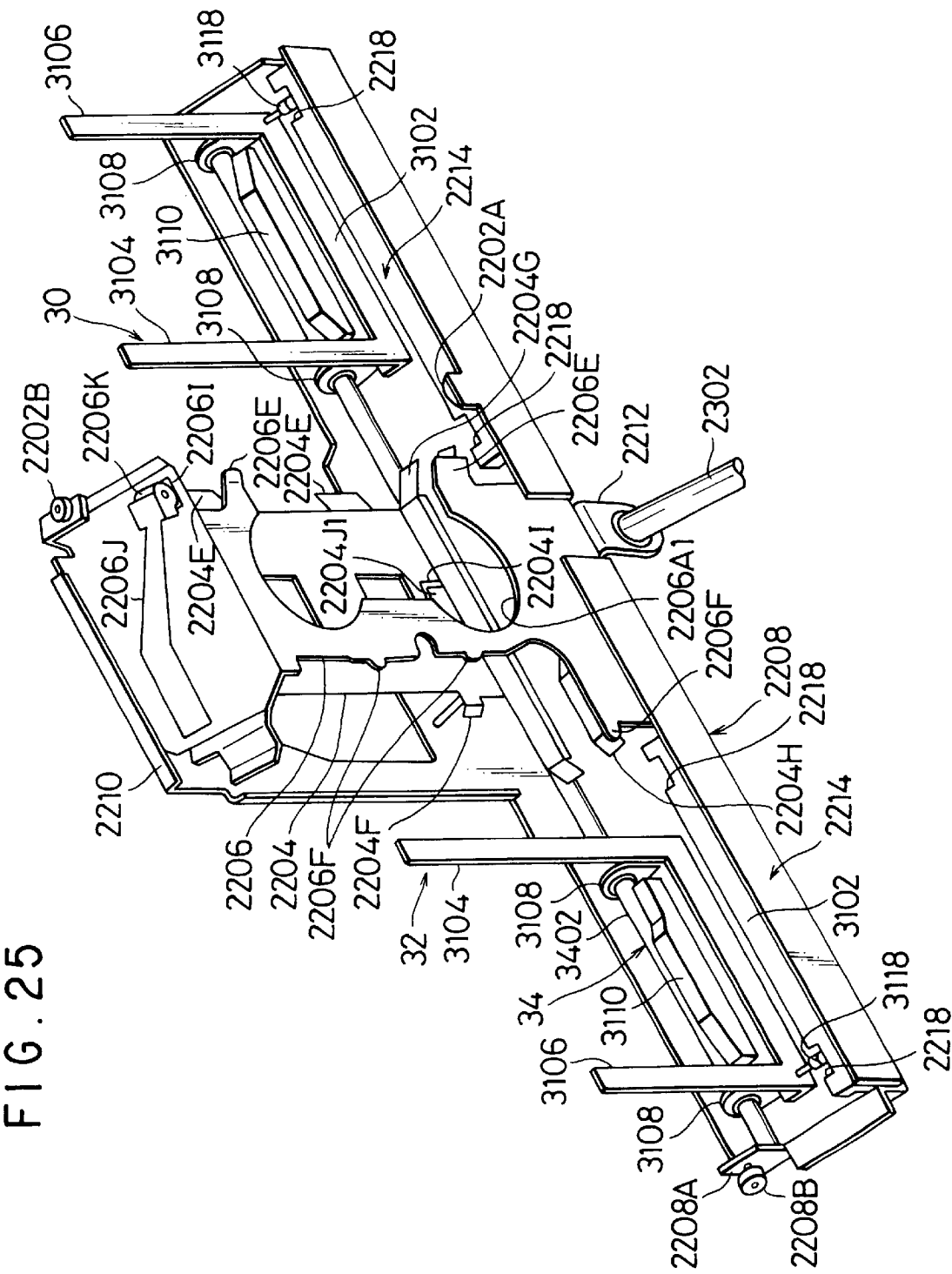
FIG. 25 is a perspective view for showing a state in which the moving mechanism and a part of the delivering mechanism are seen from a slant downward direction.
Figure 26:
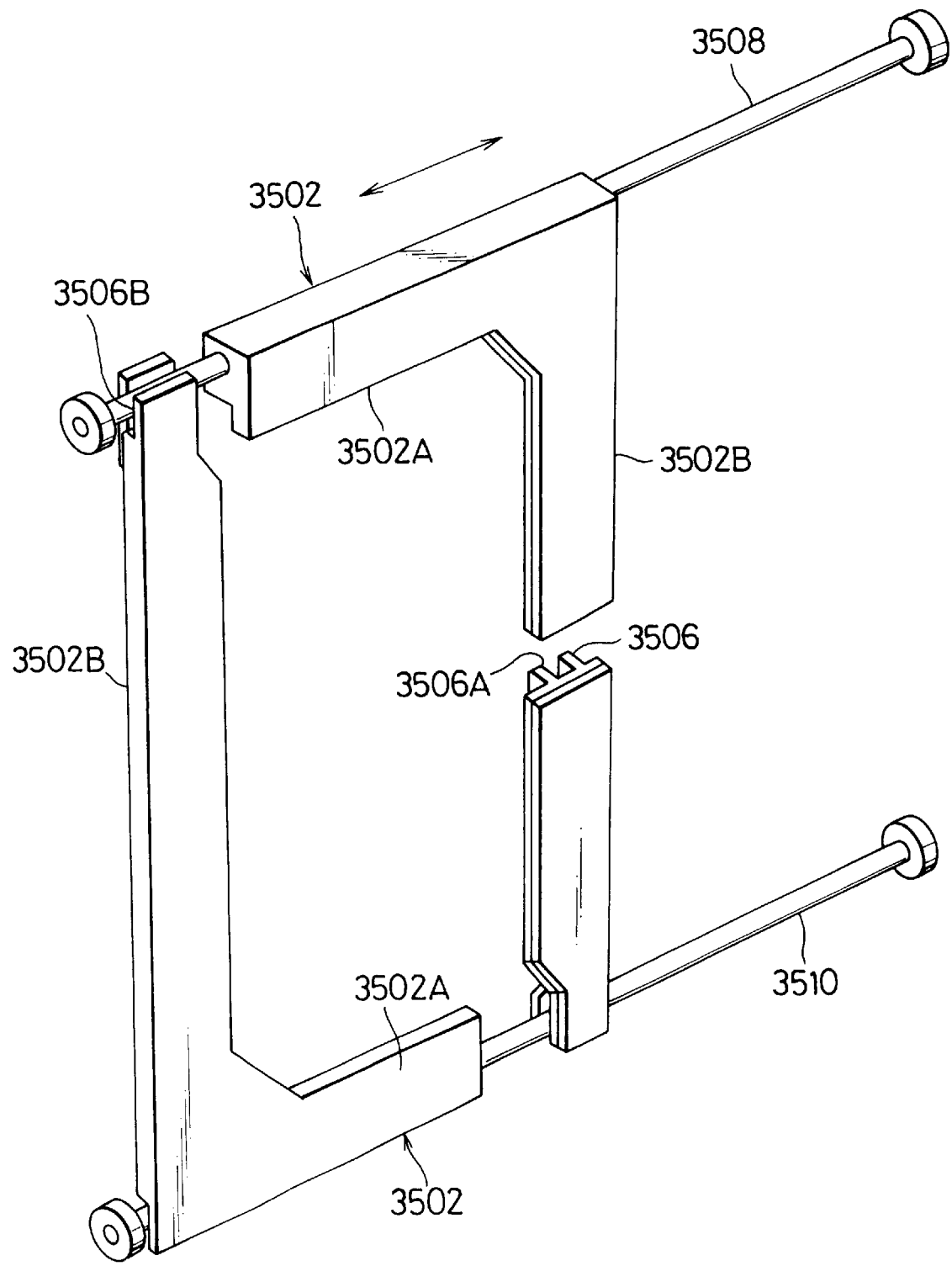
FIG. 26 is a schematic perspective view for showing configurations of two slide members, the third and fourth rods.

As shown in FIGS. 23 to 25, the holding part 22 is composed of a main body piece 2210 of a frame 2202, a first holding plate 2204 and a second holding plate 2206 and the like.

Figure 19:
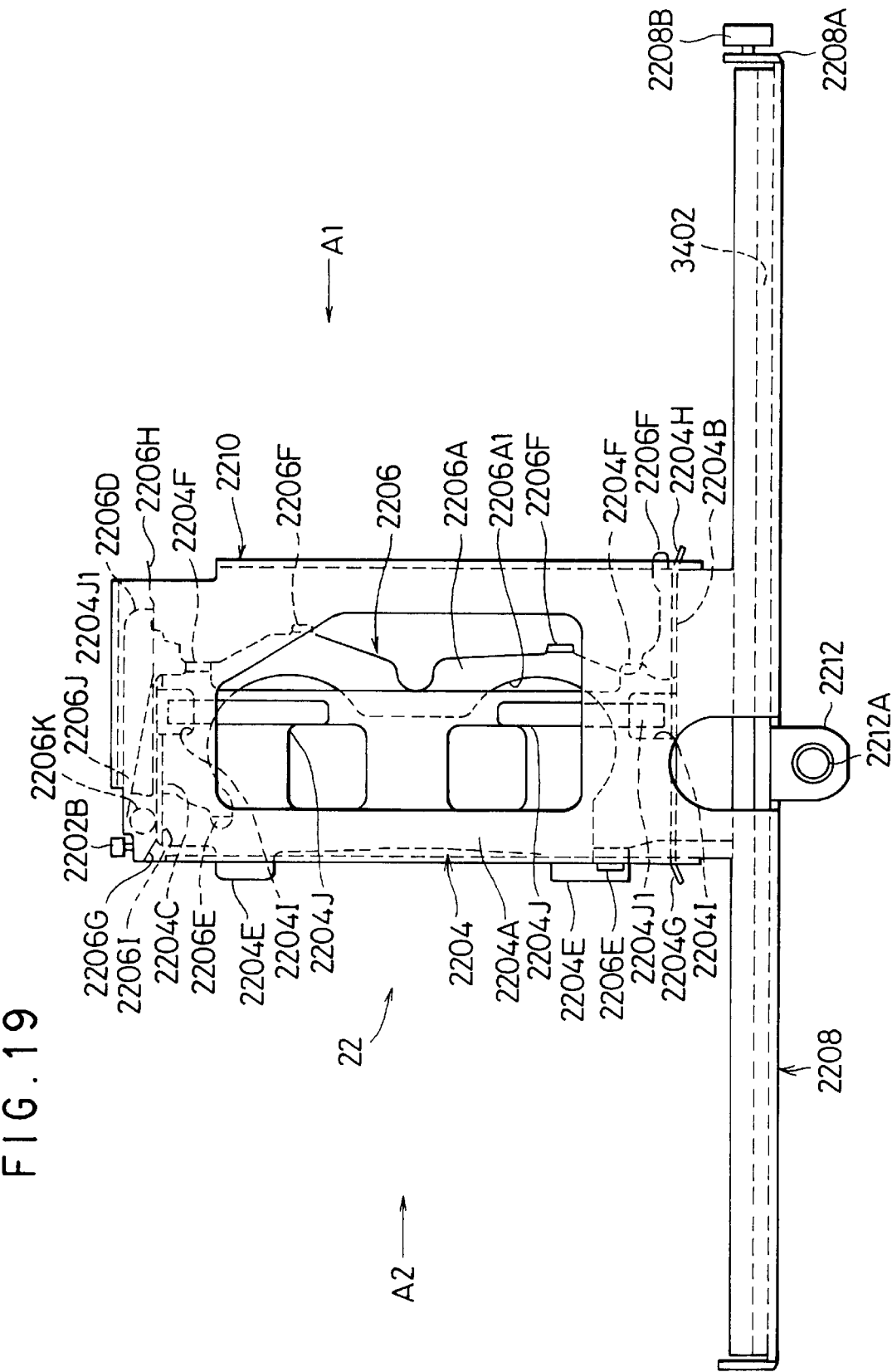
FIG. 19 is a top plan view for showing a configuration of a part of the moving mechanism.

As shown in FIG. 19, the frame 2202 is composed of a lateral piece part 2208, a main body piece part 2210 and connecting pieces 2212.

The lateral piece part 2208 is arranged to extend between the right and left side walls 1204, 1206 of the casing 12, the main body piece part 2210 is extended from the intermediate location in a longitudinal direction of the upper edge of the lateral piece part 2208 in a horizontal direction to form a rectangular plate toward into the transferring space 17, the connecting piece part 2212 is protruded from the lateral piece part 2208 positioned at the rear part of the main body piece 2210, and two connecting pieces 2212 are arranged to be spaced apart in an upward or downward direction.

Figure 18:
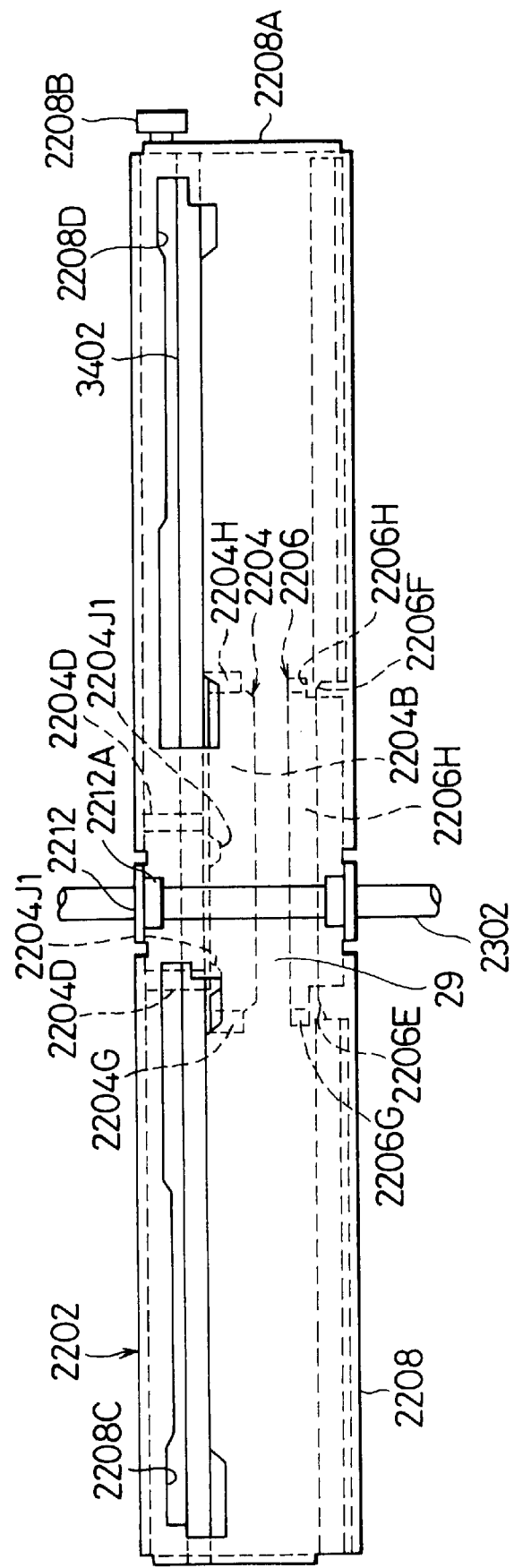
FIG. 18 is a front elevational view for showing a configuration of a part of the moving mechanism.
Figure 22:
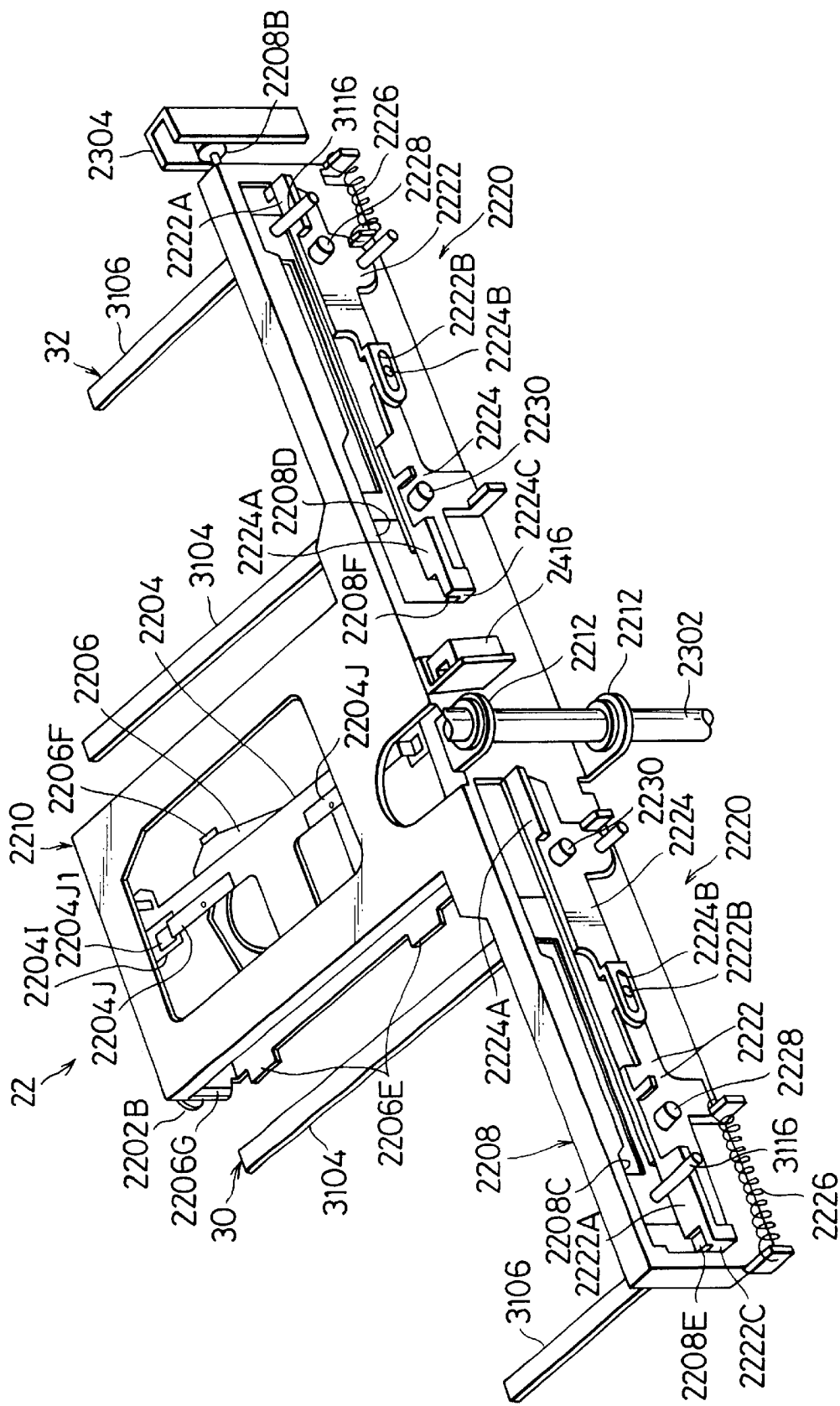
FIG. 22 is a perspective view for showing a state in which the moving mechanism and a part of the delivering mechanism are seen from a slant forward direction.

One end 2208A of the lateral piece 2208 in its extending direction is provided with a roller 2208B, and this roller 2208B is movably connected to the guide rail 2304 as shown in FIGS. 22 and 23. In addition, as shown in FIG. 18, each of metallic bearings 2212A is fixed to each of the upper and lower connecting pieces 2212, and the first rod 2302 is slidably coupled to these metallic bearings 2212A. Accordingly, the roller 2208B is coupled to the guide rail 2304 and the metallic bearing 2212A is coupled to the first rod 2302, thereby the holding part 22 is arranged while keeping its horizontal state within the casing 12 in such a way that it can be moved up and down.

In addition, the lateral piece 2208 is provided with two grooves 2208C, 2208D at symmetrical positions with its extending direction being applied as a center. The two grooves 2208C, 2208D extend in an extending direction of the lateral piece 2208, i.e. the lateral direction and are arranged to pass through toward a thickness direction of the lateral piece 2208.

The main body piece 2210 is extended to form a rectangular plate shape from the intermediate location of the upper edge of the lateral piece 2208 in a longitudinal direction and a width in lateral direction of the main body piece 2210 is formed to be smaller than a lateral width of the transferring space 17.

In addition, as shown in FIG. 25, each of the location at the lower edge of the lateral piece 2208 and the location opposite to the lateral piece 2208 of the main body piece 2210 is provided with the engaged segments 2202A, 2202B engaged with the lock mechanism 40 to be described later.

Figure 20:
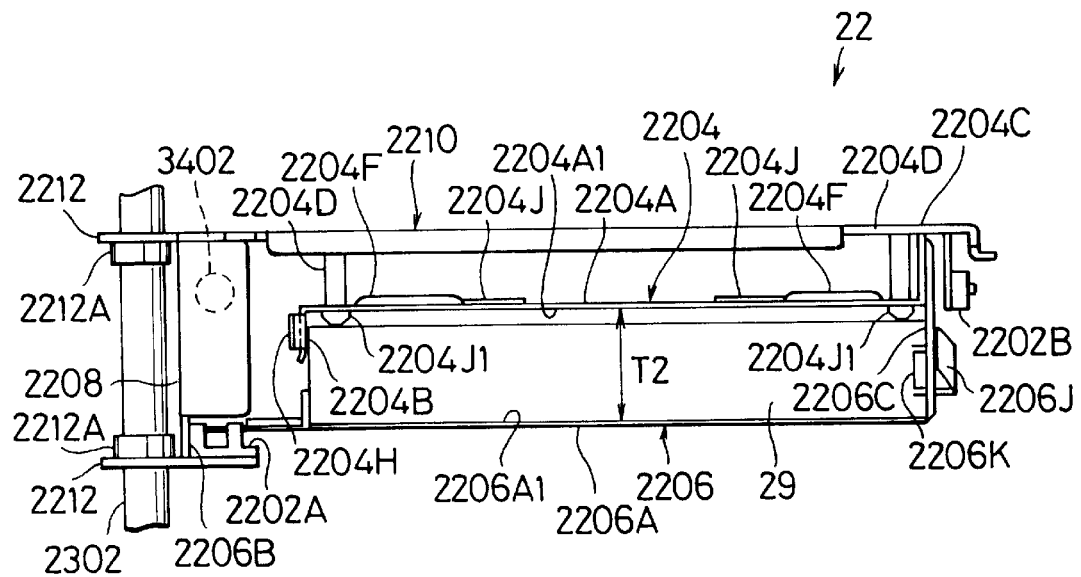
FIG. 20 is a side elevational view of FIG. 19 taken along an arrow line A1.
Figure 21:
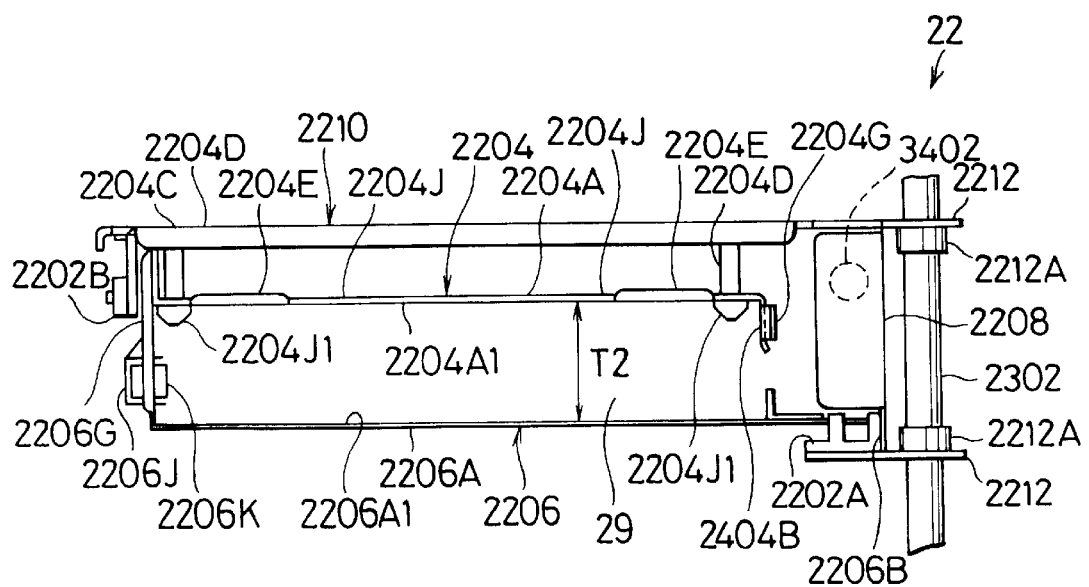
FIG. 21 is a side elevational view of FIG. 19 taken along an arrow line A2.

As shown in FIGS. 19 to 21, a first holding plate 2204 and a second holding plate 2206 are fixed to the main body piece 2210. Between the first holding plate 2204 and the second holding plate 2206 is formed a storing space 29 for storing the tape cartridge 2 in such a way that it can be inserted into or taken out. The front part and the lateral sides are formed to be released at this storing space 29 in such a way that the tape cartridge 2 can be moved from any of the first magazine 14 and the second magazine 16.

As shown in FIGS. 18 to 21, the first holding plate 2204 is constructed to be provided with a main body plate 2204A of substantial rectangular plate extending in a horizontal direction, a side wall 2204B raised from the side edge near the lateral piece 2208 in the main body plate 220A, and a side wall 2204C raised down from the side edge opposite to the side wall 2204C.

Fixing of the first holding plate 2204 to the main body piece 2210 is carried out such that the locations near the four corners of the main body plate 2204A are fixed to the lower surface of the main body piece 2210. Fixing of this first holding plate 2204 is performed such that the main body plate 2204A is in parallel with the main body piece 2210 and extends in a horizontal direction.

When the tape cartridge 2 is transferred between the storing space 27 and the storing space 29 of the first magazine 14 and the second magazine 16, the lower surface 2204A1 of the main body plate 2204A in the first holding plate 2204 may act as a guide plate for guiding the upper surface 204 of the tape cartridge 2.

As shown in FIGS. 19 and 25, the side edge of the main body plate 2204A adjacent to the first magazine 14 is provided with two guide pieces 2204E slanted upwardly as they approach the first magazine 14 and spaced apart in a width direction of the tape cartridge 2 in such a way that the upper surface 204 of the tape cartridge 2 transferred from the first magazine 14 to the storing space 29 is guided smoothly.

The side edge of the main body plate 2204A adjacent to the second magazine 16 is provided with two guide pieces 2204F slanted upwardly as they approach the second magazine 16 and spaced apart in a width direction of the tape cartridge 2 in such a way that the upper surface 204 of the tape cartridge 2 transferred from the second magazine 16 to the storing space 29 is guided smoothly.

The end part of the side wall 2204B adjacent to the first magazine 14 is provided with a guide piece 2204G slanted outwardly in a width direction of the tape cartridge 2 in such a way that the side surface 208 of the tape cartridge 2 transferred from the first magazine 14 to the storing space 29 is guided smoothly.

The end part of the side wall 2204B adjacent to the second magazine 16 is provided with a guide piece 2204H slanted outwardly in a width direction of the tape cartridge 2 as it approaches the second magazine 16 in such a way that the side surface 208 of the tape cartridge 2 transferred from the second magazine 16 to the storing space 29 is guided smoothly.

In addition, as shown in FIGS. 19, 22 and 25, locations in the main body plate 2204A near both ends of the tape cartridge 2 in a width direction are provided with two windows 2204I and then two biasing members 2204J are fixed to the locations in the upper surface of the first holding plate 2204 near both ends in a width direction.

An end part 2204J1 of each of the biasing members 2204J is arranged to be protruded into the storing space 29 through the window 2204I, thereby the upper surface 204 of the tape cartridge 2 stored in the storing space 29 is depressed downwardly. That is, a biasing direction by each of the biasing members 2204J1 against the tape cartridge 2 is in parallel with a moving direction of the holding part 22, i.e. a moving direction of the tape cartridge 2 in the transferring space 17.

As shown in FIGS. 18 to 21, a second holding plate 2206 is constructed to include a main body plate 2206A extending in a horizontal direction; a side wall 2206B in the main body plate 2206A raised down from the side edge near the lateral piece 2208; a side wall 2206C raised from a side edge opposite to the side wall 2206B; and a piece 2206D bent from the side wall 2206C outside the tape cartridge 2 in a width direction.

In addition, as shown in FIGS. 19 and 25, the main body plate 2206A is formed with two arcuate notches 2206A1 to cause each of the bearings 219 of the tape cartridge 2 stored in the storing space 29 to be fitted to each of the reel shafts 1808 of the recording and reproducing mechanism 18 described later.

As shown in FIGS. 20 and 21, fixing of the second holding plate 2206 against the main body piece 2210 is carried out such that the side wall 2206B is fixed to the rear surface location of the lateral piece 2208 positioned below the main body piece 2210, and the piece 2206D is fixed to the lower surface location of the main body piece 2210. Fixing of the second holding plate 2206 is carried out such that the main body plate 2206A is in parallel with the main body plate 2204, extends in a horizontal direction, a clearance T2 slightly larger than a thickness T (a size between the upper surface 204 and the lower surface 212) of the case 202 of the tape cartridge 2 is formed between the upper surface of the main body plate 2206A and the lower surface of the main body plate 2204A, there by the storing space 29 is formed between the upper surface of the main body plate 2206A and the lower surface of the main body plate 2204A.

In this case, the tape cartridge 2 stored in the storing space 29 is pushed up at its lower surface 212 against the upper surface of the main body plate 2206A of the second holding plate 2206 under an action of the ends 2204J1 of the two biasing members 2204J, its position in an upward or downward direction is set, and the upper surface of the main body plate2206A is applied as a reference plane of the tape cartridge 2 in its upward or downward direction. In other words, the central position of the tape cartridge 2 in its upward or downward direction is set in its position slightly lower rather than the central position of the clearance T2 between the first holding plate 2204 and the second holding plate 2206.

The second holing plate 2206 is set such that the upper surface of the main body plate 2206A may act as a guide plate for guiding the lower surface 212 of the tape cartridge 2 when the tape cartridge 2 is transferred between the storing spaces 27 and 29 in the first and second magazines 14, 16.

As shown in FIGS. 19 and 25, the side edge of the main body plate 2206A near the first magazine 14 is provided with two guide pieces 2206E slanted downwardly as they approach the first magazine 14 and spaced apart in a width direction of the tape cartridge 2 in such a way that the upper surface 204 of the tape cartridge 2 transferred from the first magazine 14 to the storing space 29 is guided smoothly.

The side edge of the main body plate 2206A near the second magazine 16 is provided with three guide pieces 2206F slanted downwardly as they approach the second magazine 16 and spaced apart in a width direction of the tape cartridge 2 in such a way that the lower surface 212 of the tape cartridge 2 transferred from the second magazine 16 to the storing space 29 is guided smoothly.

The end part of the side wall 2206C near the first magazine 14 is provided with a guide piece 2206G slanted outside in a width direction of the tape cartridge 2 in such a way that the side surface 208 of the tape cartridge 2 transferred from the first magazine 14 to the storing space 29 is guided smoothly.

The end part of the side wall 2206C near the second magazine 16 is provided with a guide piece 2206H slanted outside in a width direction of the tape cartridge 2 in such a way that the side surface 208 of the tape cartridge 2 transferred from the second magazine 16 to the storing space 29 is guided smoothly.

In addition, the location in the side wall 2206C of the second holding plate 2206 near the guiding piece 2206G is provided with a window 2206I, and a biasing member 2206J is fixed to the outside location of the side wall 2206C.

A roller 2206K is rotatably arranged at the end part of the biasing member 2206J, the roller 2206K is arranged to protrude into the storing space 29 through the window 2206I, thereby the roller is engaged with the notch groove 226 of the tape cartridge 2 stored in the storing space 29 to cause the position of the tape cartridge 2 in its inserting and taking-out direction to be set.

Further, a width in a lateral direction of the holding part 22 comprised of a main body piece 2210, the first and second holding plates 2204, 2206 is formed to be a smaller size than a width in a lateral direction of each of the first and second magazines 14, 16, and it can be moved within the transferring space 17 in an upward or downward direction.

In this case, as shown in FIGS. 20, 21, the main body piece 2210 is cantilevered against the lateral piece 2208. Since the first holding plate 2204 and second holding plate 2206 are fixed to the main body piece 2210, the first and second holding plates 2204, 2206 are cantilevered against the lateral piece 2208.

That is, the fixed end of the holding part 22 is composed of portions of the first and second holding plates 2204, 2206 positioned near the lateral piece 2208; a free end of the holding part 22 is composed of portions of the first and second holding plates 2204, 2206 positioned at opposite side of the fixed end; and the holding part 22 comprised of the first and second holding plates 2204, 2206 is entirely cantilevered against the lateral piece 2208.

In turn, as described above, each of the supporting pieces 2808 of the magazine block 28 is cantilevered by a fixing plate 2802 and a reinforcing plate 2804. A fixed end of each of the supporting pieces 2808 is a part connected to the fixing plate 2802 and the reinforcing plate 2804, and a free end of each of the supporting pieces 2808 is an opposite part against the fixed end.

In this way, the free end of the holding part 22 and the free end of each of the supporting pieces 2808 of the first and second magazines 14, 16 are arranged to be faced oppositely.

As shown in FIGS. 13 to 17, a driving part 24 is composed of a first motor 2402 of a pulse motor, a gear reducer mechanism 2404, a driving pulley 2410, a driven pulley 2412, a toothed belt 2414, a slit plate 2416 and a sensor 2418 or the like.

The first motor 2402, the gear reducer mechanism 2404 and the driving pulley 2410 are arranged at a front part of the upper surface of the upper wall 1212 of the casing 12, and the driven pulley 2412 is rotatably arranged at the upper surface location of the bottom wall 1202 of the casing 12.

The toothed belt 2414 is installed between the driving pulley 2410 and the driven pulley 2412, and a part of the toothed belt 2414 is fixed to the lateral piece 2208 of a frame 2202 by a fixing fitting 2416.

A driving force of the first motor 2402 is reduced in its speed by the two gears 2406, 2408 constituting the gear reducer mechanism 2404, thereafter the driving force is transmitted to the driving pulley 2410, the toothed belt 2414 is moved between the driving pulley 2410 and the driven pulley 2412, thereby the frame 2202, i.e. the holding part 22 is moved up and down.

The slit plate 2416 is constituted by a disk having some slits extending in a diametrical direction spaced apart by a specified distance in a circumferential direction, and the slit plate is fixed to a rotating shaft of the gear 2406. A sensor 2418 is fixed to the upper wall 1212 of the casing 12, detects a passing of the slit of the slit plate 2416 to output a sensing signal corresponding to an amount of rotation of the gear 2406, i.e. the first motor 2402. The sensing signal outputted from the sensor 2418 is inputted to a control part to be described later and applied for controlling the first motor 2402.

Then, a configuration of the delivering mechanism 25 will be described as follows.

As shown in FIGS. 13 to 15 and FIGS. 22 to 25, the delivering mechanism 25 is composed of a first delivering member 30 for delivering the tape cartridge 2 between the first magazine 14 and the holding part 22 of the moving mechanism 20; a second delivering member 32 for delivering the tape cartridge 2 between the second magazine 16 and the holding part 22 of the moving mechanism 20; a guiding part 34 for guiding these first and second delivering members 30, 32; a first driving part 36 for moving the first delivering member 30; and a second driving part 38 for moving the second delivering member 32.

The guide part 34 is composed of a second rod 3402 (corresponding to a guide member in the claim) extending in parallel with the lateral piece 2208 of the frame 2202 and having both ends fixed to each of both ends of the lateral piece 2208.

As shown in FIGS. 22 to 25, since the first and second delivering members 30, 32 have a symmetrical shape to each other, they are described with their corresponding locations being denoted by the same symbols.

Each of the delivering members 30, 32 is composed of a linear base piece 3102 arranged in parallel with the lateral piece 2208 of the frame 2202; and an inner delivering piece 3104 and an outer delivering piece 3106 protruded from both ends of the base piece 3102 and spaced apart in a longitudinal direction of the lateral piece 2208.

A size between the inner delivering piece 3104 and the outer delivering piece 3106 is formed to be a larger size than a width in a lateral direction of the first and second magazines 14, 16 in such a way that they can move in an upward or downward direction while straddling the first and second magazines 14, 16, and further the size is formed to be larger than a width of the holding part 22 in a lateral direction so as not to be interfered with the holding part 22 when the tape cartridge 2 stored in the holding part 22 is installed at the recording and reproducing mechanism 18 to be described later.

Both ends of the base piece 3102 are provided with connecting pieces 3108. Metallic bearings 3112 are fixed to each of the connecting pieces 3108, the second rod 3402 is slidably connected to these metallic bearings 3112, the metallic bearings 3112 are connected to the second rod 3402 and each of the delivering members 30, 32 can be moved in the casing 12 in a lateral direction and can be pivoted around an axis of the second rod 3402.

In addition, the base piece 3102 in each of the delivering members 30, 32 connected to the second rod 3402 is arranged more forwardly than the first and second magazines 14, 16 in such a way that the inner delivering piece 3104 and outer delivering piece 3106 can move in an upward or downward direction while straddling the first and second magazines 14, 16.

Accordingly, each of the delivering members 30, 32 is also integrally moved up and down together with the holding part 22 through the frame 2202 under motion of the frame 2202 by the driving part 24.

As shown in FIGS. 24, 25, each of cam members 3110 is fixed to the location of the base piece 3102 facing against the first magazine 14 and the second magazine 16. The cam member 3110 pushes a pressing protrusion 2830B of an engagement member 2830 of the magazine block 28 in each of the first and second magazines 14, 16 so as to release an engaged state of the engagement claw 2830A against the notch 220, hole 224 of the tape cartridge 2.

A location of the base piece 3102 of each of the delivering members 30, 32 opposite to the inner delivering piece 3104 and the outer delivering piece 3106 is provided with an engagement pin 3116 toward the front side of the casing 12. The engagement pin 3116 passes through the two grooves 2208C, 2208D and protrudes up to the front surface of the lateral piece 2208.

As shown in FIGS. 24 and 25, there is provided an engagement pin 3118 in the base piece 3102 of each of the delivering members 30, 32 which projects downwardly while crossing at a right angle with the outer delivering piece 3106 from the lower surface of the end part where the outer delivering piece 3106 is connected.

In turn, each of the two guide members 2214 extends in a longitudinal direction of the lateral piece 2208 and is arranged at the location in the lateral piece 2208 facing against each of the engagement pins 3118.

Each of the guide members 2214 is provided with a guiding groove 2216 extending in a linear manner along a longitudinal direction of the lateral piece 2208 while being released upwardly, and the engagement pin 3118 is guided linearly by the guide groove 2216. A predetermined position of the guide groove 2216 is formed with a recess 2218 and the engagement pin 3118 can be moved outwardly from the guide groove 2216 through this notch 2218. The recess 2218 is arranged at a location coinciding with the position of the engagement pin 3118 when the first and second delivering members 30, 32 are positioned at the first and second positions to be described later.

Then, the engagement pin 3118 is engaged with the guide groove 2216 to cause each of the delivering members 30, 32 to be prevented from being rotated around a rod 3402, and the inner delivering piece 3104 and the outer delivering piece 3106 hold an attitude extending in a horizontal direction, each of the engagement pins 3118 moves outside the guide groove 2216 at the location of each of the notches 2218 to enable the inner delivering piece 3104 and the outer delivering piece 3106 to be turned upwardly.

In addition, as shown in FIG. 22, the front surface of the lateral piece 2208 is provided with two biasing means 2220 for the delivering members to bias each of the engagement pins 3118.

Each of the biasing members 2220 for the delivering members abuts against each of the engagement pins 3116 under a state in which each of the engagement pins 3118 is positioned at the location of each of the notches 2218 so as to cause the first and second delivering members 30, 32 to be biased to an attitude where the inner delivering piece 3104 and the outer delivering piece 3106 extend in a horizontal direction.

The biasing means 2220 for the delivering member is composed of a first movable member 2222, a second movable member 2224 and a biasing member 2226.

The first movable member 2222 is pivotally arranged at a first shaft 2228 protruded at a location near the end of longitudinal direction of the lateral piece 2208 at the front surface of the lateral piece 2208, and the second movable member 2224 is pivotally arranged at a second shaft 2230 protruded at a location near the center of longitudinal direction of the lateral piece 2208 at the front surface of the lateral piece 2208. The first and second movable members 2222, 2224 are provided with abutment surfaces 2222A, 2222A abutted against the engagement pin 3116.

In addition, the end part of the first movable member 2222 is provided with a connecting part 2222B, and the end part of the second movable member 2224 is provided with a connecting part 2224B connected to the connecting part 2222B. The first and second movable members 2222, 2224 are cooperatively oscillated around the first shaft 2228 and the second shaft 2230 while the connecting part 2222B and connecting part 2224B are being connected.

In addition, the biasing member 2226 is constituted by a coil spring and the like, and this is arranged between each of the first movable members 2222 and the lateral piece 2208.

Although each of the first movable member 2222 and a second movable member 2224 arranged at the left side (the left side in FIG. 22) as seen from the front side of the casing 12 is biased by the biasing force of the biasing member 2226 in a clockwise direction and a counterclockwise direction, the segment 2222C of the first movable member 2222 abuts against a restricting piece 2208E protruded forwardly from the lateral piece 2208, thereby the first and second movable members 2222, 2224 are held at a horizontal attitude where the abutment surfaces 2222A, 2224A extend in a horizontal direction together.

In turn, although each of the first movable member 2222 and a second movable member 2224 arranged at the right side (the right side in FIG. 22) as seen from the front side of the casing 12 is biased by the biasing force of the biasing member 2226 in a clockwise direction and a counterclockwise direction, the segment 2224C of the second movable member 2224 abuts against a restricting piece 2208F protruded forwardly from the lateral piece 2208, thereby the first and second movable members 2222, 2224 are held at a horizontal attitude where the abutment surfaces 2222A, 2224A extend in a horizontal direction together.

The engagement pin 3116 abuts against the abutment surfaces 2222A, 2224A under a state in which the first and second movable members 2222, 2224 are held in the horizontal attitude, thereby the first and second delivering members 30, 32 are held at an attitude in which the inner delivering piece 3104 and the outer delivering piece 3106 extend in a horizontal direction.

Accordingly, when the first and second movable members 2222, 2224 are turned against a biasing action of the biasing member 2226 and the abutment surfaces 2222A, 2224A are moved in a direction away from the engagement pin 3116, the restriction against the engagement pin 3116 by the abutment surfaces 2222A, 2224A is released and the engagement pin 3116 becomes a rotatable state.

In addition, the bottom wall 1212 of the casing 12 is provided with abutment members (not shown) which can be abutted against the locations of the first and second movable members 2222, 2224. As described later, when the abutment members abut against the lower portions of the first and second movable members 2222, 2224 at the time of step where the holding part 22, i.e. the frame 2202 descends to perform a loading of the tape cartridge 2 at the recording and reproducing mechanism 18, the first and second delivering members 30, 32 are turned against a biasing of the biasing member 2226, and each of the abutment surfaces 2222A, 2224A is moved in a direction apart from the engagement pin 3116. Then, the rotation prohibiting state of the engagement pin 3116 with the abutment surfaces 2222A, 2224A is released.

In this case, the first and second delivering members 30, 32 are positioned at any one of the first and second positions described later, so that the engagement pin 3118 is positioned at the location of the notch 2218.

As shown in FIGS. 13 to 15, 26 and 27, the first driving part 36 is composed of a slide member 3502 connected to the first delivering member 30 to transmit the driving force; a rack member 3504; a guide member 3506; a third rod 3508 and a fourth rod 3510 for guiding the slide member 3502 in a lateral direction; a motor 3512; and a gear reducer mechanism 3514 and the like.

The third rod 3508 is fixed at both ends to upper front segments of the side walls 1204, 1206 of the casing 12 and is arranged to extend in a lateral direction. The fourth rod 3510 is fixed at both ends to lower front segments of the side walls 1204, 1206 of the casing 12 and is arranged to extend in a lateral direction.

The slide member 3502 is composed of a lateral piece 3502A extending in a lateral direction and a longitudinal piece 3502B extending from the left end of the lateral piece 3502A upwardly.

The rack member 3504 is fixed to the rear surface of the longitudinal piece 3502A and the rack member 3504 has a rack 3504A extending in a lateral direction along the lateral piece 3502A.

The guide member 3506 is fixed to the rear surface of the longitudinal piece 3502B, and the guide member 3506 has a notch-like guide groove 3506A arranged at the rear surface side and released rearwardly and a notch-like guide groove 3506B arranged at the upper end and released upwardly.

The guide groove 3506B of the guide member 3506 is slidably inserted and passed through the third rod 3508, and a fourth rod 3510 is slidably inserted into or passed through an insertion hole 3506C arranged to extend in a lateral direction at the rack member 3504, thereby the slide member 3502 is movably arranged in a lateral direction while the lateral piece 3502A extends in a lateral direction at the position near the front part of the casing 12 and the longitudinal piece 3502B extends in a vertical direction.

The engagement pin 3116 protruded from the front surface of the lateral piece 2208 through a long groove 2208C is slidably engaged with the guide groove 3506A of the guide member 3506 in a vertical direction and immovable in a lateral direction.

Accordingly, a connection between the guide member 3506 and the first delivering member 30 is carried out while the engagement pin 3116 is being engaged with the guide groove 3506A, thereby the first delivering member 30 is moved integrally with the slide member 3502 in a lateral direction whatever vertical position of the first delivering member 30 may be applied.

The motor 3512 and gear reducer mechanism 3514 are arranged at the upper front segment of the bottom wall 1202 of the casing 12. The gear reducer mechanism 3514 is composed of a worm gear 3514A fixed to the driving shaft of the motor 3512; and four gears 3514B, 3514C, 3514D and 3514E. The gear 3514E is engaged with the rack 3504A.

A driving force of the motor 3512 is reduced by the gear reducer mechanism 3514, thereafter it is transmitted to the rack 3504A, the rack 3504A, i.e. the slide member 3502 moves in a lateral direction to cause the first delivering member 30 to be moved in a lateral direction.

Further, when the first delivering member 30 is set to be positioned by the first driving part 36 at a first position (refer to FIG. 2) where the first magazine 14 is held (straddled) between the inner delivering piece 3104 and the outer delivering piece 3106, a clearance is held between the inner delivering piece 3104 and the first magazine 14, and between the outer delivering piece 3106 and the first magazine 14, respectively, and it can be moved up and down under a state in which the first magazine 14 is being held.

In addition, when the first delivering member 30 is set to be positioned by the first driving part 36 at a second position (refer to FIG. 35) where the holding part 22 is held (straddled) between the inner delivering piece 3104 and the outer delivering piece 3106, a clearance is held between the inner delivering piece 3104 and the holding part 22; between the outer delivering piece 3106 and the holding part 22; between the outer delivering piece 3106 and the first magazine 14; between the inner delivering piece 3104 and the second magazine 16; and between the inner delivering piece 3104 and the inner delivering piece 3104 of the second delivering member 32, respectively, and it can be moved integrally with the holding part 22 under a state in which the holding part 22 is being held.

Figure 28:
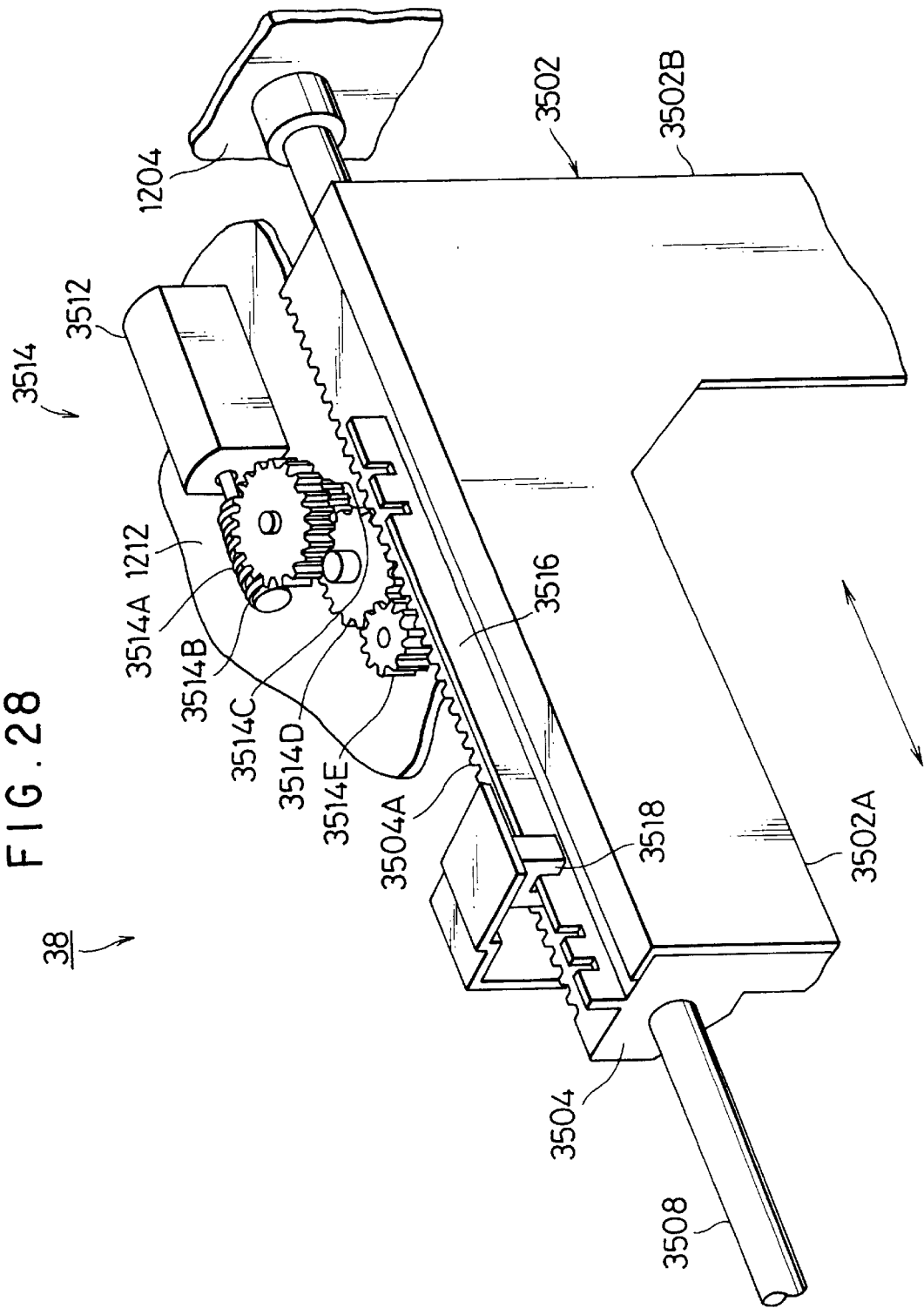
FIG. 28 is a perspective view for showing a configuration of a second driving part.

As shown in FIG. 28, the second driving part 38 for use in moving the second delivering member 32 is composed of a slide member 3502; a rack member 3504; a guide member 3506; a third rod 3508 and a fourth rod 3510; a motor 3512; a gear reducer mechanism 3514; a slit piece 3516; and a sensor 3518 or the like.

A part of the second driving part 38 differing from the first driving part 36 consists in an arrangement in which an upward or downward relation between the lateral piece 3502A and a longitudinal piece 3502B of the slide member 3502 is opposite to that of the slide member 3502 of the first driving part. Due to this fact, the third rod 3508 is slidably inserted into an insertion hole of the rack member 3504 fixed to the lateral piece 3502A of the slide member 3502, and the guide groove 3506B arranged at the lower end of the guide member 3506 and released downwardly is slidably inserted into the fourth rod 3510.

Figure 29:
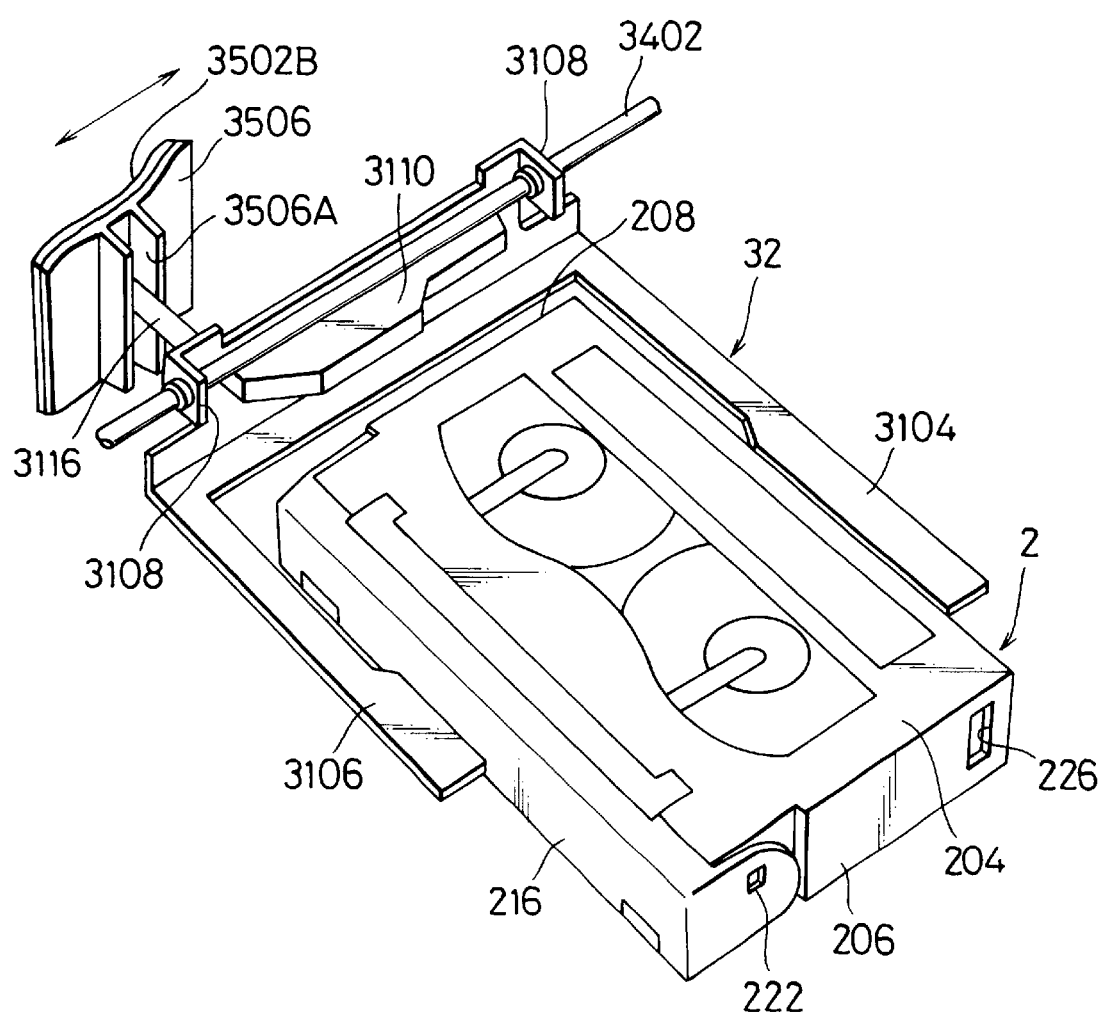
FIG. 29 is a perspective view for illustrating an engaged state between a guide member and a second delivering member.

In FIG. 29 is shown an engaged state between an engagement pin 3116 of the second delivering member 32 and a guide groove 3506A of the guide member 3506.

That is, the engagement pin 3116 protruded from the front surface of the lateral piece 2208 through the long groove 2208C is engaged with the guide groove 3506A of the guide member 3506 in such a way that it can be slid in an upward or downward direction, but immovable in a lateral direction.

Accordingly, the connecting work between the guide member 3506 and the second delivering member 32 is carried out by engaging the engagement pin 3116 with the guide groove 3506A, thereby the second delivering member 32 is moved integrally with the slide member 3502 in a lateral direction whatever vertical position of the second delivering member 32 may be applied.

In addition, since the rack member 3502 fixed to the lateral piece 3502A is configured to be positioned upwardly, the motor 3512 and the gear reducer mechanism 3514 are arranged at the upper front surface of the upper wall 1212 of the casing 12.

As shown in FIG. 28, the slit piece 3516 is protruded at the upper part of the slide member 3502, extends in parallel with the longitudinal direction of the slide member, wherein a plurality of slits are spaced apart in the longitudinal direction. The sensor 3518 is fixed to the upper wall 1212 of the casing 12 and is constituted to output a detecting signal corresponding to the position of the slide member 3502 by detecting passage of the slit of the slit piece 3516. The detecting signal outputted from the sensor 3518 is inputted to a control part to be described later. This detecting signal is used for controlling the motor 3512.

Figure 27:
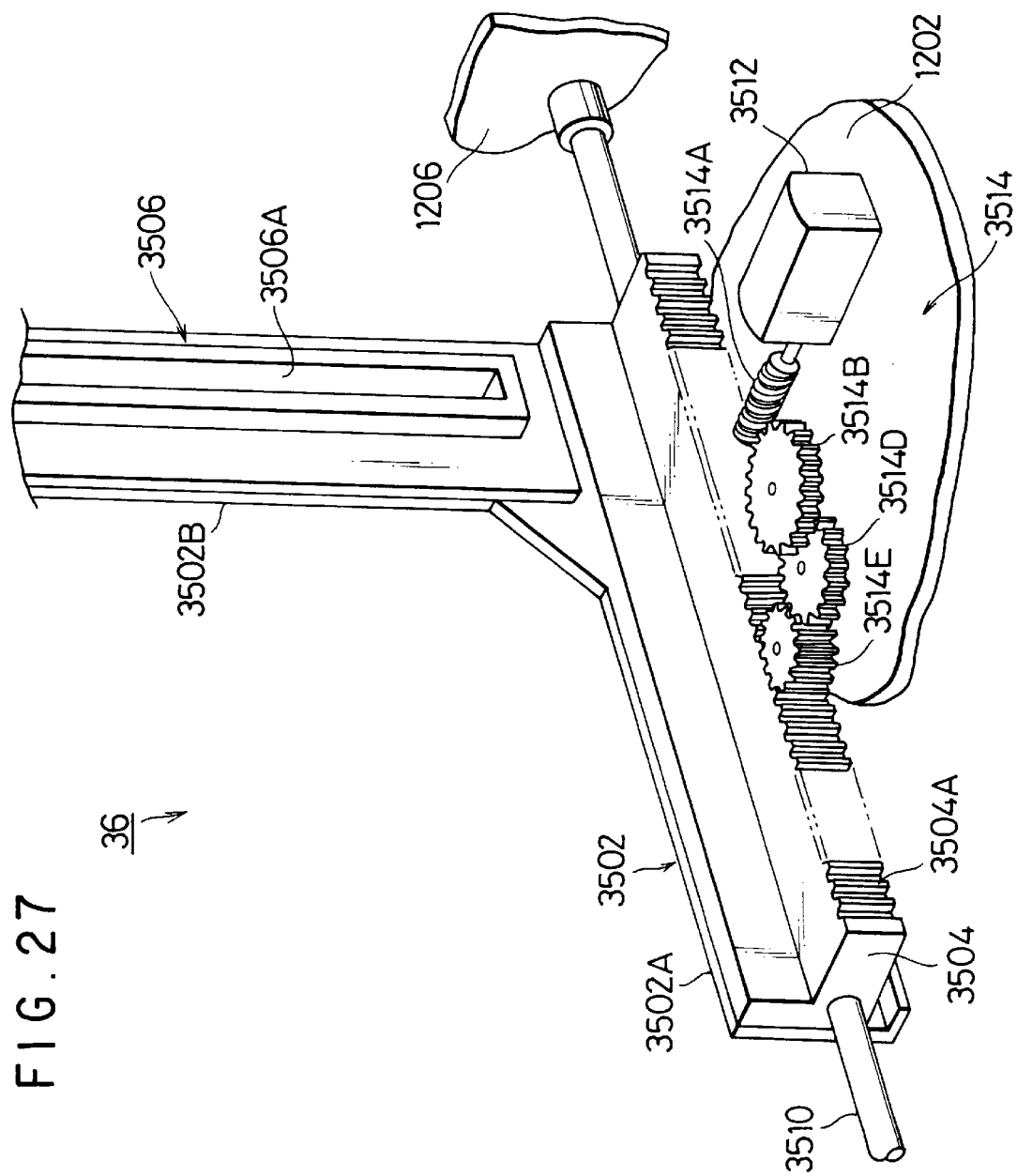
FIG. 27 is a perspective view for showing a configuration of a first driving part.

Although not shown in FIG. 27, the first driving part 36 is also provided with the same configuration as those of the slit piece 3516 and the sensor 3518, and the detecting signal of the sensor is used at the controlling part for controlling a motor 3512 of the first driving part 36.

The second delivering member 32 is set to be positioned by the second driving part 38 at the first position where the second magazine 16 is held between the inner delivering piece 3104 and the outer delivering piece 3106, and a clearance is held between the inner delivering piece 3104 and the first magazine 14, and between the outer delivering piece 3106 and the first magazine 14, respectively, then it can be moved up and down in a state where the first magazine 14 is being held.

In addition, when the second delivering member 32 is set to be positioned by the second driving part 38 at the second position where the holding part 22 is held between the inner delivering piece 3104 and the outer delivering piece 3106, a clearance is held between the inner delivering piece 3104 and the holding part 22; between the outer delivering piece 3106 and the holding part 22; between the outer delivering piece 3106 and the second magazine 16; between the inner delivering piece 3104 and the first magazine 14; between the inner delivering piece 3104 and the inner delivering piece 3104 in the first delivering member 30, respectively, and it can be integrally moved up and down in a state where the holding part 22 is being held.

Next, the recording and reproducing mechanism 18 will be described as follows.

As shown in FIGS. 1, 2, 5 and 15 or the like, the recording and reproducing mechanism 18 is arranged at the upper surface of the bottom wall 1202 of the casing 12.

Figure 30:
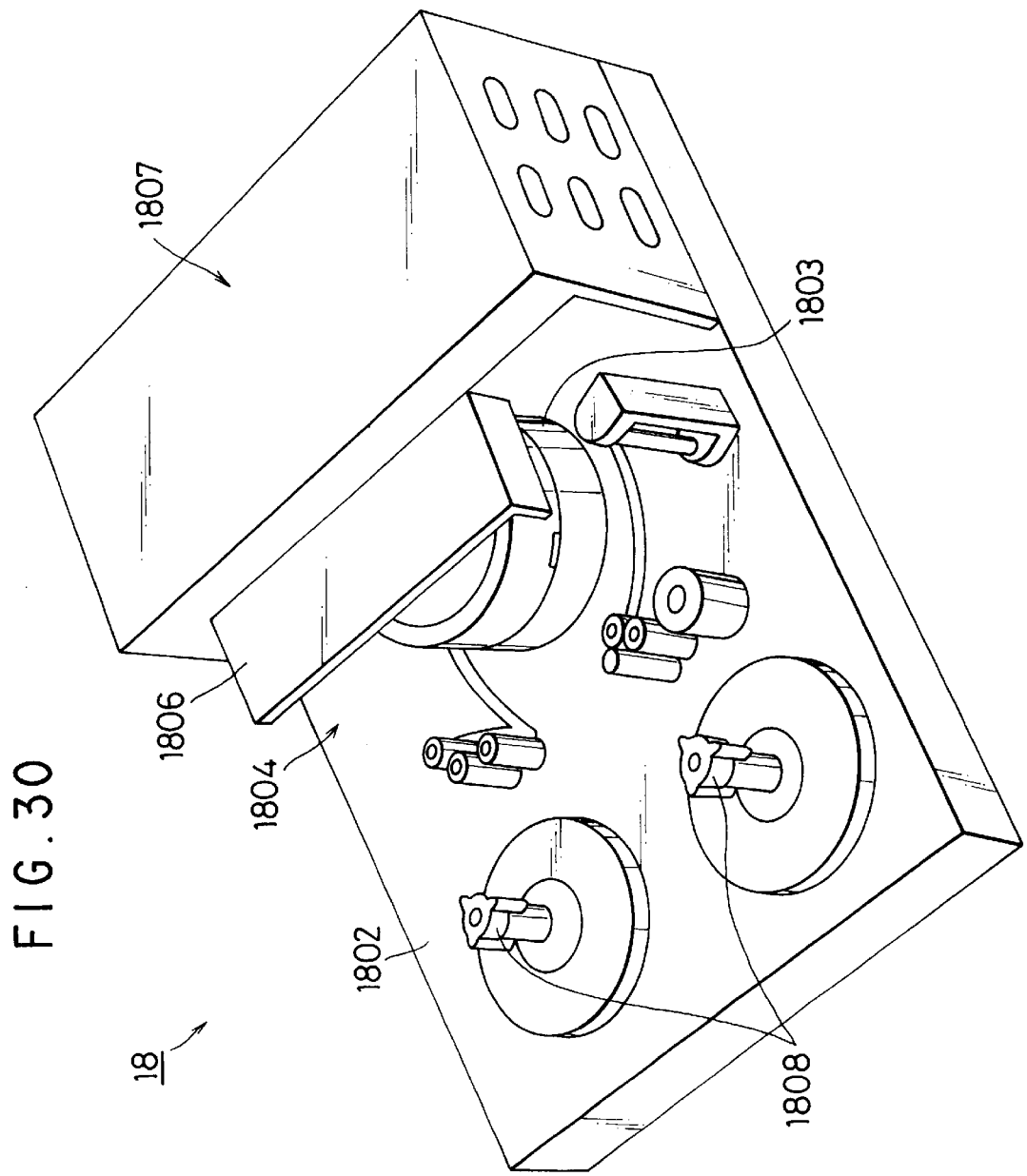
FIG. 30 is a perspective view for showing a configuration of a recording and reproducing mechanism.
Figure 31:
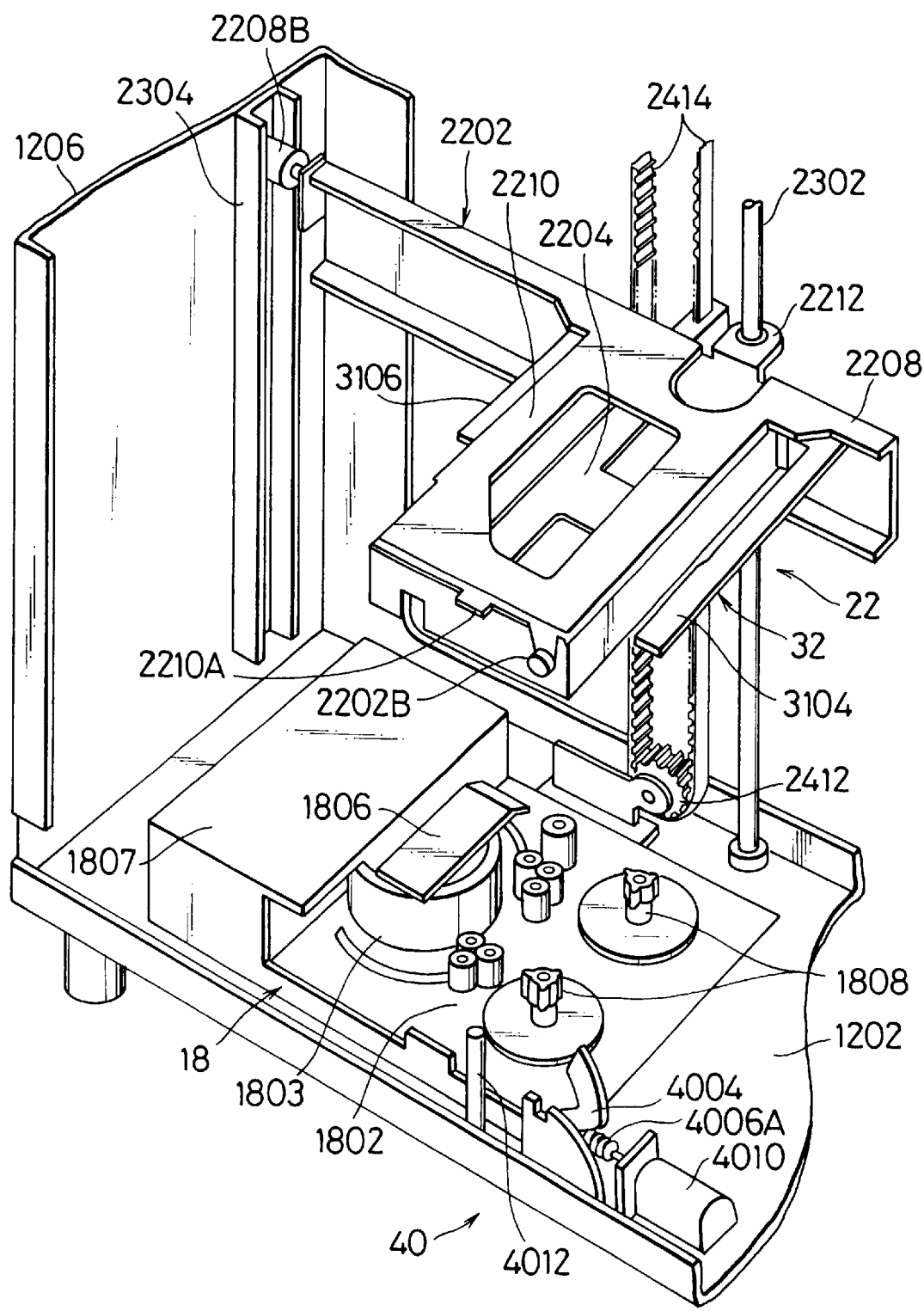
FIG. 31 is a perspective view for illustrating operations of a moving mechanism, a delivering mechanism and a recording and reproducing mechanism.
Figure 32:
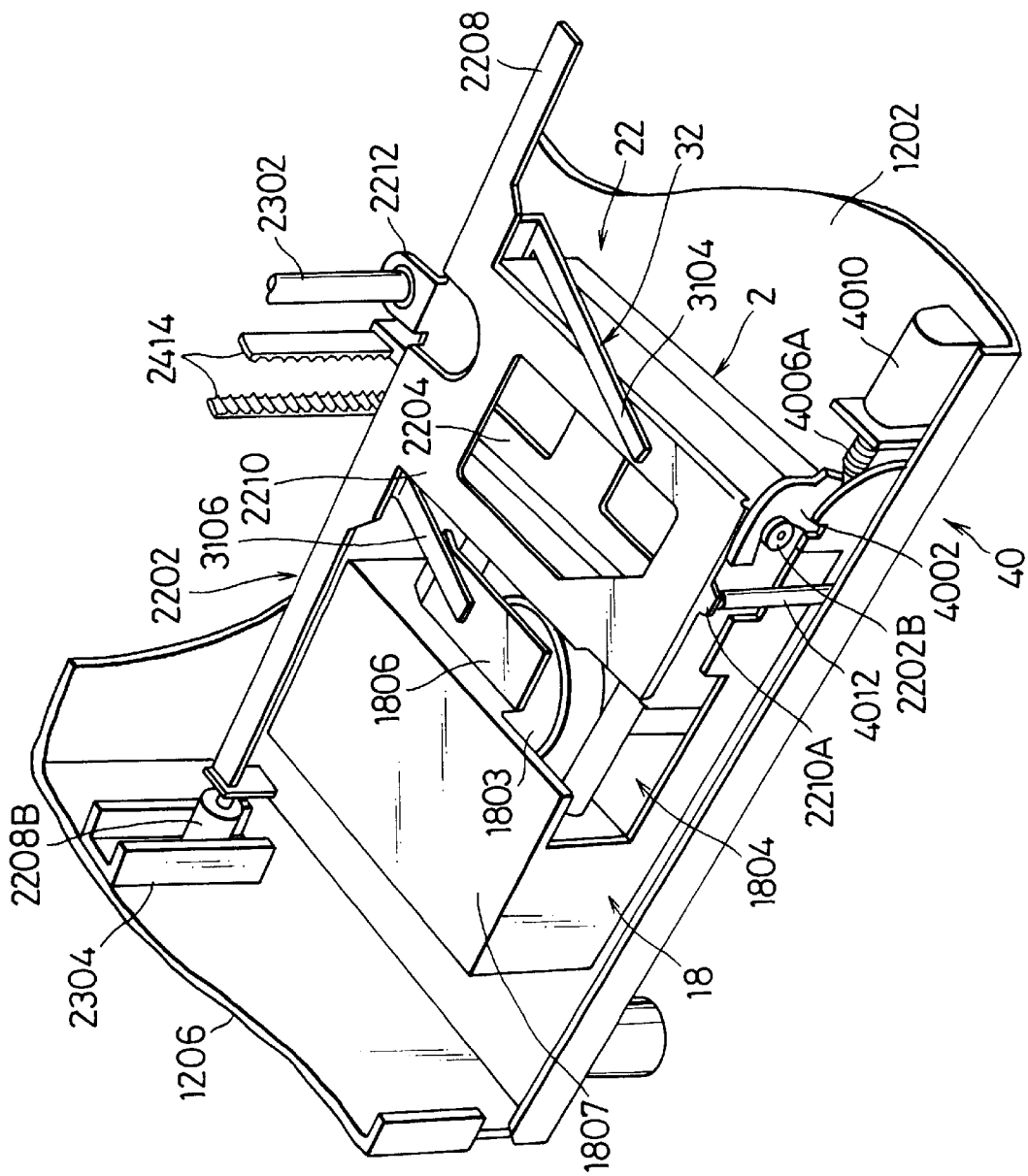
FIG. 32 is a perspective view for illustrating an installing operation against the recording and reproducing mechanism.

In addition, as shown in FIGS. 30 to 32, the recording and reproducing mechanism 18 is composed of an installing part 1802 arranged at a location near the lower part of the transferring space 17 and having a tape cartridge 2 installed therein; a recording and reproducing part 1804 connected to the loading part 1802 and having a rotary head 1803; a cover 1806 extending in a horizontal direction to cover above the rotary head 1803; and a power supply 1807 adjacent to the recording and reproducing part 1804. The recording and reproducing part 1804 is arranged to be connected to the installing part 1802 and is extended in a space formed between the lower part of the second magazine 16 and the bottom wall 1202 of the casing 12.

Then, the tape cartridge 2 is installed at the installing part 1802 under a state in which the tape cartridge 2 is being stored at the holding part 22 by an operation where it is moved downwardly within the transferring space 17 while the holding part 22 stores and holds the tape cartridge 2.

The installing part 1802 is provided with two reel shafts 1808 which are removably connected to the bearings 219 of the two reels 217 adjacent to the lower surface 212 of the tape cartridge 2.

In addition, the installing part 1802 is composed of the two position setting pins (not shown) fitted to the position setting holes 234, 236 arranged at the lower surface 212 of the tape cartridge so as to define positions of the tape cartridge in its vertical direction and horizontal direction are protruded upwardly, and an abutment part (not shown) abutted against the lower surface 212 of the tape cartridge 2 so as to define its vertical positioning.

Each of the position setting pins is composed of a smaller diameter portion than that of the position setting holes 234, 236; a larger diameter portion than that of the position setting holes 234, 236; and an annular stepped portion formed between the smaller diameter portion and the larger diameter portion, and the smaller diameter portion is inserted into and passes through the position setting hole to cause its positioning in horizontal direction to be set, the abutment part abuts against the lower surface 212 and the step part abuts against the edge of the position setting hole to define the vertical positioning.

In addition, the installing part 1802 is provided with a protrusion (not shown) abutted against a location of the opening or closing lid 216 of the tape cartridge 2 when the tape cartridge 2 is installed at the installing part 2 to cause the opening or closing lid 216 to be released.

Accordingly, installing of the tape cartridge 2 at the installing part 1802 is carried out such that the tape cartridge 2 held and stored at the holding part 22 moves downwardly in the transferring space 17, the position setting holes 234, 236 are fitted to each of the position setting pins, the lower surface 212 abuts against the abutment part, the opening or closing lid 216 is sprung up by the protrusion, and each of the reel shafts 1808 is fitted to each of the bearings 219.

In this case, the upper surface 204 of the tape cartridge 2 is depressed downwardly by the end part 2204J1 of each of the biasing members 2204J arranged at the first holding plate 2204 of the holding part 22, resulting in that the tape cartridge 2 is depressed against the installing part 1802 and its installing operation is carried out positively.

The recording and reproducing part 1804 performs a loading operation for drawing out the tape from the tape cartridge 2 installed at the installing part 1802 and pushing it against the rotary head 1803 so as to perform either recording or reproducing operation by the rotary head 1803 against the loaded tape.

The lock mechanism 40 has a function for fixing the holding part 22 under a state in which the holding part 22 is placed at the lower-most position in the transferring space 17, i.e. the same position as one where the tape cartridge 2 is loaded at the recording and reproducing mechanism 18.

Figure 33:
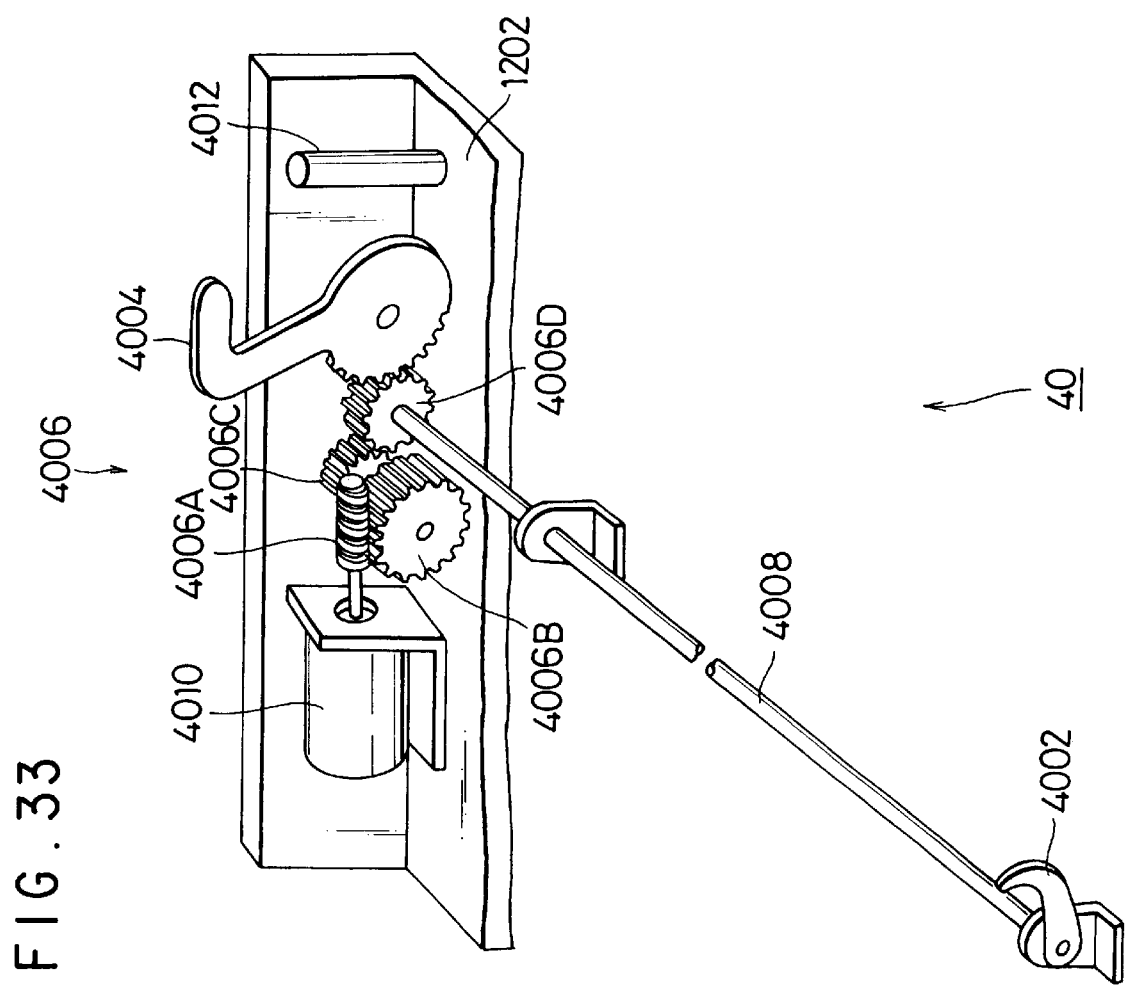
FIG. 33 is a perspective view for illustrating a configuration of a lock mechanism.

As shown in FIG. 33, the lock mechanism 40 is composed of two lock claws 4002, 4004, a gear reducer mechanism 4006, a transmission shaft 4008, and a supporting column 4012 and the like.

The lock claws 4002, 4004 are arranged at the front part and the rear part of the upper surface of the bottom wall 1202 and are removably engaged with the engaged portions 2202A, 2202B. The gear reducer mechanism 4006, the transmission shaft 4008, the motor 4010 and the supporting column 4012 are arranged at the upper surface of the bottom wall 1202. As shown in FIG. 32, the supporting column 4012 is constructed such that the upper end of the supporting column 4012 abuts against the location 2210A of the main body piece 2210 at the holding part 22 when a position of the holding part 22 is set at the lower-most position to be described later.

After a driving force of the motor 4010 is reduced in its speed by the worm gear 4006A, and three gears 4006B, 4006C and 4006D constituting the gear reducer mechanism 4006, it is transmitted to the lock claw 4004 and at the same time it is transmitted to the lock claw 4002, thereby the lock claws 4002, 4004 are engaged with the engaged portions 2202A, 2202B to cause the holding part 22 to be immovably fixed, and further the engaged state described above is released to enable the holding part 22 to be moved in the transferring space 17.

When an operation for instructing a stopping of operation of the recording medium exchanging-type recording and reproducing apparatus 10 is performed against the operating part to be described later, the first and second delivering members 30, 32 are set in their positions at the first position by the first and second driving parts 36, 38 under a control of the control part to be described later as shown in FIG. 2 and at the same time the holding part 22 is set in its position at the lower-most position by the driving part 24 and the location 2210A of the holding part 22 abuts against the upper end of the supporting column 4012.

Then, the lock claws 4002, 4004 of the lock mechanism 40 are engaged with the engaged parts 2202A, 2202B to cause the holding part 22 to be immovably fixed. Then, a power supply of the recording medium exchanging-type recording and reproducing apparatus 10 is turned off.

With such an arrangement as above, during a period in which the power supply of the recording medium exchanging-type recording and reproducing apparatus 10 is turned off, the holding part 22 is held by the lock claws 4002, 4004 and the supporting column 4012, and the holding part is set positively in its position at the lower-most position described above. In addition, when the power supply of the recording medium exchanging-type recording and reproducing apparatus 10 is turned on, the engaged state of the engaged portions 2202A, 2202B by the lock claws 4002, 4004 of the lock mechanism 40 is released under control of the controlling part to enable the holding part 22 to be moved.

Next, the controlling part will be described as follows.

The controlling part controls the driving part 24, the first and second driving portions 36, 38, the recording and reproducing mechanism 18 and the lock mechanism 40, and the controlling part is constituted by CPU, for example, and the controlling part is arranged at an appropriate location at the casing 12.

The controlling part counts the detecting signal of the sensor 2418, acknowledges the position of the holding part 22 and controls an amount of rotation of the first motor 2402 acting as a pulse motor, thereby controls a moving direction and a moving amount of the holding part 22.

Thus, the control part is constituted such that a position of the holding part 22 is acknowledged by a method wherein a predetermined reference position of the holding part 22 is applied as an origin and a relative position in respect to the origin is counted with the sensing signal. In the first preferred embodiment, counting of the sensing signal is carried out with the lower-most position being applied as the origin.

In addition, the driving signal given to the motors 3512 of the first and second driving segments 36, 38 is controlled in response to the detecting signal of the sensor 3518 so as to control a moving direction and a moving amount of the first and second delivering members 30, 32.

In addition, moving direction and moving amount of the lock claws 4002, 4004 are controlled by controlling the driving signal given to the motor 4010 of the lock mechanism 40.

In addition, the operating part is composed of some operating buttons for performing such operations as recording, reproducing, fast-forwarding and returning of the desired tape cartridge 2 and both turning-on and turning-off of the power supply, and the operating part is arranged at an appropriate location in the casing 12 in such a manner that it can be operated.

Next, the operation of the recording medium exchanging-type recording and reproducing apparatus will be described as follows.

At first, the operation for recording or reproducing the desired tape cartridge 2 stored in the first magazine 14 by the recording or reproducing mechanism 18 under an operation of the operating part will be described as follows.

The holding part 22 is moved upwardly to the position corresponding to the height of the storing space 27 having the desired tape cartridge 2 stored therein while the driving part 24 is being controlled under a state in which the first delivering member 30 and the second delivering member 32 are kept at the first position.

That is, as shown in FIG. 36A, the molding part 22 is moved in such a way that a central position (indicated by a dotted line) of a clearance T1 between the upper surface 2822 and the lower surface 2824 of the supporting piece 2808 of the magazine block 28 is coincided with a central position (indicated by a dotted line) of a clearance T2 between the main body plate 2204A of the first holding plate 2204 of the holding part 22 and the main body plate 2206A of the second holding plate 2206. With such an arrangement as above, the first delivering member 30 and the second delivering member 32 are also integrally moved up together with the holding part 22.

Then, as shown in FIGS. 34A and 34B, the first driving part 36 is operated, thereby the first delivering member 30 is moved in a rightward direction from the first magazine 14 toward the holding part 22.

When the first delivering member 30 moves in the casing 12 in a lateral direction, the inner delivering piece 3104 and the outer delivering piece 3106 pass through a substantial central position of the clearance T2 between the upper surface of the main body plate 2206A and the lower surface of the main body plate 2204A.

At this time, a cam member 3110 integrally moved together with the first delivering member 30 pushes against the pressing protrusion 2830B of the engagement member 2830 engaged with the notch 220 of the desired tape cartridge 2 to cause the engaged state of the engagement claw 2830A against the notch 220 of the tape cartridge 2 to be released once, resulting in that the tape cartridge 2 can be moved in a horizontal direction.

Then, the outer delivering piece 3106 of the first delivering member 30 abuts against the rear surface 210 of the tape cartridge 2 to depress it toward the transferring space 17, thereby the tape cartridge 2 is transferred from the storing space 27 of the first magazine 14 toward the storing space 29 of the holding part 22.

Each of the upper surface 204, the lower surface 212, and the side surfaces 206, 208 of the tape cartridge 2 is guided by the lower surface, the upper surface and the walls 2802, 2818 of the supporting piece 2808 of the magazine block 28, and at the same time guided by the main body plates 2204A, 2206A, and the side walls 2204B, 2206C and stored in the storing space 29.

Figures 35A, 35B:
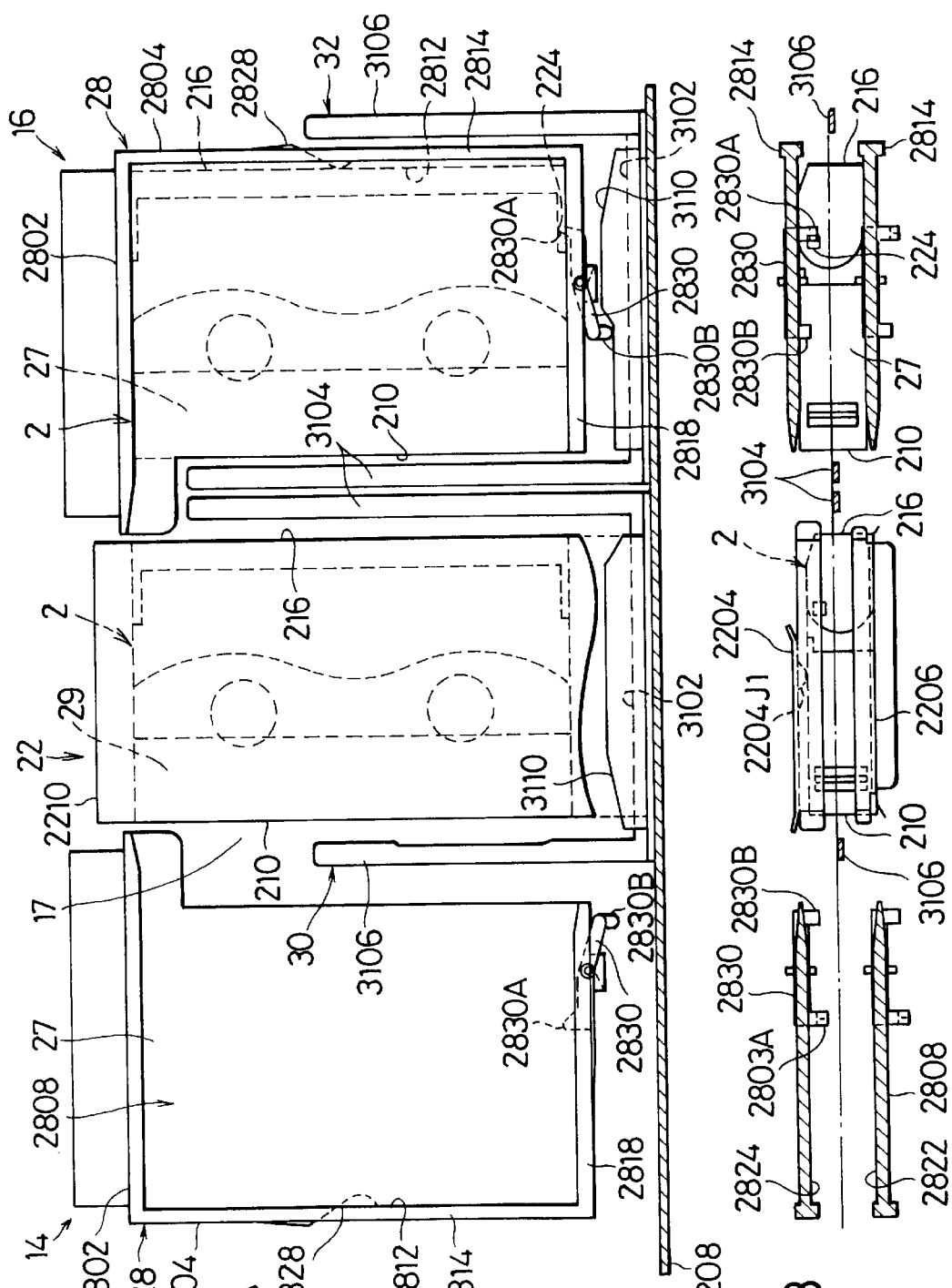
FIGS. 35A and 35B are illustrative views for illustrating a state in which the first and second delivering members are moved to the positions where the holding part can move in an upward direction and a downward direction.

As shown in FIGS. 35A and 35B, since the depression of the cam member 3110 against the depressing protrusion 2830B is released at a stage in which the first delivering member 30 is moved into the transferring space 17, the engagement claw 2830A of the first magazine 14 returns back to a state in which it protrudes into the storing space 27.

In the first preferred embodiment, when the tape cartridge 2 is to be delivered, a free end 22B of the holding part 22 and a free end 2808B of each of the supporting pieces 2808 of the first magazine 14 and the second magazine 16 are faced opposite to each other, resulting in that the following effects can be attained.

Figure 40A:
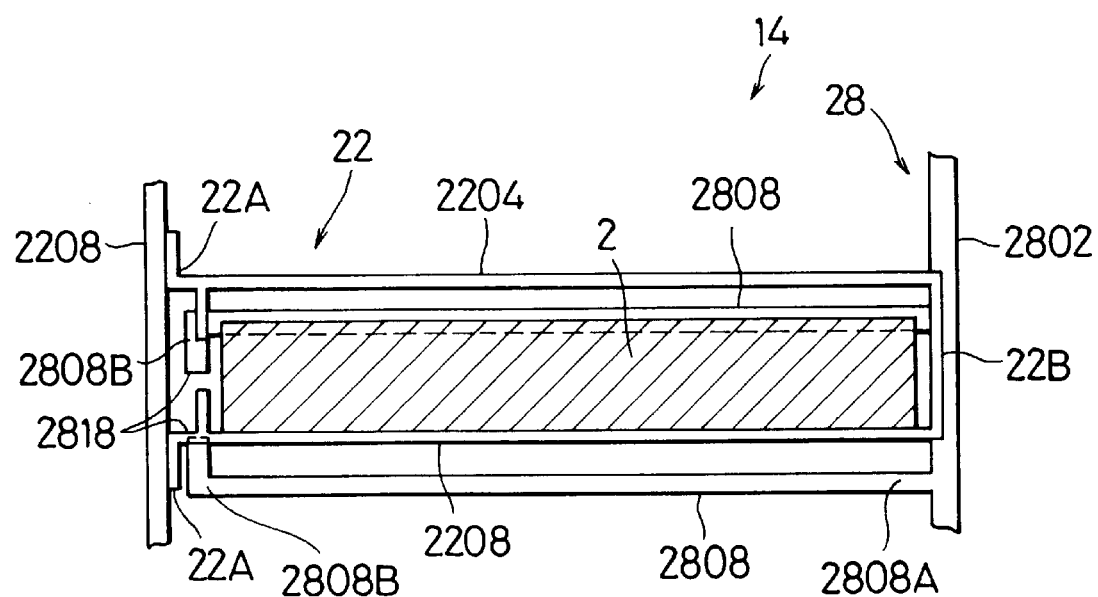
Figure 40B:
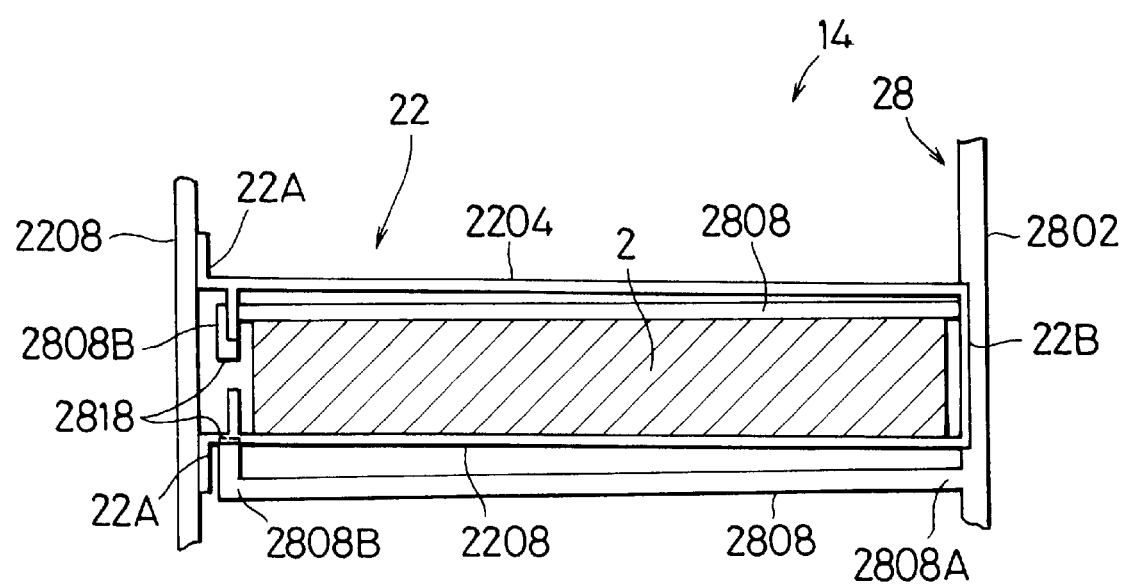

For a sake of clarity in illustration, FIGS. 40A and 40B merely illustrate the first, second holding plates 2204, 2206 and the lateral piece 2208 of the holding part 22, and as the magazine block 28, only the supporting piece 2808 and the wall 2818 are illustrated. FIG. 40A indicates a state before the tape cartridge 2 is transferred from the holding part 22 to the magazine block 28. FIG. 40B shows an intermediate state in which the tape cartridge 2 is transferred from the holding part 22 to the magazine block 28.

In this case, even if it is assumed that the tape cartridge 2 is transferred under a state in which a position is displaced in an upward or downward direction between the storing space 29 of the holding part 22 and the storing space 27 between the supporting pieces 2808, the holding part 22 and the part of the supporting piece 2808 adjacent to the tape cartridge 2 are abutted against the part of the tape cartridge 2 to be transferred as shown in FIG. 40B, thereby the free ends 22B and 2808B are displaced in a direction (an upward or downward direction) crossing at a right angle with the moving direction of the tape cartridge 2 and released. Accordingly, the tape cartridge 2 is transferred smoothly from the holding part 22 to the magazine block 28 without being hooked with the part of the supporting piece 2808.

Also in the case that the tape cartridge 2 is transferred from the storing space 27 between the supporting pieces 2808 to the storing space 29 of the holding part 22, the holding part 22 and the part of the supporting piece 2808 adjacent to the tape cartridge 2 are abutted against the part of the tape cartridge 2 to be transferred, thereby it is similarly found that the free ends 22B, 2808B are displaced and the tape cartridge 2 is transferred smoothly from the magazine block 28 to the holding part 22 without being hooked against the part of the holding part 22.

In addition, even if there is a certain displacement in position in an upward or downward direction between the storing space 29 of the holding part 22 and the storing space 27 between the supporting pieces 2808, the tape cartridge 2 can be transferred smoothly, so that it shows an effect that an allowable degree of a size accuracy of each of the supporting pieces 2208 and a driving accuracy of the holding part 22 can be set high.

When the tape cartridge 2 is stored in the storing space 29 as described above, the roller 2206K arranged at the holding part 22 is engaged with the notch groove 226 of the tape cartridge 2 and the position of the tape cartridge 2 in a forward or rearward direction within the storing space 29 of the tape cartridge 2 is held.

At this time, as the first delivering member 30 is moved, the second delivering member 32 is further moved to the second magazine 16 than the position of the first position in a lateral direction. This is due to the fact that the inner delivering piece 3104 of the first delivering member 30 abuts against the inner delivering piece 3104 of the second delivering piece 32 and is further moved near the second magazine 16 than the position of the inner delivering piece 3104 of the second delivering piece 32 placed at the first position.

As a result, since the tape cartridge 2 stored in the second magazine 16 is depressed at its rear surface 210 by the inner delivering piece 3104 of the second delivering member 32, the opening or closing lid 216 of the tape cartridge 2 is once displaced toward the wall 2814 of the magazine block 28 under a state in which it is depressed by the biasing member 2828.

Then, as shown in FIGS. 35A and 35B, the first driving part 36 is controlled and the first delivering member 30 is set in its position at the second position. Further, the second driving part 38 is controlled, and the inner delivering piece 3104 of the second delivering member 32 is spaced apart from the rear surface 210 of the tape cartridge 2. With such an arrangement as above, the tape cartridge 2 stored in the second magazine 16 is released at its depressing force in the direction of the second magazine 16, so that it is displaced toward the transferring space 17 under an action of the biasing member 2828 and returns to its initial position.

The driving part 24 is controlled from this state by the control part, the holding part 22 having the tape cartridge 2 stored therein and the first and second delivering members 30, 32 move downwardly within the transferring space 17 and the tape cartridge 2 is moved toward the installing part 1802.

As shown in FIGS. 31 and 32, when the tape cartridge 2 is installed at the installing part 1802, the delivering pieces 3104, 3106 of the first and second delivering members 30, 32 are placed at such positions as they may interfere with the cover 1806. However, the holding part 22 moves more downwardly under a state in which each of the delivering pieces 3104, 3106 abuts against the cover 1806, thereby the first and second delivering members 30, 32 are turned upwardly around an axis of the second rod 3402. With such an arrangement as above, since each of the delivering pieces 3104, 3106 is released from the cover 1806, trouble in operation caused by interferences with the first and second delivering members 30, 32 and the cover 1806.

Then, as the holding part 22 moves downwardly, each of the reel shafts 1808 of the installing part 1802 is fitted to each of the bearings 219 of the tape cartridge 2 and the tape cartridge 2 is installed.

As the tape cartridge 2 is installed at the installing part 1802, the loading operation, the recording or reproducing operation performed by the recording and reproducing part 1804 are carried out.

Then, as either the recording or the reproducing operation performed by the recording and reproducing part 1804 of the recording and reproducing mechanism 18 is finished, the tape cartridge 2 is returned back to the storing space for the original magazine.

That is, the tape loaded by the recording and reproducing part 1804 is stored in the tape cartridge 2.

Then, the driving part 24 is controlled to cause the holding part 22 to move upwardly in the transferring space 17, the fitted state between each of the reel shafts 1808 of the installing part 1802 and each of the bearings 219 of the tape cartridge is released, and as the holding part 22 is moved upwardly, thereby the abutment between each of the inner delivering pieces 3106 and the cover 1806 is released and at the same time the first and the second delivering members 30, 32 are returned back to an attitude extending in a horizontal direction by the biasing means 2220 for the delivering member.

Then, a further upward motion of the holding part 22 causes the holding part 22 to be positioned at a location corresponding to a height of the storing space 27 having the tape cartridge 2 stored therein.

In this case, as described above, the tape cartridge 2 stored in the storing space 29 is positioned at its central position in its upward or downward direction near more downwardly than the central position of the clearance T2 between the upper surface of the main body plate 2206A and the lower surface of the main body plate 2204A.

Accordingly, as shown in FIG. 36A, when a position of the holding part 22 is set to cause a central position of the clearance T2 between the main body plate 2204A and the main body plate 2206A to be coincided with a central position of the clearance T1 between the upper surface 2822 and the lower surface 2824 of the supporting piece 2208 of the magazine block 28, the position of the lower surface 212 of the tape cartridge 2 held at the holding part 22 is positioned more downwardly than the position of the upper surface 2822 of the supporting piece 2208, resulting in that when the tape cartridge 2 is transferred from the holding part 22 to the magazine block 28, the tape cartridge 2 is hooked with the side edge 2820 of the supporting piece 2808 and a smooth delivering may be prohibited.

Accordingly, in the case of the first preferred embodiment, as shown in FIG. 36B, a position of the holding part 22 is set in such a way that a position of the upper surface of the main body plate 2206A of the second holding plate 2206 is coincided with a position of the upper surface 2822 of the supporting piece 2808 of the magazine block 28. With such an arrangement as above, the tape cartridge 2 is not hooked with the side edge 2820 of the supporting piece 2808 and the smooth delivering of the tape cartridge can be carried out from the holding part 22 to the magazine block 28.

Then, the first driving part 36 is operated to cause the first delivering member 30 to be moved from the second position toward the first magazine 14. That is, the inner delivering piece 3104 of the first delivering member 30 abuts against the opening or closing lid 216 of the tape cartridge 2 and a depressing from the storing space 29 of the holding part 22 toward the storing space 27 of the first magazine 14 causes the tape cartridge 2 to be transferred from the storing space 29 of the holding part 22 toward the storing space 27 of the first magazine 14.

At this time, the cam member 3110 moved integrally with the first delivering member 30 depresses the depressing protrusion 2830B of the engagement member 2830 corresponding to the storing space 27 to cause the engagement claw 2830A to be retracted outward of the storing space 27, contacting of the engagement claw 2830A against the side wall 208 of the tape cartridge 2 is avoided, thereby occurrence of a damage or abnormal sound of the engagement claw 2830A or the tape cartridge 2 is prevented.

During a process in which the tape cartridge 2 is moved by the first delivering member 30 toward the storing space 27 of the first magazine 14, the depressing of the depressing protrusion 2830B by the cam member 3110 is released, the notch 220 of the tape cartridge 2 is engaged by the engagement claw 2830A of the engagement member 2830, although the tape cartridge 2 is moved from the former position against a biasing force of the biasing member 2828 to enable the engagement of the engagement claw 2830A to be positively carried out. With such an arrangement as above, the tape cartridge 2 is stored in the storing space 27 of the first magazine 14.

Then, the first driving part 36 is controlled to cause the first delivering member 30 to be moved toward the transferring space 17 and moved back to the first position.

Then, a delivering operation of the tape cartridge 2 carried out between the second magazine 16 and the holding part 22 and a recording and reproducing operation in the recording and reproducing mechanism 18 will be described as follows.

As shown in FIGS. 37A, 37B, 38A and 38B, an operation for transferring the tape cartridge 2 from the second magazine 16 to the holding part 22 is similar to an operation for transferring the tape cartridge 2 from the first magazine 14 to the holding part 22 except the fact that the second delivering member 32 is driven in place of the first delivering member 30.

As to the operation in which the tape cartridge 2 stored in the holding part 22 is installed at the recording and reproducing mechanism 18 as well as either recording or reproducing operation, they are different from the above-mentioned operation in view of the facts that only the outer delivering piece 3106 of the second delivering member 32 is placed at a position interfering with the cover 1806 and the inner delivering piece 3104 of the first delivering member 30 is located at a position spaced apart from the cover 1806.

Due to this fact, only the second delivering member 32 abuts the cover 1806 to be rotated and then a trouble in operation caused by interference between the second delivering member 32 and the cover 1806 is avoided.

In addition, an operation in which the tape cartridge 2 is removed from the recording and reproducing mechanism 18 is similar to the above-mentioned operation.

In addition, as to an operation in which the tape cartridge 2 is transferred from the holding part 22 to the second magazine 16 is similar to the above-mentioned operation except the fact that the second delivering member 32 is operated.

Then, an operation of the lock mechanism 40 will be described as follows.

Before the power supply of the recording medium exchanging-type recording and reproducing apparatus 10 is turned off, the holding part 22 is locked at the lower-most position by the lock mechanism 40. With such an operation as above, even under an environment in which the recording medium exchanging-type recording and reproducing apparatus 10 is transferred to apply a certain vibration, it is possible to prevent the holding part 22 from being accidentally moved to accept damage.

In addition, the holding part 22 is fixed at the lower-most position by the lock mechanism 40 to cause an operating time of the recording medium exchanging-type recording and reproducing apparatus 10 to be shortened.

That is, the control part performs a counting of the detecting signal from the sensor 2418 with the lower-most position of the holding part 22 being applied as an origin. Due to this fact, it is necessary to perform an initialization operation in which immediately after the power supply of the recording medium exchanging-type recording and reproducing apparatus 10 is turned on, the driving part 24 is driven, the holding part 22 is set to be positioned at the origin of the lower-most position and the counted value attained by the control part is initialized. Accordingly, every time the power supply of the recording medium exchanging-type recording and reproducing apparatus 10 is turned on, it becomes necessary to take time for the initialization operation until the recording and reproducing operation is started, although in the first preferred embodiment, the initialization operation can be eliminated. This case will be described as follows.

During the process for assembling the recording medium exchanging-type recording and reproducing apparatus 10, a following operation will be carried out. That is, the holding part 22 is set to be positioned at the lower-most position and the holding part 22 is locked by the lock mechanism 40. Then, a rotating position of the slit plate 2416 against the rotating shaft of the gear 2406 is set to become the position where the detecting signal is outputted from the sensor 2418 and the slit plate 2416 is fixed at the rotating shaft under its state.

With such a configuration as above, when the power supply for the recording medium exchanging-type recording and reproducing apparatus 10 is turned on under a state in which the holding part 22 is locked by the lock mechanism 40 and the first motor 2402 is excited, it is possible to eliminate the initialization operation because the holding part 22 is always set to be positioned accurately at the origin of the lower-most position, so that the initialization process can be eliminated, a counting operation based on the detecting signal from the sensor 2418 can be started immediately and the holding part 22 can be moved to the desired position.

In addition, as the sensor 2418, it is not necessary to use an expensive sensor of a system for sensing an absolute position, so that it becomes possible to use the sensor of a less-expensive incremental type.

It is of course apparent that a locked state with the lock mechanism 40 at the lower-most position of the holding part 22 is not limited to the time of turning-off of the recording medium exchanging-type recording and reproducing apparatus 10, but the locking is carried out under a circumstance in which the operation of the holding part 22 is terminated for a while.

As described above in detail, in accordance with the medium exchanging-type recording and reproducing apparatus of the first preferred embodiment, the transferring space 17 extending along a longitudinal direction of the first magazine 14 and the second magazine 16 is arranged between the first magazine 14 and the second magazine 16, and the motion of the tape cartridge 2 by the holding part 22 is carried out in the transferring space 17.

Due to this fact, it is possible to reduce the transferring space by about ½ and realize the small-sized apparatus as compared with the prior art apparatus in which the cassette magazines are arranged in one row in a case thickness direction of the tape cartridge and the tape cassette transferring space is arranged along the cassette magazine.

Further, since a moving distance of the tape cartridge 2 can be reduced by about ½ as compared with that of the prior art apparatus, a time required for transferring the tape cartridge 2 can be shortened, so that the reproducing and recording can be carried out within a short period of time as compared with the prior art apparatus.

In addition, since the moving distance of the holding part 22 can be reduced by about ½ as compared with that of the prior art apparatus described above, the apparatus having a smaller torque of the motor for driving the holding part 22 as compared with that of the prior art apparatus can be employed, and the first rod or the like can be reduced in its length and so it becomes more advantageous for reducing the parts cost and attaining a light weight apparatus.

Further, an attitude of the tape cartridge 2 stored in the first magazine 14 and the second magazine 16, an attitude of the tape cartridge 2 held at the holding part 22 and an attitude of the tape cartridge 2 installed at the installing part 1802 are all set to the same one, so that it is not necessary to arrange a mechanism for reversing the attitude of the tape cartridge 2, its configuration can be simplified and the operating time required when the tape cartridge 2 is installed to or removed from the installing part 1802 of the recording and reproducing mechanism 18 can also be reduced.

In addition, installing or removal of the tape cartridge 2 against the installing part 1802 and opening or closing operation of the opening or closing lid 216 are carried out by moving the tape cartridge 2 in one direction along the transferring space 17. Accordingly, a drawing operation in the present invention is eliminated differing from the prior art recording and reproducing apparatus in which the drawing operation for drawing once a so-called front-loading mechanism, i.e. the tape cartridge in a predetermined direction is carried out, and then it is moved in a direction crossing at a right angle with the predetermined direction to perform a loading of the tape cartridge against the recording and reproducing mechanism, resulting in that the mechanism can be simplified and made small in its size.

In addition, in the first preferred embodiment of the present invention, the recording and reproducing part 1804 of the recording and reproducing mechanism 18 is arranged only at the lower part of the second magazine 16 and the recording and reproducing mechanism 18 is not positioned below the first magazine 14, it is possible to arrange at the lower part of the first magazine 14 much more storing members 26 than that of the second magazine 16 only by a corresponding thickness of the recording and reproducing part 1804, and it is more advantageous to store many tape cartridges 2.

In addition, it is possible to store a tape cartridge for a special application, for example, cleaning of the recording and reproducing mechanism 18 in the storing members 26 arranged much more only by a corresponding thickness of the recording and reproducing part 1804 installed at the lower part of the first magazine 14.

In addition, it is also possible to keep the storing members 26 arranged much more only by a corresponding thickness of the recording and reproducing part 1804 installed at the lower part of the first magazine 14 as a vacant space where the tape cartridge 2 is not stored in advance and to replace each of the tape cartridges 2 stored in the first magazine 14 and the second magazine 16 under utilization of this vacant space.

That is, if the tape cartridges 2 are replaced in sequence from a tape cartridge 2 having a high degree of usage so as to be stored into the storing space 27 near the recording and reproducing mechanism 18, it becomes advantageous for reducing an operating time required when the tape cartridge 2 is installed in or removed from the recording and reproducing mechanism 18.

Figure 39:
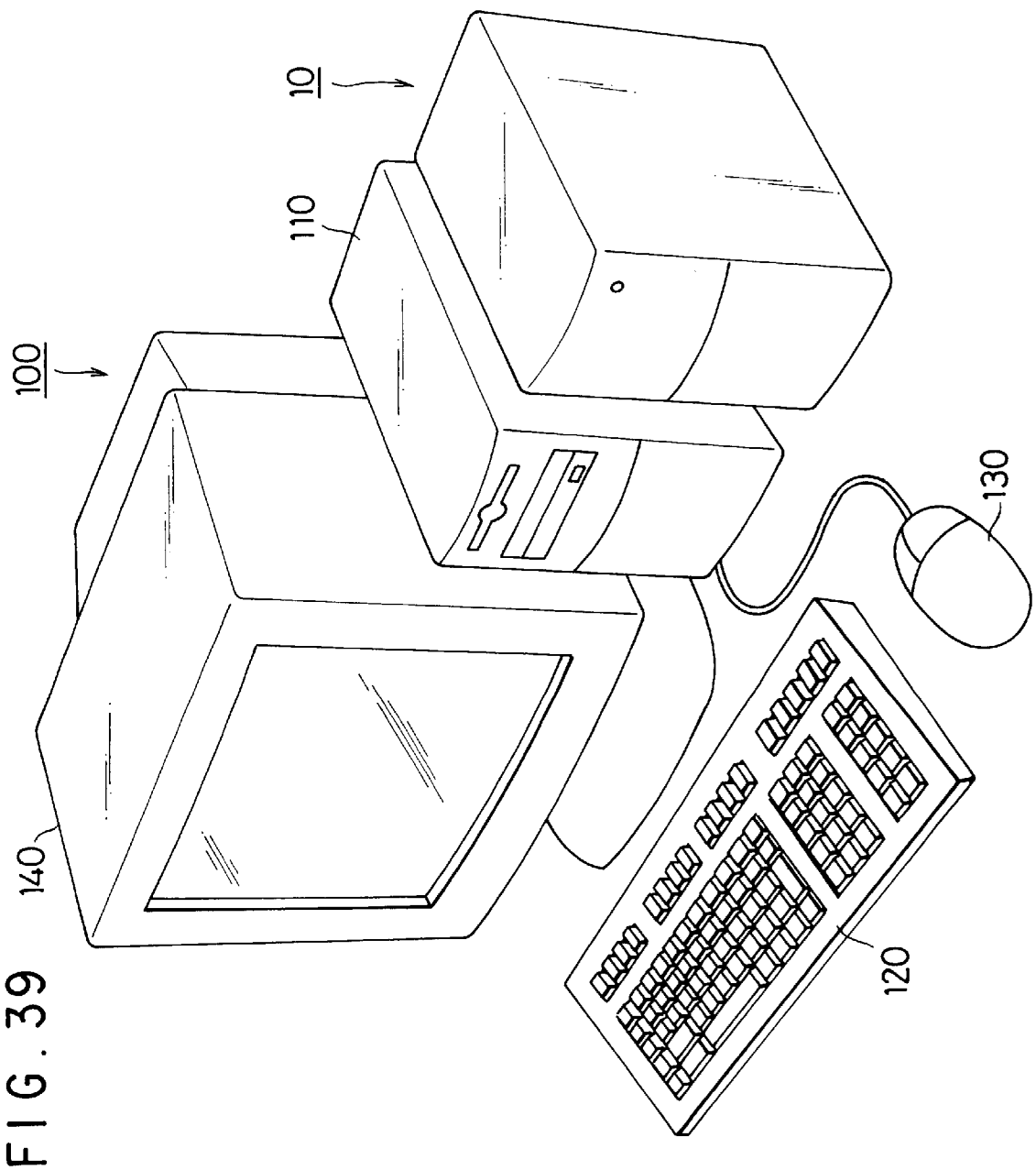
FIG. 39 is a perspective view for showing a state in which the recording medium exchanging-type recording and reproducing apparatus is installed as an external memory device for a personal computer.

FIG. 39 indicates a case in which the recording medium exchanging-type recording and reproducing apparatus 10 is used as an external memory device for a personal computer 100.

The recording medium exchanging-type recording and reproducing apparatus 10 is configured such that a cover 13 is installed at the casing 12 to cause the inner side of the casing 12 to be closed against the outside, and a so-called fitted structure is attained.

The personal computer 100 is composed of a main body 10 having a mother board or a hard disk drive stored therein, a key-board 120, a mouse 130 and a display device 140 and the like. The main body 110 shows a rectangular parallelepiped having a vertical height, a lateral width and a longitudinal length.

If the recording medium exchanging-type recording and reproducing apparatus 10 is constituted to have the same height, width and length as those of the main body 110, it can be arranged on a desk or the like side-by-side on the main body 110, and the personal computer 100 and the recording medium exchanging-type recording and reproducing apparatus 10 can be arranged compact in a certain limited space.

Describing more practically, the recording medium exchanging-type recording and reproducing apparatus of the present invention is constituted such that the mother board called as a micro ATX for a personal computer widely known in the art has a rectangular shape with longitudinal and lateral size of 244 mm and when it is arranged side-by-side in a main body of the personal computer of a so-called micro-tower size having the mother board stored therein, it has the same height, width and length as those of the main body.

In addition, the main body 110 and the recording medium exchanging-type recording and reproducing apparatus 10 have approximately the same projecting area at its bottom surface, so that it is also possible that these main body 110 and the recording medium exchanging-type recording and reproducing apparatus 10 are integrally overlapped in an upward or downward direction.

In this case, the personal computer having a large memory capacitance can be constituted by connecting the main body 110 and the recording medium exchanging-type recording and reproducing apparatus 10 without using any connector cable.

In addition, in the case of the recording medium exchanging-type recording and reproducing apparatus of the present invention, a data cartridge (a data 8 mm cassette) is used as the tape cartridge 2, thereby a certain TV program can be recorded and reproduced for a long period of time and a TV program recording and reproducing system not requiring any reservation for recording as described below can be constituted.

That is, since the data cartridge has a memory capacity of 50 GB to 100 GB per one cartridge, the recording medium exchanging-type recording and reproducing apparatus in the first preferred embodiment has a memory capacity totaling twenty data cartridges, i.e. a memory capacity of 1 TB (terabyte) to 2 TB.

The memory capacity of 1 TB to 2 TB is a memory capacity in which animation images compressed with MPEG2 of bit rate of about 6 Mbps, for example, can be recorded for about 370 to 740 hours.

Accordingly, it becomes possible to perform a recording of animation images for 1 to 2 weeks upon daily recording of 5 channels for about 10 hours a day of a TV broadcasting, resulting in that repetition of recording of such TV programs as above enables a program recording and reproducing system to be constituted in which optional programs up to 1 to 2 weeks before can always be reproduced and seen on a TV screen and so it is not necessary to perform a reservation in recording TV programs.

In addition, although application of the data cartridge (a data 8 mm cassette) as the tape cartridge 2 in the first preferred embodiment has been described, it is normally applied that the data cartridge has a lock mechanism for the opening or closing lid 216. However, the first preferred embodiment has been described under an assumption that the tape cartridge 2 has no lock mechanism. This is meant such that the lock mechanism prevents the opening or closing lid 216 from being accidentally opened when the tape cartridge 2 is removed from the recording and reproducing apparatus, and in the case of the fitted structure, a user does not take out the tape cartridge 2 and the lock mechanism is not required.

However, in the case of the present invention, a normal tape cartridge 2 having the lock mechanism may be used and there may be provided a lock releasing means for releasing a locked state of the lock mechanism just before the tape cartridge 2 is installed at the recording and reproducing mechanism 40.

It is also possible to constitute the recording medium exchanging-type recording and reproducing apparatus of the present invention as a video apparatus capable of recording or reproducing a large amount of videograms (video software).

If video tape cartridges for recording animation and voice or sound are used as the tape cartridges 2 and the recording or reproducing of each of the tape cartridges 2 is carried out by the recording and reproducing mechanism 18, a large amount of videograms (video software) such as movies or dramas can be recorded or reproduced because a large number of tape cartridges 2 are stored in the first magazine 14 and the second magazine 16. In addition, storing a large amount of videograms (video software) eliminates a troublesome operation for loading or removing the tape cartridges 2 when the videograms (video software) are seen or recorded.

Then, referring to the drawings, a second preferred embodiment of the present invention will be described as follows.

Figure 41:
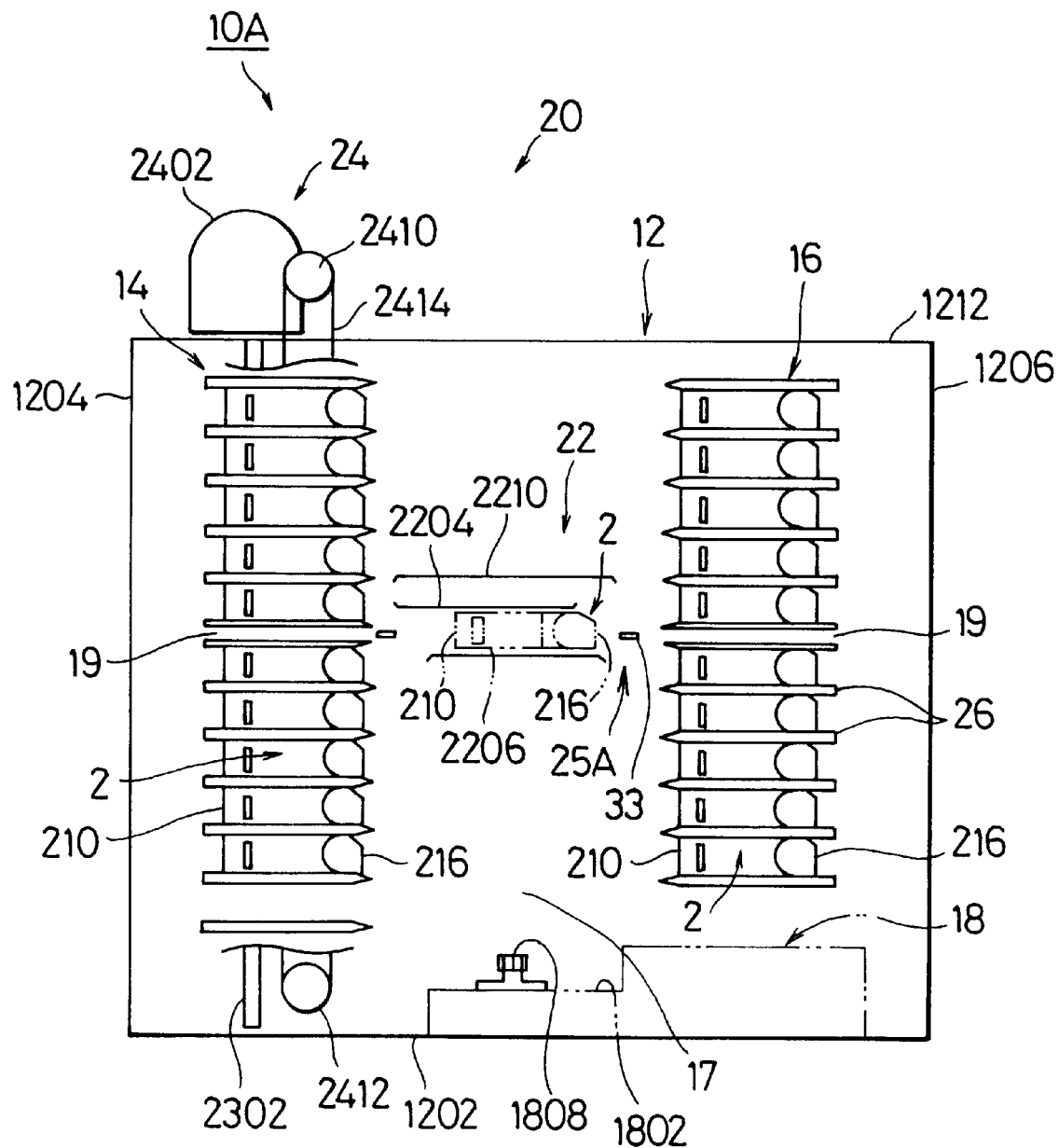
FIG. 41 is a front elevational view for showing a recording medium exchanging-type recording and reproducing apparatus in accordance with a second preferred embodiment.
Figure 42:
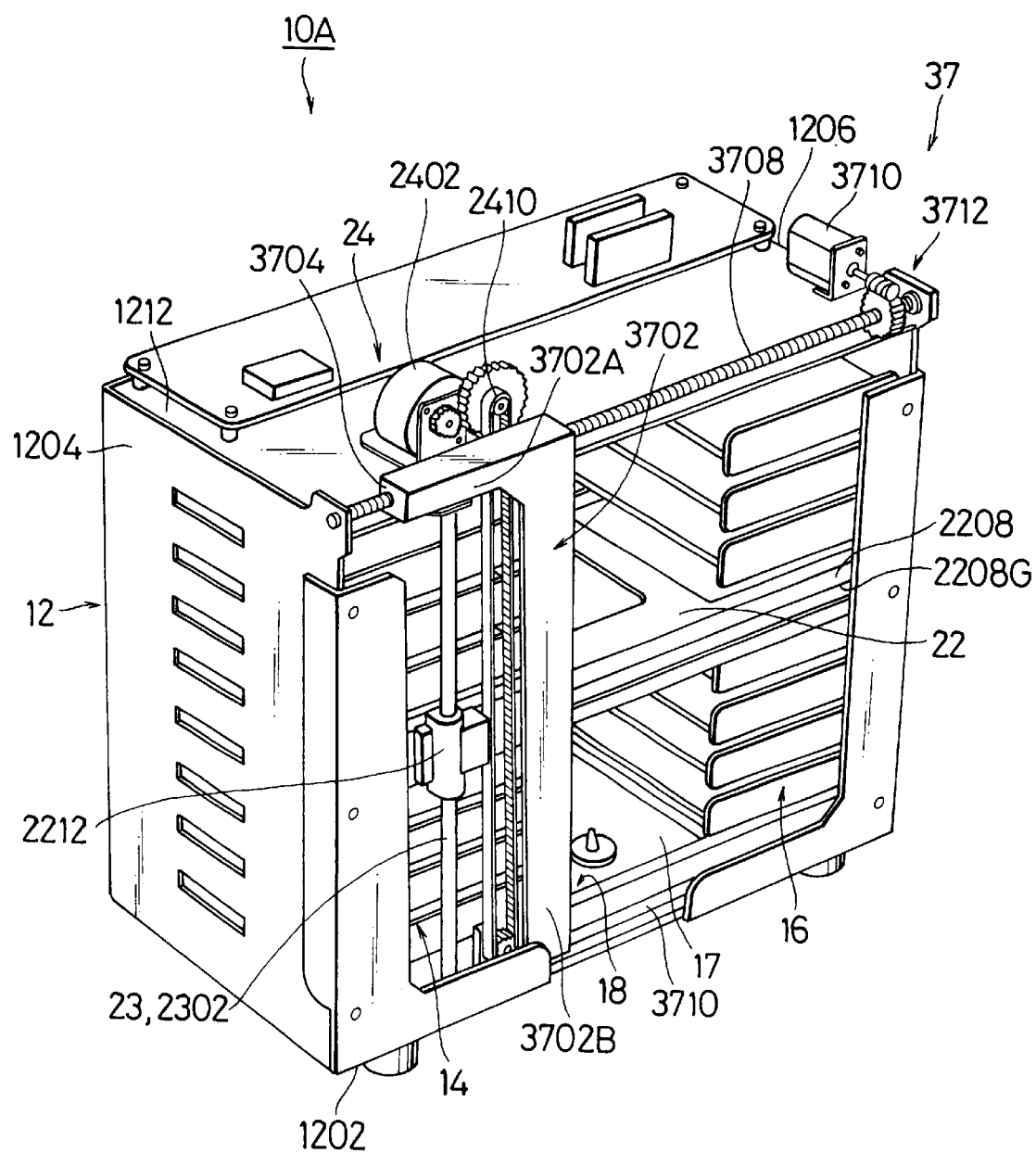
FIG. 42 is a perspective view for showing from a slant forward direction a state in which the delivering member is positioned at the first magazine in the recording medium exchanging-type recording and reproducing apparatus in accordance with the second preferred embodiment.
Figure 43:
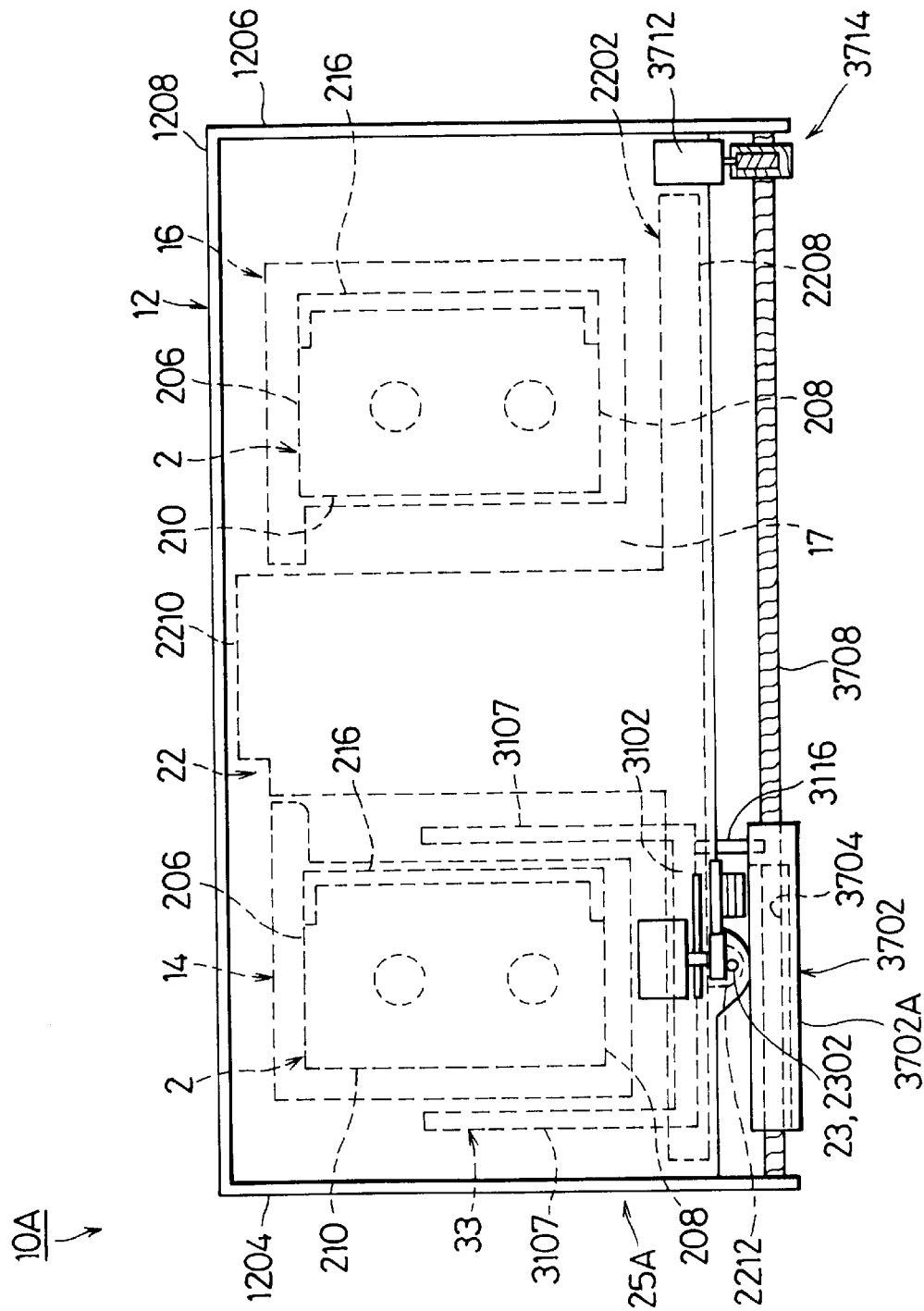
Figure 44:
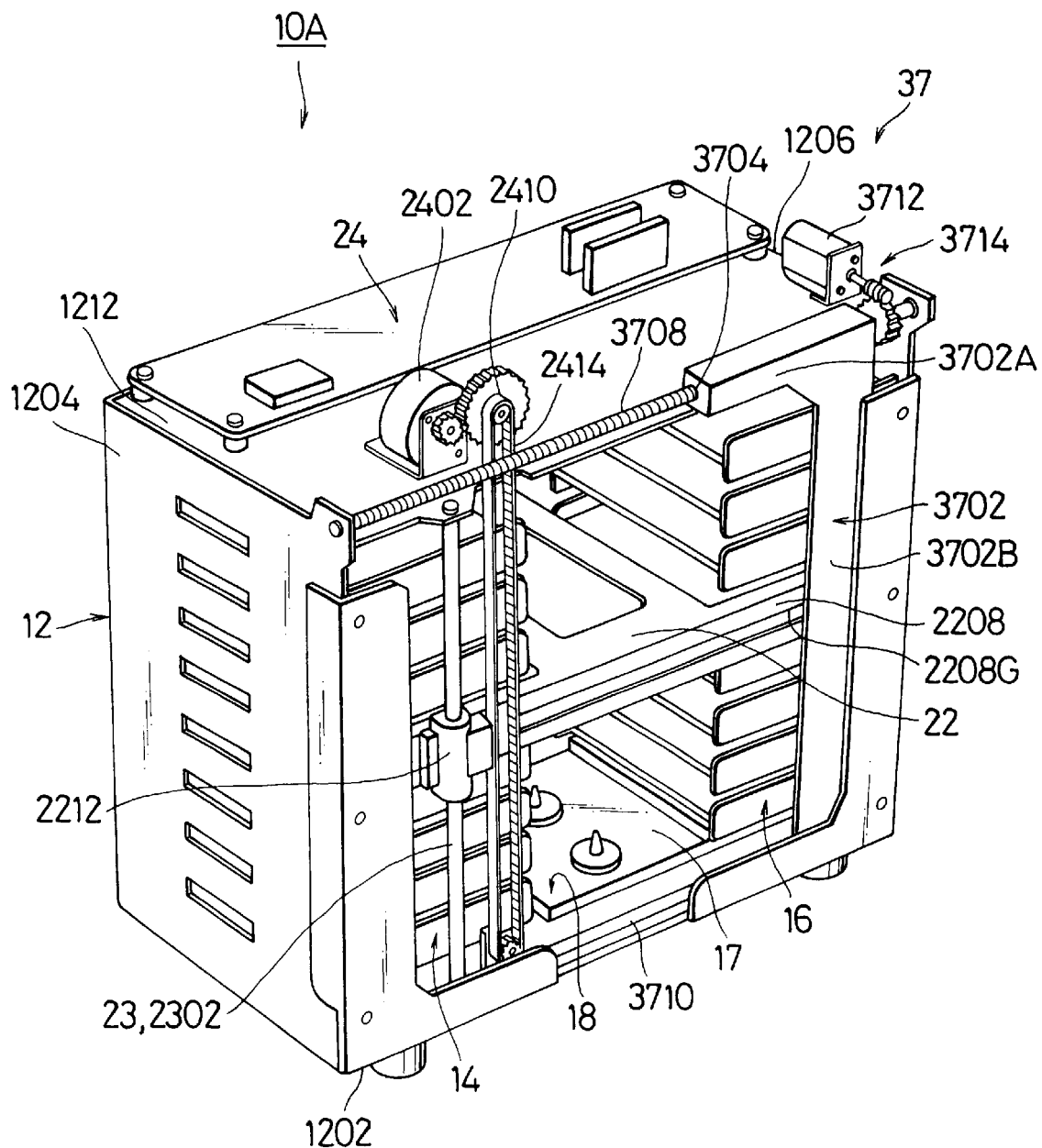
FIG. 44 is a perspective view for showing from a slant forward direction a state in which the delivering member is positioned at the second magazine in the recording medium exchanging-type recording and reproducing apparatus in accordance with the second preferred embodiment.
Figure 45:
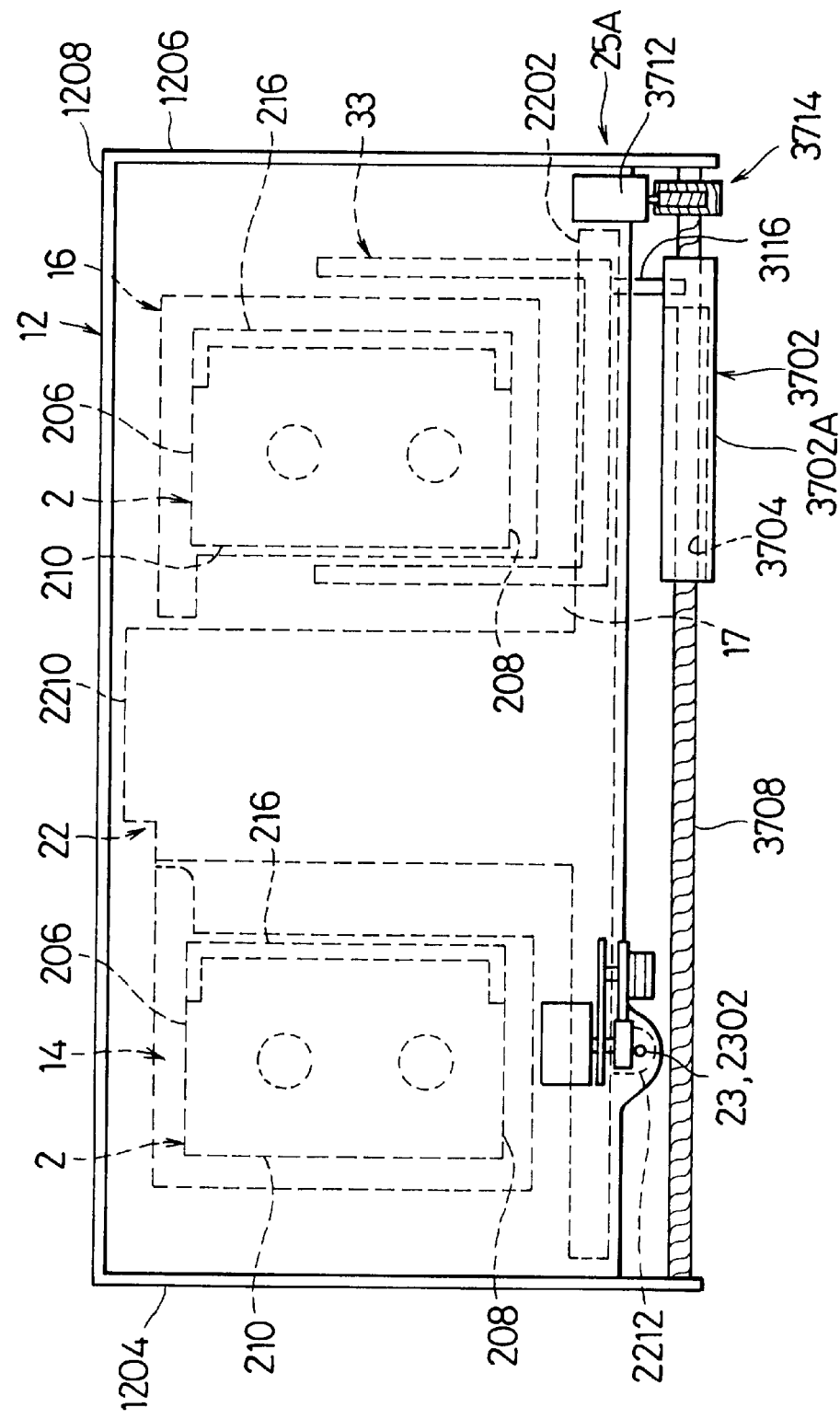
Figure 46:
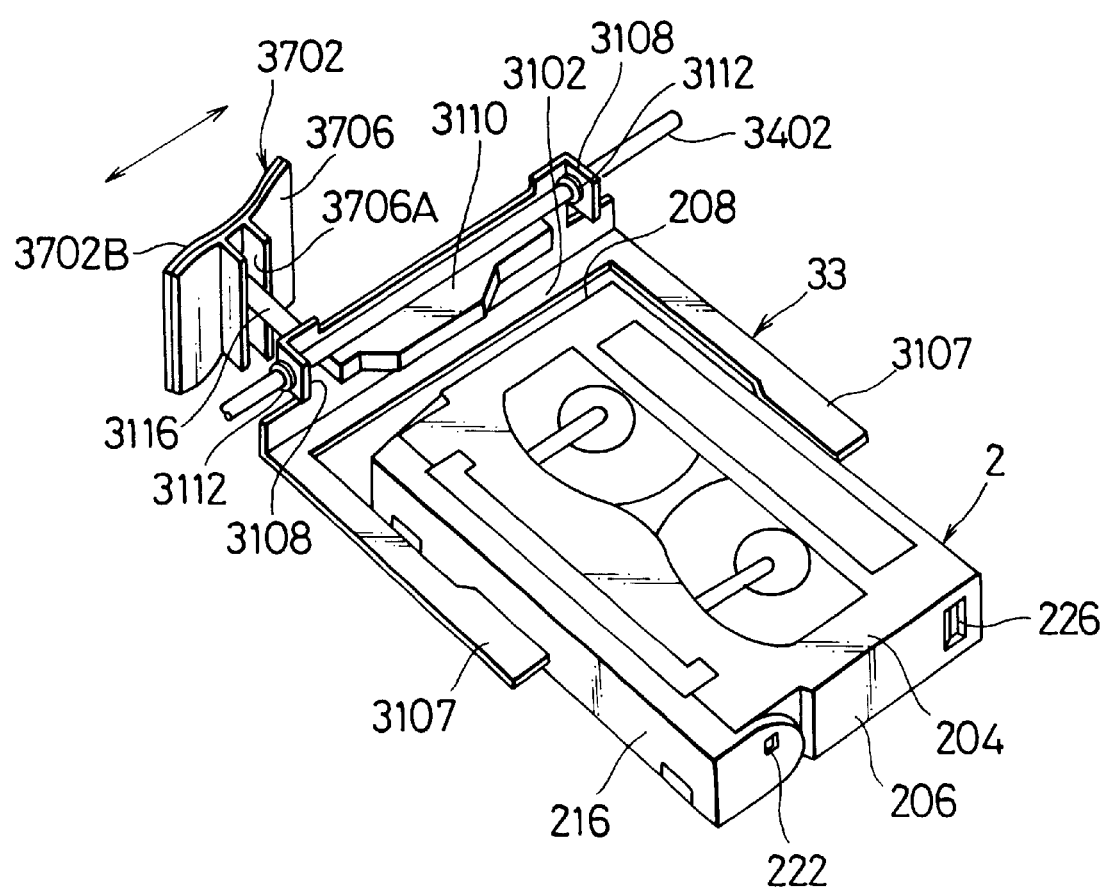
FIG. 46 is a perspective view for illustrating an engaged state between the slide member and the delivering member.

FIG. 41 is a front elevational view for showing a recording medium exchanging-type recording and reproducing apparatus in accordance with a second preferred embodiment, FIG. 42 is a perspective view for showing from a slant forward direction a state in which the delivering member is positioned at the first magazine in the recording medium exchanging-type recording and reproducing apparatus in accordance with the second preferred embodiment, FIG. 43 is a top plan view in which FIG. 42 is seen from above, FIG. 44 is a perspective view for showing from a slant forward direction a state in which the delivering member is positioned at the second magazine in the recording medium exchanging-type recording and reproducing apparatus in accordance with the second preferred embodiment, FIG. 45 is a top plan view in which FIG. 44 is seen from above, and FIG. 46 is a perspective view for illustrating an engaged state between the slide member and the delivering member.

In FIGS. 41 to 46, the same members and locations as those of the first preferred embodiment are denoted by the same symbols in the first preferred embodiment and described.

As shown in FIGS. 41 and 42, portions of the second preferred embodiment differing from those of the first preferred embodiment consist in the fact that the delivering mechanism 25A for delivering the tape cartridge 2 among the first magazine 14, the second magazine 16 and the holding part 22 is constituted by a single delivering member 33, and the first magazine 14 and the second magazine 16 are provided with a moving space 19 through which the delivering member 33 may pass, and other portions are similar to those of the first preferred embodiment.

That is, each of the delivering members 33 is movably arranged along the first magazine 14, the second magazine 16 and the transferring space and at the same time, movably arranged between the first magazine 14 and the transferring space 17 and between the second magazine 16 and the transferring space 17.

Then, the delivering member 33 is constituted such that it is moved between the first magazine 14 and the second magazine 16 through the moving space.

The moving space 19 is arranged between the storing members 26 at an intermediate location of the first magazine 14 and the second magazine 16 in a longitudinal direction and extends in a direction crossing at a right angle with the longitudinal direction.

Each of the moving spaces 19 is positioned at the same position in the longitudinal direction while the transferring space 17 being held therebetween, and the single delivering member 33 of the delivering mechanism 25A passing through these moving spaces 19 is movable in a direction crossing at a right angle with the longitudinal direction.

As shown in FIGS. 41 and 43, the delivering mechanism 25A is composed of a single delivering member 33 for delivering the tape cartridge 2 among the first magazine 14, the second magazine 16 and the holding part 22; a guide part 34 for guiding the delivering member 33; and the driving part 37 for moving the delivering member 33.

The guide part 34 is composed of a second rod 3402 (corresponding to the guide member in the claim) extending in a direction parallel with the lateral piece 2208 of the frame 2202 and having each of both ends fixed to both ends of the lateral piece 2208 (refer to FIG. 46).

As shown in FIGS. 43 and 46, the delivering member 33 is composed of a linear base piece 3102 arranged in parallel with the lateral piece 2208 of the frame 2202; and two right and left delivering pieces 3107 protruded from both ends of the base piece 3102 and spaced apart in a longitudinal direction of the lateral piece 2208.

A size between the two delivering pieces 3107 is formed in a larger size than a width in lateral direction of the first magazine 14 and the second magazine 16 in such a way that they can be moved in an upward or downward direction while straddling over the first magazine 14 and the second magazine 16, and further it is formed in a larger size than a width of the holding part 22 in a lateral direction in such a way that it may not be interfered with the holding part 22 when the tape cartridge 2 stored in the holding part 22 is installed at the recording and reproducing mechanism 18 to be described later.

As shown in FIGS. 43 and 46, both ends of the base piece 3102 are provided with connecting pieces 3108, a metallic bearing 3112 is fixed to each of the connecting pieces 3108, the second rods 3402 are slidably connected to these metallic bearings 3112, the metallic bearings 3112 are connected to the second rods 3402, the delivering member 33 is arranged in the casing 12 in such a way that it can be moved in a lateral direction along the second rods 3402 and it can be turned around axes of the second rods 3402.

The base piece 3102 of the delivering member 33 connected to the second rod 3402 is arranged more forwardly than the first magazine 14 and the second magazine 16 in such a way that the two delivering pieces 3107 can be moved in an upward or downward direction while straddling the first magazine 14 and the second magazine 16.

Accordingly, the delivering member 33 is also constituted such that motion of the frame 2202 by the driving part 24 causes the delivering member to be moved up and down integrally with the holding part 22 through the frame 2202.

As shown in FIG. 46, cam members 3110 are fixed at locations of the base piece 3102 facing against the first magazine 14 and the second magazine 16. The cam members 3110 release the engaged states of the engagement claw 2830A against the notch 220 and the hole 224 of the tape cartridge 2 by depressing the pressing protrusion 2830B of the engagement member 2830 of the magazine block 28 in the first magazine 14 and the second magazine 16.

Locations of the base piece 3102 of the delivering member 33 and the locations opposite to the two delivering pieces 3107 are provided with engagement pins 3116 toward the front side of the casing 12. The engagement pins 3116 pass through grooves 2208G arranged at the lateral piece 2208 and protrude up to the front surface side of the lateral piece 2208.

The configuration in which each of the delivering pieces 3107 is turned in a turning direction under a state in which it is rotatably connected around the second rod 3402 is the same as that of the first preferred embodiment.

As shown in FIGS. 43 and 44, the driving part 37 is composed of a slide member 3702 connected to the delivering member 33 to transmit the driving force; a female threaded part 3704; a guide member 3706 (refer to FIG. 46); a driving shaft 3708; a rod 3710 for guiding the slide member 3702 in a lateral direction; a motor 3712; and a gear reducer mechanism 3714 and the like.

The driving shaft 3708 is formed with a male thread at its outer circumference, its both ends are rotatably attached at the upper front portions of the side walls 1204, 1206 of the casing 12 and the driving shaft is arranged to extend in a lateral direction.

The rod 3710 is fixed at its both ends to the lower front portions of the side walls 1204, 1206 of the casing 12 and the rod is arranged to extend in a lateral direction.

The slide member 3702 is composed of a lateral piece 3702A extending in a lateral direction, and a longitudinal piece 3702B extending from the right end of the lateral piece 3702A in a downward direction.

The female threaded part 3704 is arranged at the rear surface of the lateral piece 3702A and threadably engaged with the male threaded part of the driving shaft 3708.

AS shown in FIG. 46, the guide member 3706 has a concave guide groove 3706A arranged at the rear surface side of the longitudinal piece 3702B of the slide member 3702 and released rearwardly.

The lower part of the longitudinal piece 3702B of the slide member 3702 is slidably connected to the rod 3710, thereby the slide member 3702 is arranged to be movable in a lateral direction while the lateral piece 3702A extends in a lateral direction at a position near the front part of the casing 12 and the longitudinal piece 3702B keeps a state extended in a vertical direction.

As shown in FIG. 46, the engagement pin 3116 is engaged with the guide groove 3706A of the guide member 3706 in such a way that it can be slid in an upward or downward direction and immovable in a lateral direction. Further, although it is not shown in FIG. 46, the engagement pin 3116 protrudes from the front surface of the lateral piece 2208 of the frame 2202 through the groove 2208G in the same manner as that of the first preferred embodiment.

Accordingly, connection between the guide member 3706 and the delivering member 33 is carried out by engaging the engagement pin 3116 with the guide groove 3706A, thereby the delivering member 33 is moved in a lateral direction integrally with the slide member 3702 irrespective of the vertical position of the delivering member 33.

The motor 3712 and the gear reducer mechanism 3714 are arranged at the right front part of the upper surface of the upper wall 1212 of the casing 12. The gear reducer mechanism 3714 is composed of a worm gear fixed to the driving shaft of the motor 3712 and a gear arranged at the driving shaft 3708.

After the driving force of the motor 3712 is reduced in its speed by the gear reducer mechanism 3714, the driving force is transmitted to the female threaded part 3704 through the driving shaft 3708, thereby the delivering member 33 is moved in a lateral direction.

Further, configuration of the slit or sensor for use in performing a positional sensing in a sliding direction of the slide member 3702 is similar to that of the first preferred embodiment and the controlling operation of the motor 3712 performed in response to the detecting signal of the sensor is similar to that of the first preferred embodiment.

Further, it is constituted such that when the delivering member 33 is set to be positioned at a first position (refer to FIG. 43) where the delivering member 33 holds (straddles) the first magazine 14 by the driving part 37 between each of the delivering pieces 3107, a clearance is assured between each of the delivering pieces 3107 and the first magazine 14, respectively, and it can be moved up and down under a state in which the first magazine 14 is being held. Similarly, it is constituted such that when the delivering member 33 is set to be positioned at a third position (refer to FIG. 45) where the delivering member 33 holds (straddles) the second magazine 16 by the driving part 37 between each of the delivering pieces 3107, a clearance is assured between each of the delivering pieces 3107 and the second magazine 16, respectively, and it can be moved up and down under a state in which the second magazine 16 is being held.

Further, it is constituted such that when the delivering member 33 is set to be positioned at a second position where the delivering member 33 holds (straddles) the holding part 22 by the driving part 37 between each of the delivering pieces 3107, a clearance is assured between each of the delivering pieces 3107 and the holding part 22, between one delivering piece 3107 and the first magazine 14 and between the other delivering piece 3107 and the second magazine 16, respectively, and it can be moved up and down integrally together with the holding part 22 under a state in which the holding part 22 is being held.

That is, each of the delivering members 33 is movably arranged along the first magazine 14, the second magazine 16 and the transferring space 17.

Since the recording and reproducing mechanism 18, the lock mechanism 40 and the control part have the same constitution as that of the first preferred embodiment, their description will be eliminated.

Then, an operation of the recording medium exchanging-type recording and reproducing apparatus will be described.

Its operation overlapping that of the first preferred embodiment will not be described.

At first, there will be described an operation performed under the operation of the operating part in which the desired tape cartridge 2 stored in the first magazine 14 is recorded or reproduced by the recording and reproducing mechanism 18.

As its initial state, it is assumed that the holding part 22 is positioned at the lower-most position, the delivering member 33 is placed at a second position where the holding part 22 is held between each of the delivering pieces 3107, no tape cartridge 2 is stored at the holding part 22, and accordingly, no tape cartridge 2 is installed at the recording and reproducing mechanism 18.

Under this state, the driving part 24 is controlled and the holding part 22 is moved upwardly to the position corresponding to a height of the moving space 19.

Then, the driving part 37 is controlled and the delivering member 33 is moved in a leftward direction from the holding part 22 toward the first magazine 14. With such an arrangement as above, the delivering member 33 is set to be positioned at the first position (FIG. 43) where each of the delivering pieces 3107 passes through the moving space 19 and straddles the first magazine 14.

Then, the driving part 24 is controlled under a state in which the delivering member 33 is placed at the first position to cause the holding part 22 to be moved to a position corresponding to the height of the storing space 27 where the desired tape cartridge 2 is stored. With such an arrangement as above, the delivering member 33 is also moved together with the holding part 22.

Then, the driving part 37 is operated to cause the delivering member 33 to move from the first magazine 14 toward the holding part 22 in a rightward direction.

When the delivering member 33 moves in the casing 12 in a lateral direction, each of the delivering pieces 3107 passes through a substantial central position of a clearance T2 between the upper surface of the main body plate 2206A and the lower surface of the main body plate 2204A.

Then, the left delivering piece 3107 of the delivering member 33 abuts against the rear surface 210 of the tape cartridge 2 to cause it to be depressed toward the transferring space 17, the tape cartridge 2 is transferred from the storing space 27 for the first magazine 14 toward the storing space 29 of the holding part 22.

Each of the upper surface 204, the lower surface 212 and the side surfaces 206, 208 of the tape cartridge 2 is guided by the lower surface and the upper surface of the supporting piece 2808 of the magazine block 28, the walls 2802, 2818, and at the same time guided by the main body plates 2204A, 2206A, the side walls 2204B, 2206C of the holding part 22 and stored in the storing space 29.

As described above, when the tape cartridge 2 is stored in the storing space 29, the roller 2206K arranged at the holding part 22 is engaged with the notch groove 226 of the tape cartridge 2, thereby a position of the tape cartridge 2 in its forward or rearward direction is held in the storing space 29 for the tape cartridge 2.

Then, the driving part 37 is con trolled and the delivering member 33 is set to be positioned at the second position.

As the driving part 24 is controlled from this state by the control part, the holding part 22 having the tape cartridge 2 stored therein and the delivering member 33 move downwardly within the transferring space 17, and the tape cartridge 2 is moved toward the installing part 1802.

When the tape cartridge 2 is installed at the installing part 1802, each of the delivering pieces 3107 of the delivering member 33 is set to a position where it is interfered with the cover 1806. However, the holding part 22 moves downwardly under a state in which each of the delivering pieces 3107 abuts against the cover 1806, the delivering member 33 is turned upwardly around an axis of the second rod 3402. With such an arrangement as above, since each of the delivering pieces 3107 releases from the cover 1806, a trouble in operation caused by interference between the delivering member 33 and the cover 1806 is avoided.

Then, each of the reel shafts 1808 of the loading part 1802 is fitted to each of the bearings 219 of the tape cartridge 2 as the holding part 22 moves downwardly, and the tape cartridge 2 is installed.

When the tape cartridge 2 is installed at the installing part 1802, loading operation and recording or reproducing operation are carried out at the recording and reproducing part 1804.

Then, upon completion of either recording or reproducing operation performed by the recording and reproducing part 1804 of the recording and reproducing mechanism 18, the tape cartridge 2 is returned back to the storing space of the original magazine.

That is, the tape loaded by the recording and reproducing part 1804 is stored in the tape cartridge 2.

Then, the holding part 22 is moved upwardly within the transferring space 17 while the driving part 24 is being controlled, the fitted state between each of the reel shafts 1808 of the loading part 1802 and each of the bearings 219 of the tape cartridge 2 is released, and the holding part 22 is moved upwardly, the abutment between each of the delivering pieces 3107 and the cover 1806 is released, thereby the delivering member 33 returns back to the attitude in which it extends in a horizontal direction by the biasing means for the delivering member.

Then, the holding part 22 is positioned at the location corresponding to the height of the storing space 27 having the tape cartridge 2 stored therein through further upward motion of the holding part 22.

Then, upon operation of the driving part 37, the delivering member 33 is moved from the second position toward the first magazine 14. That is, the tape cartridge 2 is transferred from the storing space 29 of the holding part 22 toward the storing space 27 of the first magazine 14 by a method wherein the right side delivering piece 3107 of the delivering member 33 abuts against the opening or closing lid 216 of the tape cartridge 2 and performs a depression from the storing space 29 of the holding part 22 toward the storing space 27 of the first magazine 14. With such an arrangement as above, the tape cartridge 2 is stored in the storing space 27 of the first magazine 14 and the delivering member 33 is set to be positioned at the first position.

Then, a delivering operation for the tape cartridge 2 performed between the second magazine 16 and the holding part 22 and the recording and reproducing operation at the recording and reproducing mechanism 18 will be described as follows.

As shown in FIGS. 44 and 45, the operation for transferring the tape cartridge 2 from the second magazine 16 toward the holding part 22 is the same as the transferring operation for the tape cartridge 2 from the above-mentioned first magazine 14 toward the holding part 22 except the fact that the delivering member 33 passes through the moving space 19 and moves toward the second magazine 16.

In addition, the operation in which the tape cartridge 2 is removed from the recording and reproducing mechanism 18 is the same as the above-mentioned operation.

In addition, the operation for transferring the tape cartridge 2 from the holding part 22 toward the second magazine 16 is also the same as the above-mentioned operation except the fact that the delivering member 33 is moved from the holding part 22 toward the second magazine 16.

As described above in detail, in accordance with the operation of the recording medium exchanging-type recording and reproducing apparatus of the second preferred embodiment, following effects can be attained in addition to the effects of the first preferred embodiment.

That is, since the delivering mechanism is constituted to have a single delivering member, the number of component parts of the delivering mechanism can be reduced and it is advantageous in view of making light weight and reducing cost.

In addition, at least one storing space 27 for the first magazine 14 and the second magazine 16 is kept as a vacant space not storing the tape cartridge 2, thereby the storing positions of the desired tape cartridges 2 stored in the first magazine 14 and the second magazine 16 can be exchanged.

That is, one tape cartridge 2 desired to be exchanged in its position is stored in the storing space 27 where the other tape cartridge 2 has already been stored under a state in which the other tape cartridge 2 of the two tape cartridges of which positions are desired to be exchanged is being stored in the vacant space. Then, it is satisfactory that one tape cartridge 2 which has been stored in the vacant space is stored in the storing space 27 where the other tape cartridge 2 has already been stored.

Further, in the second preferred embodiment, although the moving space 19 is arranged at the intermediate location in the longitudinal direction of the first magazine 14 and the second magazine 16, it is satisfactory that the moving space 19 is arranged outside the storing members 26 positioned at the end parts in a longitudinal direction of the first magazine 14 and the second magazine 16.

In addition, it may also be applicable that each one of each of the storing spaces 27 of the first magazine 14 and the second magazine 16 is set as a space not storing the tape cartridge 2, and these vacant storing spaces 27 are used as the moving space 19.

Since the recording medium exchanging-type recording and reproducing apparatus 10 in the first and second preferred embodiments has a fitted structure, it has been described as one in which a user cannot take out the tape cartridge from the recording medium exchanging-type recording and reproducing apparatus 10, although it may also be constituted that either the casing 12 or the cover of the recording medium exchanging-type recording and reproducing apparatus 10 is provided with an opening (a slit) and the tape cartridges 2 stored in the first magazine 14 and the second magazine 16 can be exchanged through this opening.

In addition, it is also applicable to have a structure that either a part of or all the first magazine 14 and the second magazine 16 fitted to the casing 12 can be exchanged from outside the casing 12.

In addition, it is also applicable to constitute such that the tape cartridge 2 can be exchanged from outside the casing 12 as found in the third preferred embodiment described as follows.

Referring now to the drawings, a third preferred embodiment of the present invention will be described as follows.

Figure 47:
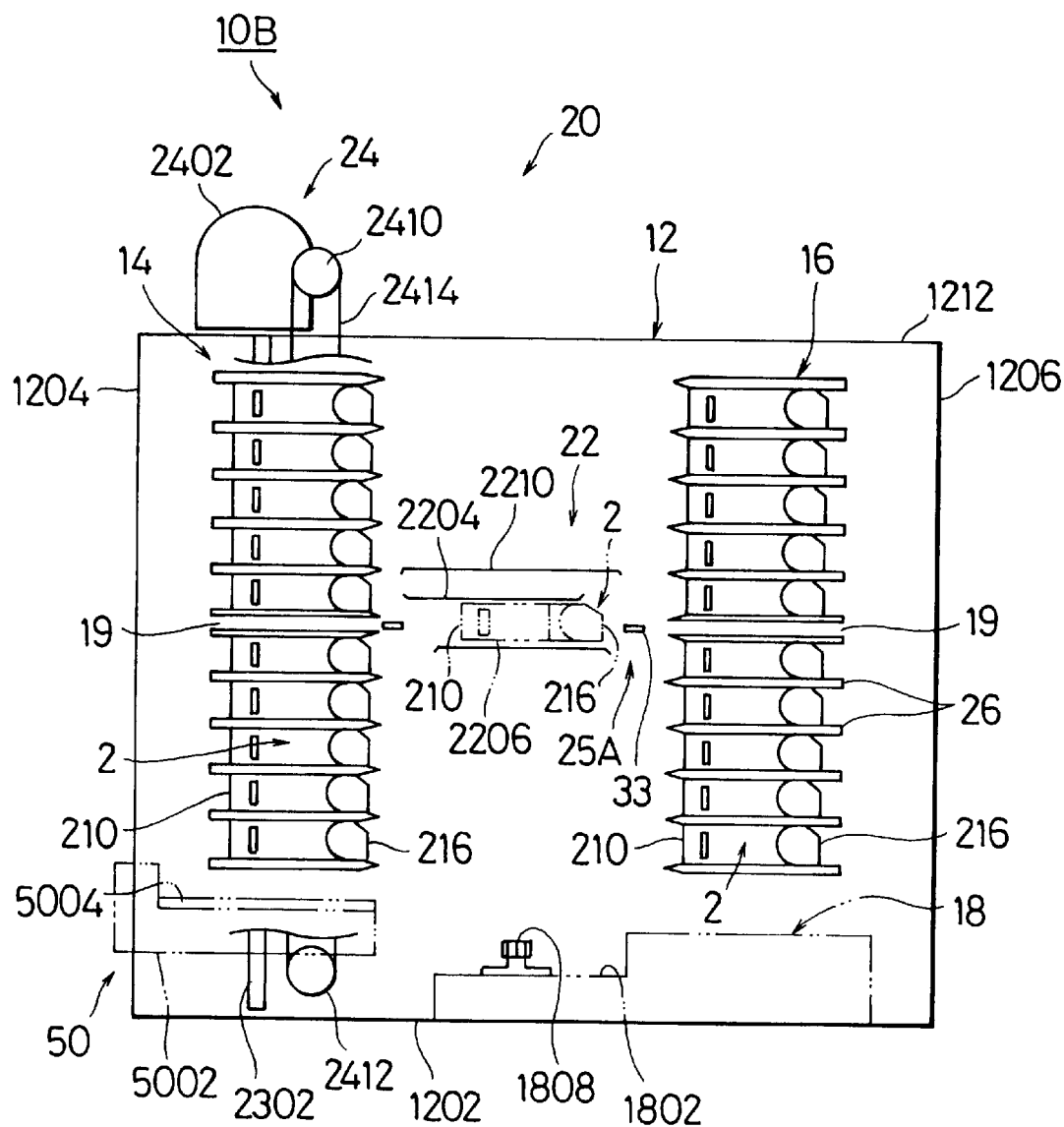
FIG. 47 is a front elevational view for showing a recording medium exchanging-type recording and reproducing apparatus in accordance with a third preferred embodiment.
Figure 49:
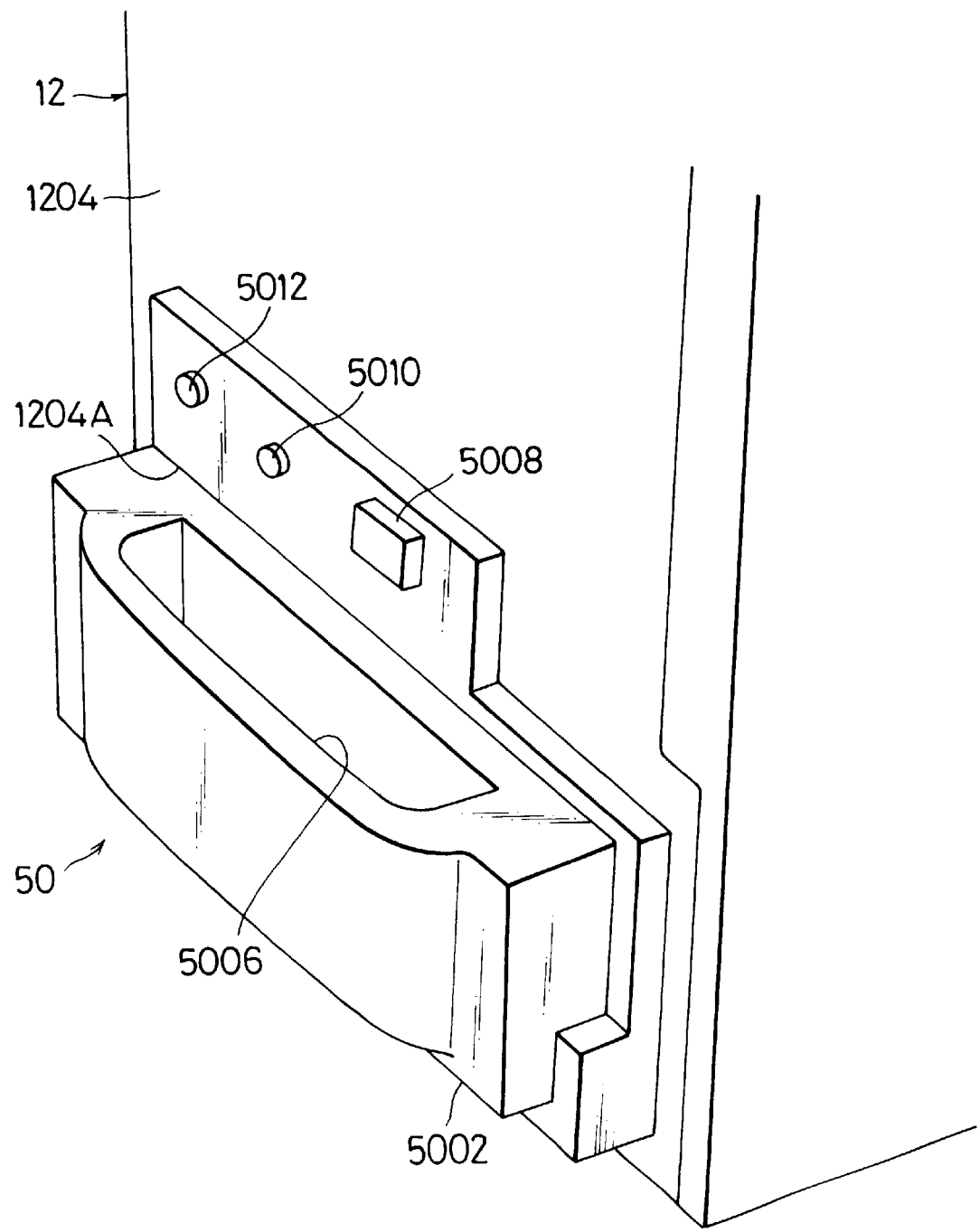
FIG. 49 is an enlarged perspective view for illustrating a taking-out part in accordance with a third preferred embodiment.

FIG. 47 is a front elevational view for showing a recording medium exchanging-type recording and reproducing apparatus in accordance with a third preferred embodiment, FIG. 48 is a perspective view for showing from a slant forward direction a recording medium exchanging-type recording and reproducing apparatus in accordance with a third preferred embodiment, and FIG. 49 is an enlarged perspective view for illustrating a taking-out part in accordance with a third preferred embodiment.

In FIGS. 47 to 49, the same portions as those of the second preferred embodiment or their corresponding portions are denoted by the same symbols in FIGS. 41 to 46 indicating the second preferred embodiment and will be described.

As shown in FIGS. 47 and 48, the portions of the third preferred embodiment differing from those of the second preferred embodiment consist in the fact that the end of the first magazine 14 in a longitudinal direction is provided with a taking-out part 50 capable of delivering the tape cartridge 2 between it and the delivering mechanism 25A.

As shown in FIGS. 47 and 48, the taking-out portion 50 is composed of a tray 5002 capable of being arranged to be extended or retracted in a direction crossing at a right angle with the longitudinal direction of the first magazine 14 through an opening 1204A arranged at the lower part of the side wall 1204 of the casing 12; and a storing space 5004 arranged at the tray 5002 to store the tape cartridge 2.

The taking-out part 50 is constructed such that the storing space 5004 is positioned at the lower end of the first magazine 14 in its longitudinal under a state in which the tray 5002 is stored in the casing 12, the tape cartridge 2 stored at the holding part 22 is delivered to the storing space 5004 by the delivering mechanism 25A, and the tape cartridge 2 stored in the storing space 5004 is delivered to the holding part 22.

The taking-out part 50 is constituted such that the tape cartridge 2 stored in the storing space 5004 can be exchanged under a state in which it is taken out from within the casing 12.

A location of the taking-out part 50 facing outside is provided with a handle part 5006 for applying a hand to take out the taking-out part 50 outside the casing 12.

In addition, there is provided a lock mechanism (not shown) for locking the state in which the taking-out part 50 is stored in the casing 12. This lock mechanism is constituted such that a locked state and an unlocked state are controlled by the controlling part to be described later.

As shown in FIG. 49, the outside location of the casing 12 above the opening 1204A is provided with a locked state releasing button 5008 for releasing the locked state of the lock mechanism; a lock lamp 5010 indicating that the lock mechanism is in a locked state; and a lock releasing lamp 5012 indicating that the lock mechanism is in an unlocked state.

It is constituted such that an operating signal output ted when the locked state releasing button 5008 is operated is inputted to the control part and a driving signal for operating the lock lamp 5010 and the locked state releasing lamp 5012 is inputted from the control part.

Then, the taking-out operation for the tape cartridge 2 will be described as follows.

Normally, the lock mechanism is controlled to have a locked state under an operation of the control part, the lock lamp 5010 is controlled to show a lit state and the locked state releasing lamp 5012 is controlled to show a light turned-off state.

Then, when the operating part is operated to instruct a taking-out operation for the desired tape cartridge 2, the control part operates the moving mechanism 20 and the delivering mechanism 25A, takes out the desired tape cartridge 2 from either the first magazine 14 or the second magazine 16, delivers it to the holding part 22 and further delivers it from the holding part 22 to the taking-out part 50.

Then, the locked state of the lock mechanism is released, the lock lamp 5010 is controlled to have a turned-off state and the locked state releasing lamp 5012 is controlled to have a lit state.

After an operator acknowledges the lit state of the locked state releasing lamp 5012, the locked state releasing button 5008 is operated and the controlling part releases the lock mechanism in response to an operating signal inputted from the locked state releasing button 5008, resulting in that the taking-out part 50 can be taken out.

Accordingly, in accordance with the above-mentioned constitution, it is possible to take out the desired tape cartridge 2 in the tape cartridges 2 stored in the casing 12 of the recording medium exchanging-type recording and reproducing apparatus 10B and replace it.

In addition, in the third preferred embodiment, it is also possible to constitute the specified tape cartridge 2 so as to prohibit its taking-out operation. A constitution for prohibiting the taking-out of the specified tape cartridge 2 will be described as follows.

As the tape cartridge 2 of which taking-out is prohibited, there are provided a tape cartridge of which copying is prohibited in view of a copy right law, for example; a tape cartridge of which applied region is specified as found in a regional code; or a tape cartridge of which taking-out is prohibited by a permitted person as found in a parent lock and the like.

The controlling part (a control means) is constituted such that when a taking-out of the tape cartridge 2 prohibiting its taking-out is instructed from the operating part, the locking of the lock mechanism is not released, the lock lamp 5010 is kept as it is in its lit-state, the locked state releasing lamp 5012 is illuminated for a specified period of time to inform that the locked state releasing is prohibited, i.e. the taking-out of the specified tape cartridge 2 is prohibited.

In accordance with such a constitution as described above, it is possible to prohibit taking-out of the tape cartridge 2 of which taking-cut is prohibited in advance from the casing 12 of the recording medium exchanging-type recording and reproducing apparatus 10B. In addition, a taking-out user visually acknowledges the state of the lock lamp 5010 and the locked state releasing lamp 5012 and can acknowledge that the tape cartridge 2 is prohibited against its taking-out.

In addition, it is also possible that the taking-out part 50 can be applied to the constitution of the recording medium exchanging-type recording and reproducing apparatus indicated in the first preferred embodiment. In this case, it becomes possible to take out the tape cartridges 2 in the first magazine 14 and the second magazine 16 by arranging the taking-out part 50 to each of the end portions of the first magazine 14 and the second magazine 16.

Although the first and the third preferred embodiments of the present invention have been described under an assumption that the recording and reproducing mechanism of the recording medium exchanging-type recording and reproducing apparatus performs both recording and reproduction, it may also be applicable that the recording and reproducing mechanism performs only one of the recording and reproducing operations.

In addition, although the first and third preferred embodiments have been described in reference to the recording medium exchanging-type recording and reproducing apparatus using a tape cartridge as the recording medium, the present invention is not restricted to this case.

For example, the present invention can be applied to the recording medium exchanging-type recording and reproducing apparatus in which there are provided a disc-like medium for recording information such as a floppy disk, a minidisc, MO and DVD or the like, and a case for storing the medium, and the recording medium where the fixing or removal of the recording and reproducing mechanism against the installing part is carried out under a specified attitude. In the case of such a recording medium exchanging-type recording and reproducing apparatus as described above, the installing part of the recording and reproducing mechanism is provided with the rotary driving mechanism installing the disc-like medium and rotationally driving it.

It is also possible to apply the present invention to the recording medium exchanging-type recording and reproducing apparatus using a semiconductor memory card, for example, comprised of a semiconductor memory acting as a recording medium, and a case having connector terminals storing this semiconductor memory and for performing a recording and reproduction against the semiconductor memory to its outer surface. In the case of such a recording medium exchanging-type recording and reproducing apparatus, the installing part of the recording and reproducing mechanism is provided with connectors to which the connector terminals are installed and the semiconductor card is operated such that its fixing or removal against the installing part is performed under a specified attitude.

What is claimed is:

1. A recording medium exchanging-type recording and reproducing apparatus, comprising:

two longitudinal first and second magazines, said magazines each having a plurality of storing members arranged in a linear form for storing recording media capable of recording and reproducing information, each recording medium having a substantially rectangular plate shape with a width in a first direction, a length in a second direction crossing at a right angle with the first direction, and a thickness in a third direction crossing at a right angle to the first and second directions, the width in the first direction being larger than the length in the second direction, and each recording medium being capable of being recognized in an attitude specified by orientations in two directions crossing at a right angle to each other in such a way that the recording medium can be inserted or taken out of said first and second magazines;

a recording and reproducing mechanism having an installing part where said recording medium is installed and for performing a recording and/or reproducing against said recording medium under a state in which said recording medium is installed at said installing part;

a moving mechanism having a holding part for holding the recording medium and for moving said recording medium between each of said storing members and the recording and reproducing mechanism; and a delivering mechanism for delivering said recording medium between each of said storing members and said holding part, wherein:

said first and second magazines are oppositely arranged in such a way that their longitudinal directions are in parallel to each other and the storing members are arranged to store the recording media with the thickness thereof in the longitudinal direction of the respective first and second magazines and the width thereof perpendicular to a direction of movement of the recording media between the storing members and the holding part;

a transferring space extending along the longitudinal directions of these first and second magazines is arranged between said first and second magazines;

a moving action of said recording medium with said holding part is carried out in said transferring space;

an attitude of said recording media stored in said first and second magazines and an attitude of said recording medium held at said holding part are the same to each other; and said recording medium is installed at said installing part while keeping an attitude in which said recording medium is held at said holding part and moved in said transferring space.

2. A recording medium exchanging-type recording and reproducing apparatus according to claim 1, wherein:

said delivering mechanism is composed of a first delivering member for delivering said recording medium between said first magazine and said holding part, and a second delivering member for delivering said recording medium between said second magazine and said holding part;

said first delivering member is constituted to be movable between said first magazine and said holding part in a direction crossing at a right angle with a longitudinal direction of said first magazine; and said second delivering member is constituted to be movable between said second magazine and said holding part in a direction crossing at a right angle with a longitudinal direction of said first magazine.

3. A recording medium exchanging-type recording and reproducing apparatus according to claim 1, wherein the installing part of said recording and reproducing mechanism is arranged at one of the ends in the longitudinal direction of said transferring space.

4. A recording medium exchanging-type recording and reproducing apparatus according to claim 3, wherein:

there is provided a casing storing in it said first and second magazines, said recording and reproducing mechanism, said moving mechanism, said delivering mechanism and said transferring space;

said casing has a wall extending in a direction crossing at a right angle with said longitudinal direction at one side of said first and second magazines in their longitudinal direction;

said installing part is installed on said wall; and a portion of said recording and reproducing mechanism is arranged to extend in a space formed between one of said first and second magazines and said wall.

5. A recording medium exchanging-type recording and reproducing apparatus according to claim 1, wherein said recording medium is a tape cartridge provided with a case and a magnetic recording tape stored in said case.

6. A recording medium exchanging-type recording and reproducing apparatus according to claim 1, wherein:

said delivering mechanism is composed of a single delivering member for use in delivering said recording medium among said first magazine, said second magazine and said holding part;

said delivering member is arranged to be movable along said first magazine, said second magazine and the transferring space and further arranged to be movable between said first magazine and said transferring space and between said second magazine and the transferring space; and said first magazine and said second magazine are provided with a moving space in which said delivering member is moved between the first magazine and the second magazine.

7. A recording medium exchanging-type recording and reproducing apparatus according to claim 6, wherein said moving space is arranged between said storing members at an intermediate location in a longitudinal direction of said first and second magazines, or arranged outside the storing members positioned at the ends in the longitudinal direction of said first and second magazines.

8. A recording medium exchanging-type recording and reproducing apparatus according to claim 6, wherein:

said first and second magazines are composed of a plurality of supporting pieces arranged to be spaced apart along a longitudinal direction of these magazines;

said storing members are each constituted by two adjoining pieces of said plurality of supporting pieces;

a storing space for storing said recording medium in such a way that it can be inserted into or taken out is formed between the adjoining two said supporting pieces; and said moving space is constituted by said storing space.

9. A recording medium exchanging-type recording and reproducing apparatus according to claim 6, wherein:

there is provided a casing for storing said first and second magazines, said recording and reproducing mechanism, said moving mechanism, said delivering mechanism and said transferring space;

the end part of said first magazine or second magazine in its longitudinal direction is provided with a taking-out part capable of delivering said recording medium between it and said delivering mechanism; and said taking-out part can be taken out to an outside part of said casing and replace the recording medium delivered to said taking-out part under a state in which it is taken out of the casing.

10. A recording medium exchanging-type recording and reproducing apparatus according to claim 9, wherein there is provided a control means for prohibiting taking-out of said taking-out part outside said casing when the recording medium delivered to said taking-out part specifies in advance for prohibition against its taking-out.

11. A recording medium exchanging-type recording and reproducing apparatus according to claim 10, wherein the recording medium specified in advance for prohibition against its taking-out includes at least one of a recording medium of which copying is prohibited in view of its copyrighted content, a recording medium of which an applied region is specified, and a recording medium of which taking-out by a non-permitted person is prohibited.

12. A recording medium exchanging-type recording and reproducing apparatus, comprising:

two longitudinal first and second magazines, said magazines each having a plurality of storing members arranged in a linear form for storing recording media capable of recording and reproducing information, each recording medium being capable of being recognized in an altitude specified by orientations in two directions crossing at a right angle to each other in such a way that the recording medium can be inserted or taken out of said first and second magazines;

a recording and reproducing mechanism having an installing part where said recording medium is installed and for performing a recording and/or reproducing against said recording medium under a state in which said recording medium is installed at said installing part;

a moving mechanism having a holding part for holding the recording medium and for moving said recording medium between each of said storing members and the recording and reproducing mechanism; and a delivering mechanism for delivering said recording medium between each of said storing members and said holding part, wherein:

said first and second magazines are oppositely arranged in such a way that their longitudinal directions are in parallel to each other;

a transferring space extending along the longitudinal directions of these first and second magazines is arranged between said first and second magazines;

a moving action of said recording medium with said holding part is carried out in said transferring space;

an attitude of said recording media stored in said first and second magazines and an attitude of said recording medium held at said holding part are the same to each other;

said recording medium is installed at said installing part while keeping an attitude in which said recording medium is held at said holding part and moved in said transferring space;

said first and second magazines have a plurality of supporting pieces arranged to be spaced apart in a longitudinal direction of these magazines;

said storing members are each constituted by two adjoining pieces of said plurality of supporting pieces; and a storing space for storing said recording medium in such a way that it can be inserted or taken out is formed between the adjoining two said supporting pieces.

13. A recording medium exchanging-type recording and reproducing apparatus, comprising:

two longitudinal first and second magazines, said magazines each having a plurality of storing members arranged in a linear form for storing recording media capable of recording and reproducing information, each recording medium being capable of being recognized in an attitude specified by orientations in two directions crossing at a right angle to each other in such a way that the recording medium can be inserted or taken out of said first and second magazines;

a recording and reproducing mechanism having an installing part where said recording medium is installed and for performing a recording and/or reproducing against said recording medium under a state in which said recording medium is installed at said installing part;

a moving mechanism having a holding part for holding the recording medium and for moving said recording medium between each of said storing members and the recording and reproducing mechanism; and a delivering mechanism for delivering said recording medium between each of said storing members and said holding part, wherein:

said first and second magazines are oppositely arranged in such a way that their longitudinal directions are in parallel to each other;

a transferring space extending along the longitudinal directions of these first and second magazines is arranged between said first and second magazines;

a moving action of said recording medium with said holding part is carried out in said transferring space;

an attitude of said recording media stored in said first and second magazines and an attitude of said recording medium held at said holding part are the same to each other;

said recording medium is installed at said installing part while keeping an attitude in which said recording medium is held at said holding part and moved in said transferring space;

said delivering mechanism is composed of a first delivering member for delivering said recording medium between said first magazine and said holding part, and a second delivering member for delivering said recording medium between said second magazine and said holding part;

said first delivering member is constituted to be movable between said first magazine and said holding part in a direction crossing at a right angle with a longitudinal direction of said first magazine;

said second delivering member is constituted to be movable between said second magazine and said holding part in a direction crossing at a right angle with a longitudinal direction of said first magazine;

said first and second delivering members are constituted by two delivering pieces extending in a direction crossing at a right angle with a longitudinal direction of said first and second magazines; and delivering of said recording medium among said first magazine, said second magazine and said moving mechanism is carried out by moving said first and second delivering members under a state in which said recording medium is being held between said two delivering pieces.

14. A recording medium exchanging-type recording and reproducing apparatus according to claim 13, wherein a size between said two delivering pieces is such that said two delivering pieces can straddle and move along the first and second magazines.

15. A recording medium exchanging-type recording and reproducing apparatus according to claim 13, wherein:

said delivering mechanism has guide portions for guiding said first and second delivering members;

said guide portions are composed of guide members integrally moved with the holding part along said transferring space and extending in a direction crossing at a right angle with the longitudinal directions of said first and second magazines; and said first and second delivering members are attached to said guide members in such a way that they can move in an extending direction of said guide member.

16. A recording medium exchanging-type recording and reproducing apparatus according to claim 15, wherein:

said first and second delivering members are rotatably attached to said guide members around an axis of each of said guide members;

said two delivering pieces are biased to hold an attitude in which they extend in a direction crossing at a right angle with a longitudinal direction of said first and second magazines; and a size between said two delivering pieces is such that said two delivering pieces do not interfere with said holding part when said holding part is used to move the recording medium.

17. A recording medium exchanging-type recording and reproducing apparatus according to claim 16, wherein when said recording medium held at said holding pan is installed at said installing part, at least one of said delivering piece of said first and second delivering members is abutted against the location of said recording and reproducing mechanism, thereby at least one of said first and second delivering members is turned to be retracted from the location at said recording and reproducing mechanism.

18. A recording medium exchanging-type recording and reproducing apparatus, comprising:
- two longitudinal first and second magazines, said magazines each having a plurality of storing members arranged in a linear form for storing a recording media capable of recording and reproducing information, each recording medium being capable of being recognized in an attitude specified by orientations in two directions crossing at a right angle to each other in such a way that the recording medium can be inserted or taken out of said first and second magazines;
- a recording and reproducing mechanism having an installing part where said recording medium is installed and for performing a recording and/or reproducing against said recording medium under a state in which said recording medium is installed at said installing part;
- a moving mechanism having a holding part for holding the recording medium and for moving said recording medium between each of said storing members and the recording and reproducing mechanism; and
- a delivering mechanism for delivering said recording medium between each of said storing members and said holding part, wherein:
  - said first and second magazines are oppositely arranged in such a way that their longitudinal directions are in parallel to each other;
  - a transferring space extending along the longitudinal directions of these first and second magazines is arranged between said first and second magazines;
  - a moving action of said recording medium with said holding part is carried out in said transferring space;
  - an attitude of said recording media stored in said first and second magazines and an attitude of said recording medium held at said holding part are the same to each other;
  - said recording medium is installed at said installing part while keeping an attitude in which said recording medium is held at said holding part and moved in said transferring space;
  - said recording medium is a tape cartridge provided with a case and a magnetic recording tape stored in said case;
  - said case is formed into a rectangular plate having a longitudinal length, has an opening or closing lid at its forward part and a rear surface at its rearward part;
  - said tape cartridge stored in one of said first and second magazines has said opening or closing lid adjacent to said transferring space; and
  - said tape cartridge stored in the other of said first and second magazines is adjacent to the transferring space at its rear surface.

19. A recording medium exchanging-type recording and reproducing apparatus according to claim 18, wherein:
- said installing part has two reel shafts adjacent to a location of one end in a longitudinal direction of said transferring space;
- said case has an upper surface at one side in a direction crossing at a right angle with said forward or rearward direction and has a lower surface at the other side;
- said tape cartridge has two reels having a magnetic recording tape wound in said case and rotatably arranged and has two bearings arranged at each of said reels to face from the lower surface of said case to outside; and
- installing of said tape cartridge against said installing part is carried out by fitting each of said bearings to each of said reel shafts.

20. A recording medium exchanging-type recording and reproducing apparatus, comprising:
- two longitudinal first and second magazines, said magazines each having a plurality of storing members arranged in a linear form for storing recording media capable of recording and reproducing information, each recording medium being capable of being recognized in an attitude specified by orientations in two directions crossing at a right angle to each other in such a way that the recording medium can be inserted or taken out of said first and second magazines;
- a recording and reproducing mechanism having an installing part where said recording medium is installed and for performing a recording and/or reproducing against said recording medium under a state in which said recording medium is installed at said installing part;
- a moving mechanism having a holding part for holding the recording medium and for moving said recording medium between each of said storing members and the recording and reproducing mechanism; and
- a delivering mechanism for delivering said recording medium between each of said storing members and said holding part, wherein:
  - said first and second magazines are oppositely arranged in such a way that their longitudinal directions are in parallel to each other;
  - a transferring space extending along the longitudinal directions of these first and second magazines is arranged between said first and second magazines;
  - a moving action of said recording medium with said holding part is carried out in said transferring space;
  - an attitude of said recording media stored in said first and second magazines and an attitude of said recording medium held at said holding part are the same to each other;
  - said recording medium is installed at said installing part while keeping an attitude in which said recording medium is held at said holding part and moved in said transferring space;
  - there is provided a casing for storing said first and second magazines, said recording and reproducing mechanism, said moving mechanism, said delivering mechanism and said transferring space;
  - the end part of said first magazine or said second magazine in its longitudinal direction is provided with a taking-out part capable of delivering said recording medium between it and said delivering mechanism; and
  - said taking-out part can be taken out to an outside part of said casing and replace the recording medium delivered to said taking-out part under a state in which it is taken out of the casing.

21. A recording medium exchanging-type recording and reproducing apparatus according to claim 20, wherein there is provided a control means for prohibiting a taking-out of said taking-out part outside said casing when the recording medium delivered to said taking-out part specifies in advance for prohibition against its taking-out.

22. A recording medium exchanging-type recording and reproducing apparatus according to claim 21, wherein the recording medium specified in advance for prohibition against its taking-out includes at least one of a recording medium of which copying is prohibited in view of its copyrighted content, a recording medium of which an applied region is specified, and a recording medium of which taking-out by a non-permitted person is prohibited.

23. A recording medium exchanging-type recording and reproducing apparatus, comprising:

two longitudinal first and second magazines, said magazines each having a plurality of storing members arranged in a linear form for storing recording media capable of recording and reproducing information, each recording medium being capable of being recognized in an attitude specified by orientations in two directions crossing at a right angle to each other in such a way that the recording medium can he inserted or taken out of said first and second magazines;

a recording and reproducing mechanism having an installing part where said recording medium is installed and for performing a recording and/or reproducing against said recording medium under a state in which said recording medium is installed at said installing part;

a moving mechanism having a holding part for holding the recording medium and for moving said recording medium between each of said storing members and the recording and reproducing mechanism; and a delivering mechanism for delivering said recording medium between each of said storing members and said holding part, wherein:

said first and second magazines are oppositely arranged in such a way that their longitudinal directions are in parallel to each other;

a transferring space extending along the longitudinal directions of these first and second magazines is arranged between said first and second magazines;

a moving action of said recording medium with said holding part is carried out in said transferring space;

an attitude of said recording media stored in said first and second magazines and an attitude of said recording medium held at said holding part are the same to each other;

said recording medium is installed at said installing part while keeping an attitude in which said recording medium is held at said holding part and moved in said transferring space;

said delivering mechanism is composed of a single delivering member for use in delivering said recording medium among said first magazine, said second magazine and said holding part;

said delivering member is arranged to be movable along said first magazine, said second magazine and the transferring space and further arranged to be movable between said first magazine and said transferring space and between said second magazine and the transferring space; and said first magazine and said second magazine are provided with a moving space in which said delivering member is moved between the first magazine and the second magazine;

said delivering member is composed of two delivering pieces extending in a direction crossing at a right angle with the longitudinal direction of said first and second magazines; and delivering of said recording medium among said first and second magazines and said moving mechanism is carried out by moving said delivering member under a state in which said recording medium is held between the two said delivering pieces.

24. A recording medium exchanging-type recording and reproducing apparatus according to claim 23, wherein a size between the two said delivering pieces is set to a size where said two delivering pieces can straddle over and move along the first and second magazines.

25. A recording medium exchanging-type recording and reproducing apparatus according to claim 23, wherein:

said delivering mechanism has a guide part for guiding said delivering member;

said guide part is composed of guide members integrally moved with the holding part along said transferring space and extending in a direction crossing at a right angle with the longitudinal direction of said first and second magazines; and said delivering member is movably attached to said guide member in an extending direction of said guide member.

26. A recording medium exchanging-type recording and reproducing apparatus according to claim 25, wherein:

said delivering member is rotatably attached around an axis of said guide member in regard to said guide member;

said two delivering pieces are biased to hold an attitude extending in a direction crossing at a right angle with the longitudinal directions of said first and second magazines; and said two delivering pieces are formed in such a size as to not interfere with said holding part when said holding part is held between the two said delivering pieces.

27. A recording medium exchanging-type recording and reproducing apparatus according to claim 26, wherein when said recording medium held at said holding part is installed at said installing part, at least one said delivering piece of said delivering member abuts against a location of said recording and reproducing mechanism, thereby said delivering member is turned to retract from the location in said recording and reproducing mechanism.

* * * * *

UNITED STATES PATENT AND TRADEMARK OFFICE
CERTIFICATE OF CORRECTION

PATENT NO. : 6,757,130 B2
DATED : June 29, 2004
INVENTOR(S) : Tadao Yoshida et al.

It is certified that error appears in the above-identified patent and that said Letters Patent is hereby corrected as shown below:

Column 43,
Line 66, "part arc" should read -- part are --.

Column 44,
Line 61, "holding pan" should read -- holding part --.

Signed and Sealed this

Fifth Day of April, 2005

JON W. DUDAS
*Director of the United States Patent and Trademark Office*